(12) United States Patent
Hafstad et al.

(10) Patent No.: US 12,333,854 B2
(45) Date of Patent: Jun. 17, 2025

(54) SYSTEMS AND METHODS FOR CORRELATING INDIVIDUALS ACROSS OUTPUTS OF A MULTI-CAMERA SYSTEM AND FRAMING INTERACTIONS BETWEEN MEETING PARTICIPANTS

(71) Applicant: Huddly AS, Oslo (NO)

(72) Inventors: Jon Tore Hafstad, Oslo (NO); Lars Heimdal, Oslo (NO); Lars Erling Stensen, Oslo (NO); Tamás Becsei, Oslo (NO); Stian Selbek, Koppang (NO); Vegard Hammer, Tårnåsen (NO); Knut Helge Teppan, Asker (NO)

(73) Assignee: HUDDLY AS, Oslo (NO)

( * ) Notice: Subject to any disclaimer, the term of this patent is extended or adjusted under 35 U.S.C. 154(b) by 0 days.

(21) Appl. No.: 18/128,697

(22) Filed: Mar. 30, 2023

(65) Prior Publication Data
US 2024/0257553 A1    Aug. 1, 2024

Related U.S. Application Data

(60) Provisional application No. 63/441,642, filed on Jan. 27, 2023.

(51) Int. Cl.
*G10L 17/00*  (2013.01)
*G06T 7/70*   (2017.01)
(Continued)

(52) U.S. Cl.
CPC .............. *G06V 40/166* (2022.01); *G06T 7/70* (2017.01); *G06V 10/12* (2022.01); *G06V 10/56* (2022.01);
(Continued)

(58) Field of Classification Search
CPC ...... G06V 20/46; G06V 40/168; G06V 10/75; G10L 17/00
See application file for complete search history.

(56) References Cited

U.S. PATENT DOCUMENTS 8,537,196 B2 * 9/2013 Hegde ................... H04N 7/157
                                                  348/14.09
9,491,374 B1 * 11/2016 Avrahami .............. G06V 40/20
(Continued)

FOREIGN PATENT DOCUMENTS

CN           114979759 A  *  8/2022  ......... G06K 9/00362

OTHER PUBLICATIONS

Ce Wang, et al., "Robust automatic video-conferencing with multiple cameras and microphones," ICME2000. Proceedings. Latest Advances in the Fast Changing World of Multimedia (Cat. No.00TH8532), NY, NY, USA, 2000, pp. 1585-1588 vol.3, doi: 10.1109/ ICME.2000.871072. (Year: 2000).*

(Continued)

*Primary Examiner* — Michael Robert Cammarata
(74) *Attorney, Agent, or Firm* — FINNEGAN, HENDERSON, FARABOW, GARRETT & DUNNER LLP

(57) ABSTRACT

Consistent with disclosed embodiments, systems and methods for analyzing video output streams and generating a primary video stream may be provided. Embodiments may include automatically analyzing a first video output stream and a second video output stream, based on at least one identity indicator, to determine whether a first representation of a meeting participant and a second representation of a meeting participant correspond to a common meeting participant. Disclosed embodiments may involve evaluating the first representation and the second representation of the common meeting participant relative to one or more predetermined criteria. Embodiments may involve selecting, (Continued)

based on the evaluation, either the first video output stream or the second video output stream as a source of a framed representation of the common meeting participant to be output as a primary video stream. Furthermore, embodiments may include generating the primary video stream including the framed representation of the common meeting participant.

47 Claims, 23 Drawing Sheets

(51) Int. Cl.
| | | |
|---|---|---|
| G06V 10/12 | (2022.01) | |
| G06V 10/56 | (2022.01) | |
| G06V 10/74 | (2022.01) | |
| G06V 20/40 | (2022.01) | |
| G06V 40/10 | (2022.01) | |
| G06V 40/16 | (2022.01) | |
| G06V 40/20 | (2022.01) | |
| G10L 25/57 | (2013.01) | |
| H04N 5/268 | (2006.01) | |

(52) U.S. Cl.
CPC .............. *G06V 10/74* (2022.01); *G06V 20/40* (2022.01); *G06V 20/46* (2022.01); *G06V 40/103* (2022.01); *G06V 40/168* (2022.01); *G06V 40/20* (2022.01); *G10L 17/00* (2013.01); *G10L 25/57* (2013.01); *H04N 5/268* (2013.01); *G06T 2207/10016* (2013.01); *G06T 2207/30168* (2013.01); *G06T 2207/30196* (2013.01)

(56) References Cited

U.S. PATENT DOCUMENTS

| | | | | |
|---|---|---|---|---|
| 9,769,419 | B2* | 9/2017 | Tangeland | H04N 23/57 |
| 10,171,771 | B2* | 1/2019 | Tangeland | H04N 23/90 |
| 10,516,852 | B2* | 12/2019 | Theien | H04N 7/152 |
| 10,778,941 | B1* | 9/2020 | Childress, Jr. | H04N 7/155 |
| 10,798,306 | B1* | 10/2020 | Johansen | G06V 10/82 |
| 10,991,108 | B2* | 4/2021 | Schnittman | G10L 25/57 |
| 11,350,029 | B1* | 5/2022 | Ostap | G06T 7/70 |
| 11,777,754 | B1* | 10/2023 | Zhang | G06V 40/167 |
| | | | | 709/204 |
| 11,849,257 | B2* | 12/2023 | Pitts | H04L 12/1818 |
| 11,882,383 | B2* | 1/2024 | Deng | G06V 20/40 |
| 2007/0211938 | A1 | 9/2007 | Tu et al. | |
| 2007/0279483 | A1* | 12/2007 | Beers | H04N 7/142 |
| | | | | 348/E7.083 |
| 2009/0002489 | A1* | 1/2009 | Yang | G06V 10/7557 |
| | | | | 382/103 |
| 2009/0046139 | A1 | 2/2009 | Cutler et al. | |
| 2009/0326979 | A1* | 12/2009 | Ryan | G16H 80/00 |
| | | | | 348/E7.083 |
| 2010/0085416 | A1* | 4/2010 | Hegde | H04N 7/157 |
| | | | | 348/E7.083 |
| 2010/0123770 | A1* | 5/2010 | Friel | H04N 7/15 |
| | | | | 348/240.99 |
| 2012/0293606 | A1* | 11/2012 | Watson | H04N 23/60 |
| | | | | 348/E7.085 |
| 2012/0320143 | A1* | 12/2012 | Chu | H04N 7/15 |
| | | | | 348/E7.083 |
| 2013/0162752 | A1* | 6/2013 | Herz | H04N 7/15 |
| | | | | 348/E7.083 |
| 2014/0049595 | A1* | 2/2014 | Feng | H04N 7/15 |
| | | | | 348/E7.083 |
| 2016/0134838 | A1* | 5/2016 | Tangeland | H04N 7/152 |
| | | | | 348/14.09 |
| 2017/0094222 | A1* | 3/2017 | Tangeland | H04N 23/51 |
| 2017/0310933 | A1 | 10/2017 | Vendrow | |
| 2018/0063479 | A1 | 3/2018 | Nimri et al. | |
| 2018/0174600 | A1* | 6/2018 | Chaudhuri | H04N 21/44008 |
| 2018/0225852 | A1* | 8/2018 | Um | G06T 7/292 |
| 2019/0215464 | A1* | 7/2019 | Kumar | H04N 7/08 |
| 2019/0313058 | A1* | 10/2019 | Harrison | H04N 21/23418 |
| 2019/0341050 | A1* | 11/2019 | Diamant | H04N 7/155 |
| 2019/0356883 | A1* | 11/2019 | Theien | H04N 7/152 |
| 2020/0267427 | A1* | 8/2020 | Rogers | H04N 21/84 |
| 2020/0344409 | A1* | 10/2020 | Bermejo Fernandez | |
| | | | | H04N 23/611 |
| 2021/0225391 | A1 | 7/2021 | Wexler et al. | |
| 2021/0235040 | A1* | 7/2021 | Childress, Jr. | G06V 10/82 |
| 2022/0012913 | A1* | 1/2022 | Thomas | G06V 10/82 |
| 2022/0070371 | A1* | 3/2022 | Bushman | G06F 3/165 |
| 2022/0319032 | A1* | 10/2022 | Fan | G10L 25/78 |
| 2022/0353465 | A1* | 11/2022 | Smith | H04N 7/142 |
| 2022/0394413 | A1* | 12/2022 | Seipp | H04N 7/147 |
| 2022/0400216 | A1* | 12/2022 | Wang | G10L 25/78 |
| 2022/0408015 | A1 | 12/2022 | Wang et al. | |
| 2022/0408029 | A1 | 12/2022 | Wang et al. | |
| 2023/0075888 | A1* | 3/2023 | Zhang | G06V 10/462 |
| 2023/0105206 | A1* | 4/2023 | Condorovici | G06V 40/18 |
| | | | | 348/14.08 |
| 2023/0208898 | A1* | 6/2023 | Deng | G06Q 10/06393 |
| | | | | 709/204 |
| 2023/0299990 | A1* | 9/2023 | Mese | G06V 40/164 |
| | | | | 709/204 |
| 2023/0351474 | A1* | 11/2023 | Isaacson | G06Q 50/01 |
| 2024/0305678 | A1* | 9/2024 | Llamas Virgen | H04L 65/1089 |

OTHER PUBLICATIONS

M. Wang, K. Nahrstedt and M. Johnson, "A Portable Scene-Aware View Management System for Video-Conferencing," 2007 IEEE International Conference on Multimedia and Expo, Beijing, China, 2007, pp. 1175-1178, doi: 10.1109/ICME.2007.4284865. (Year: 2007).*
B. Yip and J. S. Jin, "Pose determination and viewpoint determination of human head in video conferencing based on head movement," 10th International Multimedia Modelling Conference, 2004. Proceedings., Brisbane, QLD, Australia, 2004, pp. 130-135, doi: 10.1109/MULMM.2004.1264977. (Year: 2004).*
R. Cutler et al., "Multimodal Active Speaker Detection and Virtual Cinematography for Video Conferencing," ICASSP 2020-2020 IEEE International Conference on Acoustics, Speech and Signal Processing (ICASSP), Barcelona, Spain, 2020, pp. 4527-4531, doi: 10.1109/ICASSP40776.2020.9053171. (Year: 2020).*
J. Jansen, P. Cesar, D. C. A. Bulterman, T. Stevens, I. Kegel and J. Issing, "Enabling Composition-Based Video-Conferencing for the Home," in IEEE Transactions on Multimedia, vol. 13, No. 5, pp. 869-881, Oct. 2011, doi: 10.1109/TMM.2011.2159369. (Year: 2011).*
M. Al-Hames, B. Hornler, R. Muller, J. Schenk and G. Rigoll, "Automatic Multi-Modal Meeting Camera Selection for Video-Conferences and Meeting Browsers," 2007 IEEE International Conference on Multimedia and Expo, Beijing, China, 2007, pp. 2074-2077, doi: 10.1109/ICME.2007.4285090. (Year: 2007).*
Bin Yu, Cha Zhang, Yong Rui, Klara Nahrstedt, "A threelayer virtual director model for supporting automated multisite distributed education", Proc. ofICME'06, 2006 (Year: 2006).*
L. McCowan, D. Gatica-Perez, S. Bengio, G. Lathoud, M. Barnard and D. Zhang, "Automatic analysis of multimodal group actions in meetings," in IEEE Transactions on Pattern Analysis and Machine Intelligence, vol. 27, No. 3, pp. 305-317, Mar. 2005, doi: 10.1109/TPAMI.2005.49. (Year: 2005).*
Notification of Transmittal of the International Search Report and the Written Opinion of the International Searching Authority, or the Declaration, date of mailing Jun. 24, 2024, for corresponding International Application No. PCT/IB2024/050760, filed Jan. 26, 2024 (27 pgs.).

* cited by examiner

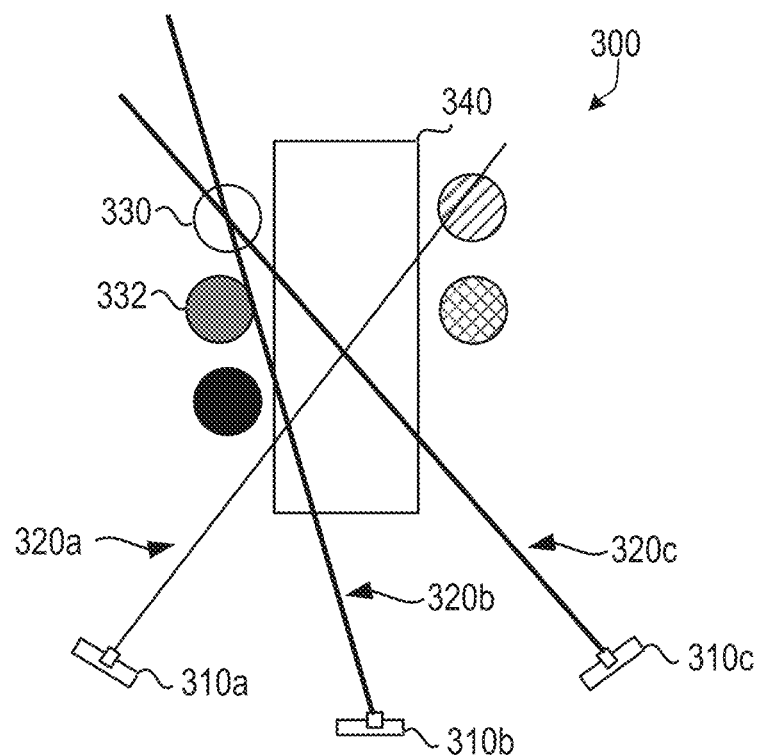
FIG. 3A
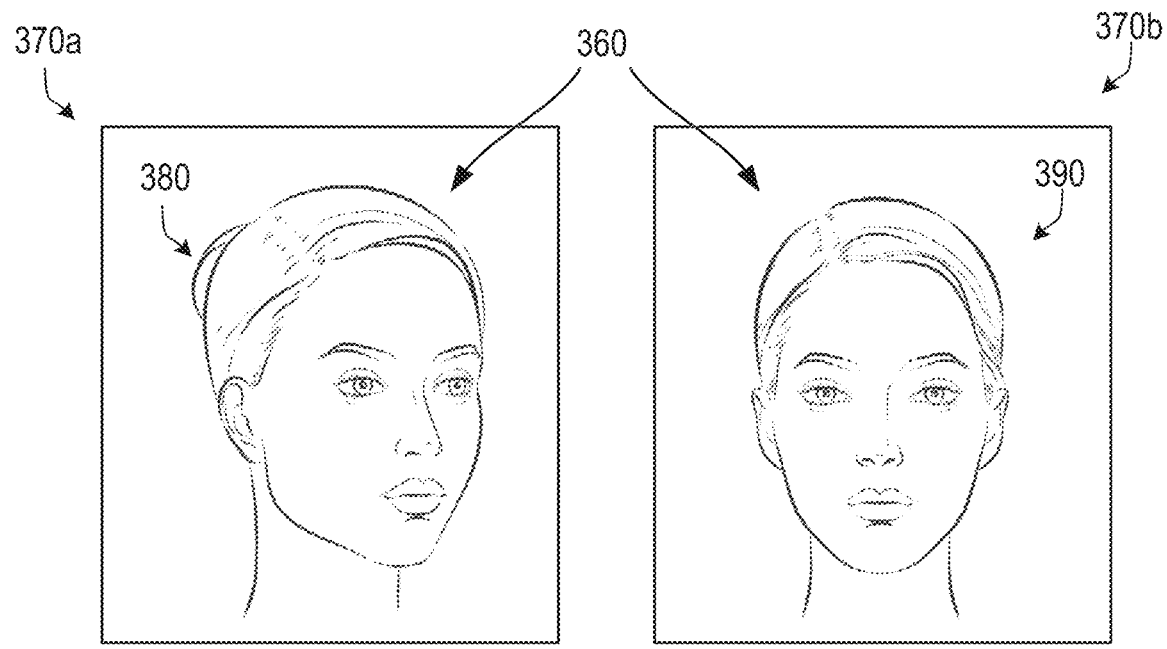
FIG. 3B  FIG. 3C

SYSTEMS AND METHODS FOR CORRELATING INDIVIDUALS ACROSS OUTPUTS OF A MULTI-CAMERA SYSTEM AND FRAMING INTERACTIONS BETWEEN MEETING PARTICIPANTS

CROSS-REFERENCE TO RELATED APPLICATIONS

This application claims the benefit of priority of U.S. Provisional Application No. 63/441,642, filed Jan. 27, 2023. The foregoing application is incorporated herein by reference in its entirety.

TECHNICAL FIELD AND BACKGROUND

The present disclosure relates generally to multi-camera systems and, more specifically, to systems and methods for correlating individuals across outputs of a multi-camera system, selecting outputs to source framed video streams of a particular meeting participants, and/or capturing interactions among meeting participants.

In traditional video conferencing, the experience for the participants may be static. Cameras used in meeting rooms may not consider social cues (e.g., reactions, body language, and other non-verbal communication), speaker awareness, or attention direction in the meeting situation. For meeting participants located in corners of the meeting environment or far from the speaker (e.g., far end participants), the video conferencing experience may lack engagement, making it difficult to engage in the conversation. Single camera systems may display the meeting environment at a limited number of angles, which may lack the ability to feature non-speaking meeting participants. Additionally, in a large video conferencing room, it may be difficult to frame some or all meeting participants and maintain a display or representation of meeting participants located further from a camera. Meeting participants viewing the streamed video conference may not be able to see facial expressions of meeting participants in the meeting environment, and thus may not be able to actively engage with meeting participants present in the meeting environment.

In traditional video conference systems (even multi-camera systems), the user experience may be limited to the display of meeting participants determined to be speaking. Such systems may lack the ability to vary shots of the detected speaker (e.g., by selecting different camera outputs to source a frame video stream featuring the detected speaker, by selectively including other meeting participants in the shot, etc.). Such systems may also lack the ability to feature shots of non-speaking meeting participants (together with or in isolation from a shot featuring the speaker) that are actively listening or reacting to the speaker. Thus, the user experience offered by traditional video conferencing systems may lack a certain degree of depth and interaction by displaying a representation of the speaking meeting participant without conveying information associated with, e.g., reactions, interactions, spatial relationships, etc. between speakers and other meeting participants.

There is a need for a multi-camera system that may increase user experience and interactivity through the identification of meeting participants between cameras and the selective framing of dialogues an interactions between speakers and meeting participants to create a more robust user experience.

SUMMARY

Disclosed embodiments may address one or more of these challenges. The disclosed cameras and camera systems may include a smart camera or multi-camera system that understands the dynamics of the meeting room participants (e.g., using artificial intelligence (AI), such as trained networks) and provides an engaging experience to far end participants based on, for example, the number of people in the room, who is speaking, who is listening, and where attendees are focusing their attention.

In some embodiments, by dividing a conference room into zones, and identifying the zone a speaking participant is located in, disclosed systems and methods may alternate between showing speaker shots and listening shots to give a closer view of the speaker, create better flow in the conversation, and provide spatial context for remote participants. This may also provide a more dynamic viewing experience for remote participants that is similar to how a meeting participant would naturally look around the meeting environment and engage with other meeting participants.

Embodiments consistent with the present disclosure provide multi-camera systems. The multi-camera system may comprise a plurality of cameras each configured to generate a video output stream representative of a meeting environment. In some embodiments, a first representation of a meeting participant may be included in a first video output stream from a first camera included in the plurality of cameras. Furthermore, in some embodiments, a second representation of a meeting participant may be included in a second video output stream from a second camera included in the plurality of cameras. The multi-camera system may further comprise a video processing unit. In some embodiments, the video processing unit may be configured to automatically analyze the first video output stream and the second video output stream, based on at least one identity indicator, to determine whether the first representation of a meeting participant and the second representation of a meeting participant correspond to a common meeting participant. The video processing unit may be configured to evaluate the first representation and the second representation of the common meeting participant relative to one or more predetermined criteria. In some embodiments, the video processing unit may select, based on the evaluation, either the first video output stream or the second video output stream as a source of a framed representation of the common meeting participant to be output as a primary video stream. Furthermore, the video processing unit may be configured to generate, as an output of the multi-camera system, the primary video stream including the framed representation of the common meeting participant.

Consistent with disclosed embodiments, multi-camera systems are disclosed. The multi-camera system may comprise a plurality of cameras each configured to generate a video output stream representative of a meeting environment. In some embodiments, a first representation of a meeting participant may be included in a first video output stream from a first camera included in the plurality of cameras. Furthermore, in some embodiments, a second representation of a meeting participant may be included in a second video output stream from a second camera included in the plurality of cameras. The multi-camera system may further comprise a video processing unit. In some embodiments, the video processing unit may be configured to automatically analyze the first video output stream and the second video output stream, based on at least one identity indicator, to determine whether the first representation of a meeting participant and the second representation of a meeting participant correspond to a common meeting participant. In some embodiments, the identity indicator may include a feature vector embedding determined relative to the first representation of the meeting participant and the second representation of the meeting participant. The video processing unit may be configured to evaluate the first representation and the second representation of the common meeting participant relative to one or more predetermined criteria, and the predetermined criteria may include a combination of: whether the common meeting participant is detected as speaking, a head pose of the common meeting participant, and a face visibility level associated with the common meeting participant. In some embodiments, the video processing unit may select, based on the evaluation, either the first video output stream or the second video output stream as a source of a framed representation of the common meeting participant to be output as a primary video stream. Furthermore, the video processing unit may be configured to generate, as an output of the multi-camera system, the primary video stream including the framed representation of the common meeting participant.

Consistent with disclosed embodiments, multi-camera systems are disclosed. The multi-camera system may comprise a plurality of cameras each configured to generate a video output stream representative of a meeting environment. The multi-camera system may further comprise a video processing unit configured to automatically analyze a plurality of video streams received from the plurality of cameras and, based on the analysis, identify at least one video stream among the plurality of video streams that includes a representation of a first subject facing a second subject. The first subject may be an active speaker, and a face of the first subject may be visible in the identified video stream. At least a portion of a back of a shoulder of the second subject may be visible in the identified video stream. The video processing unit may be further configured to generate a primary video stream based on the identified video stream. The primary video stream may include a framed composition including representations of at least the face of the first subject and the at least the portion of the back of the shoulder of the second subject.

BRIEF DESCRIPTION OF THE DRAWINGS

The accompanying drawings, which are incorporated in and constitute a part of this specification, illustrate disclosed embodiments and, together with the description, serve to explain the disclosed embodiments. The particulars shown are by way of example and for purposes of illustrative discussion of embodiments of the present disclosure. The description taken with the drawings makes apparent to those skilled in the art how embodiments of the present disclosure may be practiced.

FIG. 3A is a diagrammatic representation of a multi-camera system in a meeting environment, consistent with some embodiments of the present disclosure.

FIGS. 3B and 3C are examples of output streams including representations of a common meeting participant, consistent with some embodiments of the present disclosure.

DETAILED DESCRIPTION

Embodiments of the present disclosure include multi-camera systems. As used herein, multi-camera systems may include one or more cameras that are employed in an environment, such as a meeting environment, and that can simultaneously record or broadcast one or more representations of the environment. The disclosed cameras may include any device including one or more light-sensitive sensors configured to capture a stream of image frames. Examples of cameras may include, but are not limited to Huddly® L1 or S1 cameras, digital cameras, smart phone cameras, compact cameras, digital single-lens reflex (DSLR) video cameras, mirrorless cameras, action (adventure) cameras, 360-degree cameras, medium format cameras, webcams, or any other device for recording visual images and generating corresponding video signals.

Figure 1:
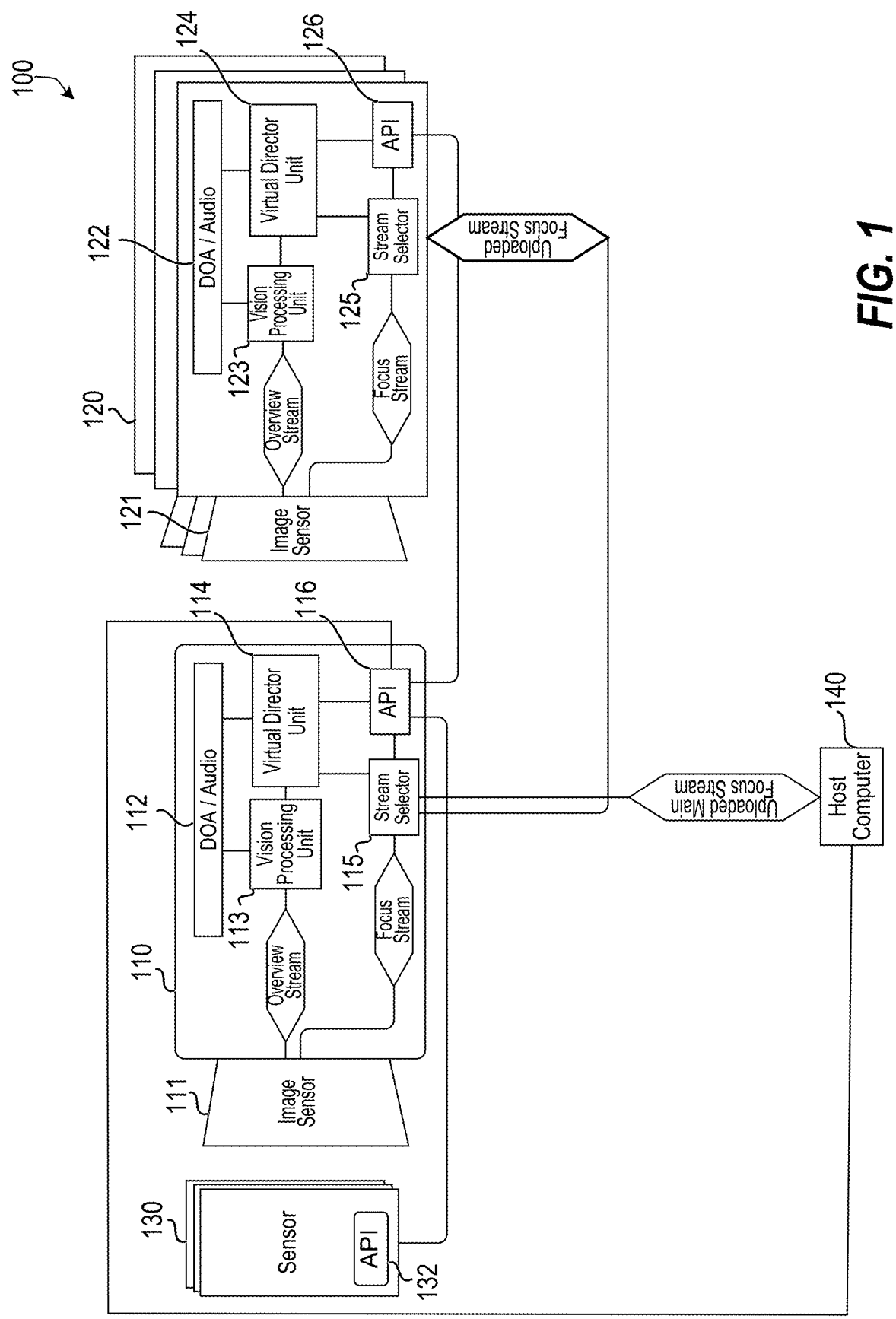
FIG. 1 is a diagrammatic representation of an example of a multi-camera system, consistent with some embodiments of the present disclosure.

Referring to FIG. 1, a diagrammatic representation of an example of a multi-camera system 100, consistent with some embodiments of the present disclosure, is provided. Multi-camera system 100 may include a main camera 110, one or more peripheral cameras 120, one or more sensors 130, and a host computer 140. In some embodiments, main camera 110 and one or more peripheral cameras 120 may be of the same camera type such as, but not limited to, the examples of cameras discussed previously. Furthermore, in some embodiments, main camera 110 and one or more peripheral cameras 120 may be interchangeable, such that main camera 110 and the one or more peripheral cameras 120 may be located together in a meeting environment, and any of the cameras may be selected to serve as a main camera. Such selection may be based on various factors such as, but not limited to, the location of a speaker, the layout of the meeting environment, a location of an auxiliary item (e.g., whiteboard, presentation screen, television), etc. In some cases, the main camera and the peripheral cameras may operate in a master-slave arrangement. For example, the main camera may include most or all of the components used for video processing associated with the multiple outputs of the various cameras included in the multi-camera system. In other cases, the system may include a more distributed arrangement in which video processing components (and tasks) are more equally distributed across the various cameras of the multi-camera system.

As shown in FIG. 1, main camera 110 and one or more peripheral cameras 120 may each include an image sensor 111, 121. Furthermore, main camera 110 and one or more peripheral cameras 120 may include a directional audio (DOA/Audio) unit 112, 122. DOA/Audio unit 112, 122 may detect and/or record audio signals and determine a direction that one or more audio signals originate from. In some embodiments, DOA/Audio unit 112, 122 may determine, or be used to determine, the direction of a speaker in a meeting environment. For example, DOA/Audio unit 112, 122 may include a microphone array that may detect audio signals from different locations relative to main camera 110 and/or one or more peripheral cameras 120. DOA/Audio unit 112, 122 may use the audio signals from different microphones and determine the angle and/or location that an audio signal (e.g., a voice) originates from. Additionally, or alternatively, in some embodiments, DOA/Audio unit 112, 122 may distinguish between situations in a meeting environment where a meeting participant is speaking, and other situations in a meeting environment where there is silence. In some embodiments, the determination of a direction that one or more audio signals originate from and/or the distinguishing between different situations in a meeting environment may be determined by a unit other than DOA/Audio unit 112, 122, such as one or more sensors 130.

Main camera 110 and one or more peripheral cameras 120 may include a vision processing unit 113, 123. Vision processing unit 113, 123 may include one or more hardware accelerated programmable convolutional neural networks with pretrained weights that can detect different properties from video and/or audio. For example, in some embodiments, vision processing unit 113, 123 may use vision pipeline models to determine the location of meeting participants in a meeting environment based on the representations of the meeting participants in an overview stream. As used herein, an overview stream may include a video recording of a meeting environment at the standard zoom and perspective of the camera used to capture the recording.

A primary stream may include a focused, enhanced, or zoomed in, recording of the meeting environment. In some embodiments, the primary stream may be a sub-stream of the overview stream. As used herein, a sub-stream may pertain to a video recording that captures a portion, or sub-frame, of an overview stream. Furthermore, in some embodiments, vision processing unit 113, 123 may be trained to be not biased on various parameters including, but not limited to, gender, age, race, scene, light, and size, allowing for a robust meeting or videoconferencing experience.

As shown in FIG. 1, main camera 110 and one or more peripheral cameras 120 may include virtual director unit 114, 124. In some embodiments, virtual director unit 114, 124 may control a main video stream that may be consumed by a connected host computer 140. In some embodiments, host computer 140 may include one or more of a television, a laptop, a mobile device, or projector, or any other computing system. Virtual director unit 114, 124 may include a software component that may use input from vision processing unit 113, 123 and determine the video output stream, and from which camera (e.g., of main camera 110 and one or more peripheral cameras 120), to stream to host computer 140. Virtual director unit 114, 124 may create an automated experience that may resemble that of a television talk show production or interactive video experience. In some embodiments, virtual director unit 114, 124 may frame representations of each meeting participant in a meeting environment. For example, virtual director unit 114, 124 may determine that a camera (e.g., of main camera 110 and/or one or more peripheral cameras 120) may provide an ideal frame, or shot, of a meeting participant in the meeting environment. The ideal frame, or shot, may be determined by a variety of factors including, but not limited to, the angle of each camera in relation to a meeting participant, the location of the meeting participant, the level of participation of the meeting participant, or other properties associated with the meeting participant. More non-limiting examples of properties associated with the meeting participant that may be used to determine the ideal frame, or shot, of the meeting participant may include: whether the meeting participant is speaking, the duration of time the meeting participant has spoken, the direction of gaze of the meeting participant, the percent that the meeting participant is visible in the frame, the reactions and body language of the meeting participant, or other meeting participants that may be visible in the frame.

Multi-camera system 100 may include one or more sensors 130. Sensors 130 may include one or more smart sensors. As used herein, a smart sensor may include a device that receives input from the physical environment and uses built-in or associated computing resources to perform predefined functions upon detection of specific input, and process data before transmitting the data to another unit. In some embodiments, one or more sensors 130 may transmit data to main camera 110 and/or one or more peripheral cameras 120. Non-limiting examples of sensors may include level sensors, electric current sensors, humidity sensors, pressure sensors, temperature sensors, proximity sensors, heat sensors, flow sensors, fluid velocity sensors, and infrared sensors. Furthermore, non-limiting examples of smart sensors may include touchpads, microphones, smartphones, GPS trackers, echolocation sensors, thermometers, humidity sensors, and biometric sensors. Furthermore, in some embodiments, one or more sensors 130 may be placed throughout the meeting environment. Additionally, or alternatively, the sensors of one or more sensors 130 may be the same type of sensor, or different types of sensors. In other cases, sensors 130 may generate and transmit raw signal output(s) to one or more processing units, which may be located on main camera 110 or distributed among two or more cameras including in the multi-camera system. Processing units may receive the raw signal output(s), process the received signals, and use the processed signals in providing various features of the multi-camera system (such features being discussed in more detail below).

As shown in FIG. 1, one or more sensors 130 may include an application programming interface (API) 132. Furthermore, as also shown in FIG. 1, main camera 110 and one or more peripheral cameras 120 may include APIs 116, 126. As used herein, an API may pertain to a set of defined rules that may enable different applications, computer programs, or units to communicate with each other. For example, API 132 of one or more sensors 130, API 116 of main camera 110, and API 126 of one or more peripheral cameras 120 may be connected to each other, as shown in FIG. 1, and allow one or more sensors 130, main camera 110, and one or more peripheral cameras 120 to communicate with each other. It is contemplated that APIs 116, 126, 132 may be connected in any suitable manner such as—but not limited to—via Ethernet, local area network (LAN), wired, or wireless networks. It is further contemplated that each sensor of one or more sensors 130 and each camera of one or more peripheral cameras 120 may include an API. In some embodiments, host computer 140 may be connected to main camera 110 via API 116, which may allow for communication between host computer 140 and main camera 110.

Main camera 110 and one or more peripheral cameras 120 may include a stream selector 115, 125. Stream selector 115, 125 may receive an overview stream and a focus stream of main camera 110 and/or one or more peripheral cameras 120, and provide an updated focus stream (based on the overview stream or the focus stream, for example) to host computer 140. The selection of the stream to display to host computer 140 may be performed by virtual director unit 114, 124. In some embodiments, the selection of the stream to display to host computer 140 may be performed by host computer 140. In other embodiments, the selection of the stream to display to host computer 140 may be determined by a user input received via host computer 140, where the user may be a meeting participant.

Figure 2A:
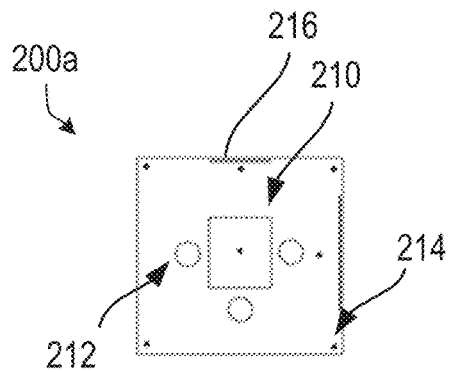
FIGS. 2A-2F are examples of meeting environments, consistent with some embodiments of the present disclosure.
Figure 2B:
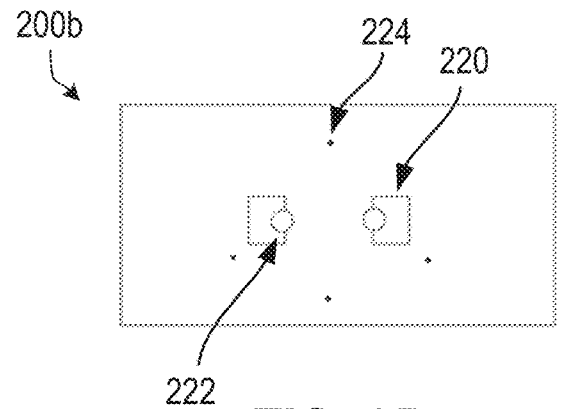
Figure 2C:
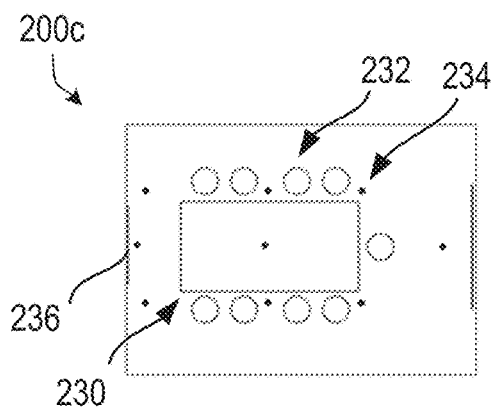
Figure 2D:
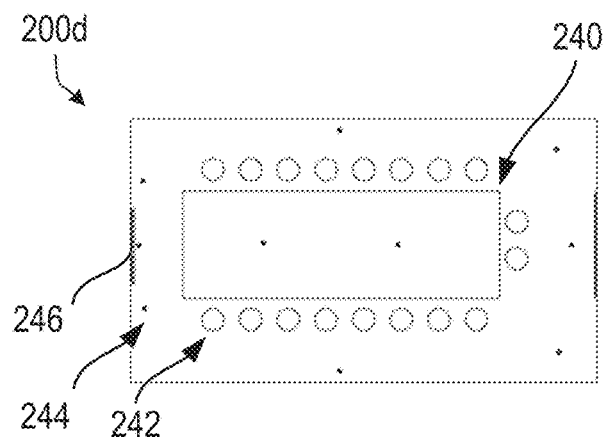
Figure 2E:
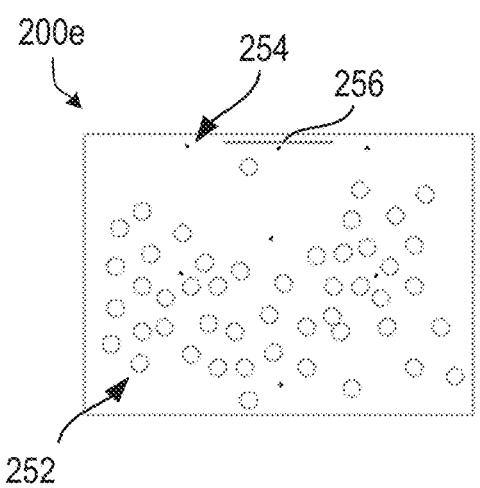
Figure 2F:
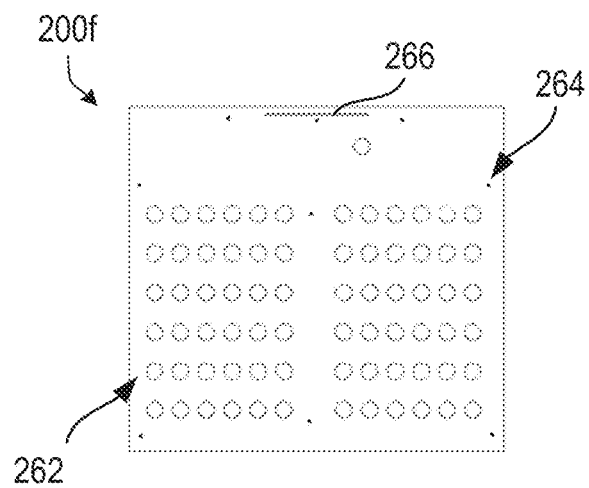

FIGS. 2A-2F include diagrammatic representations of various examples of meeting environments, consistent with some embodiments of the present disclosure. FIG. 2A depicts an example of a conference room 200a. Conference room 200a may include a table 210, three meeting participants 212, seven cameras 214, and a display unit 216. FIG. 2B depicts an example of a meeting room 200b. Meeting room 200b may include two desks 220, two meeting participants 222, and four cameras 224. FIG. 2C depicts an example of a videoconferencing space 200c. Videoconferencing space 200c may include a table 230, nine meeting participants 232, nine cameras 234, and two display units 226. FIG. 2D depicts an example of a board room 200d. Board room 200d may include a table 240, eighteen meeting participants 242, ten cameras 244, and two display units 246. FIG. 2E depicts an example of a classroom 200e. Classroom 200e may include a plurality of meeting participants 252, seven cameras 254, and one display unit 256. FIG. 2F depicts an example of a lecture hall 200f. Lecture hall 200f may include a plurality of meeting participants 262, nine cameras 264, and a display unit 266. Although particular numbers are used to make reference to the number of, for example, tables, meeting participants, cameras, and display units, it is contemplated that meeting environments may contain any suitable number of tables, furniture (sofas, benches, conference pods, etc.), meeting participants, cameras, and display units. It is further contemplated that the tables, meeting participants, cameras, and display units may be organized in any location within a meeting environment, and are not limited to the depictions herein. For example, in some embodiments, cameras may be placed "in-line," or placed in the same horizontal and/or vertical plane relative to each other. Furthermore, it is contemplated that a meeting environment may include any other components that have not been discussed above such as, but not limited to, whiteboards, presentation screens, shelves, and chairs. Names are given to each meeting environment (e.g., conference room, meeting room, videoconferencing space, board room, classroom, lecture hall) for descriptive purposes and each meeting environment shown in FIGS. 2A-2F is not limited to the name it is associated with herein.

In some embodiments, by placing multiple wide field of view single lens cameras that collaborate to frame meeting participants in a meeting environment as the meeting participants engage and participate in the conversation from different camera angles and zoom levels, the multi-system camera may create a varied, flexible and interesting experience. This may give far end participants (e.g., participants located further from cameras, participants attending remotely or via video conference) a natural feeling of what is happening in the meeting environment.

Disclosed embodiments may include a multi-camera system comprising a plurality of cameras. Each camera may be configured to generate a video output stream representative of a meeting environment. A first representation of a meeting participant may be included in a first video output stream from a first camera included in the plurality of cameras, and a second representation of a meeting participant may be included in a second video output stream from a second camera included in the plurality of cameras. As used herein, a meeting environment may pertain to any space where there is a gathering of people interacting with one another. Non-limiting examples of a meeting environment may include a board room, classroom, lecture hall, videoconference space, or office space. As used herein, a representation of a meeting participant may pertain to an image, video, or other visual rendering of a meeting participant that may be captured, recorded, and/or displayed to, for example, a display unit. A video output stream, or a video stream, may pertain to a media component (may include visual and/or audio rendering) that may be delivered to, for example, a display unit via wired or wireless connection and played back in real time. Non-limiting examples of a display unit may include a computer, tablet, television, mobile device, projector, projector screen, or any other device that may display, or show, an image, video, or other rendering of a meeting environment.

Referring to FIG. 3A, diagrammatic representation of a multi-camera system in a meeting environment 300, consistent with some embodiments of the present disclosure, is provided. Cameras 310a-c (e.g., a plurality of cameras) may record meeting environment 300. Meeting environment 300 may include a table 340 and meeting participants, such as meeting participants 330, 332. As shown in FIG. 3A, cameras 310a-c may capture portions of meeting environment 300 in their respective stream directions, such as stream directions 320a-c.

Referring to FIGS. 3B-3C, output streams 370a, 370b may include representations 380, 390 of a common meeting participant 360. For example, representation 380 may be included in an output stream 370*a* from camera 310*b* in stream direction 320*b*. Similarly, representation 390 may be included in an output stream 370*b* from camera 310*c* in stream direction 320*c*. As shown in FIG. 3A, cameras 310*b* and 310*c* may be located in different locations and include different stream directions 320*b*, 320*c* such that the output stream 370*a*, 370*b* from each camera 310*b*, 310*c* may include a different representation 380, 390 of the common, or same, meeting participant 360.

It is contemplated that, in some embodiments, output streams may display representations of more than one meeting participant, and the representations may include representations of the common, or same, meeting participant(s). It is further contemplated that, in some embodiments, output streams may include representations of different meeting participants. For example, in some embodiments, the output video streams generated by cameras 310*a*-*c* may include overview streams that include a wider or larger field of view as compared to the examples of FIGS. 3B and 3C. In some cases, e.g., the output streams provided by cameras 310*b* and 310*c* may include representations of meeting participant 360 together with representations of one or more (or all) of the other meeting participants included in the meeting environment (e.g., any or all of the participants positioned around table 340). From the overview video stream, a focused, primary video stream, such as those shown in FIGS. 3B and 3C may be selected and generated based on shot selection criteria, as discussed further below.

In some embodiments, the multi-camera system may comprise a video processing unit. In some embodiments, the video processing unit may include at least one microprocessor deployed in a housing associated with one of the plurality of cameras. For example, the video processing unit may include vision processing unit 113, 123; virtual director unit 114, 124; or both vision processing unit 113, 123 and virtual director unit 114, 124. Furthermore, in some embodiments, the video processing unit may be remotely located relative to the plurality of cameras. For example, and referring to FIG. 1, the video processing unit may be located in host computer 140. As another example, the video processing unit may be located on a remote server such as a server in the cloud. In some embodiments, the video processing unit may include a plurality of logic devices distributed across two or more of the plurality of cameras. Furthermore, the video processing unit may be configured to perform a method 400 of analyzing a plurality of video output streams and generating a primary video stream, as shown in FIG. 4.

Figure 4:
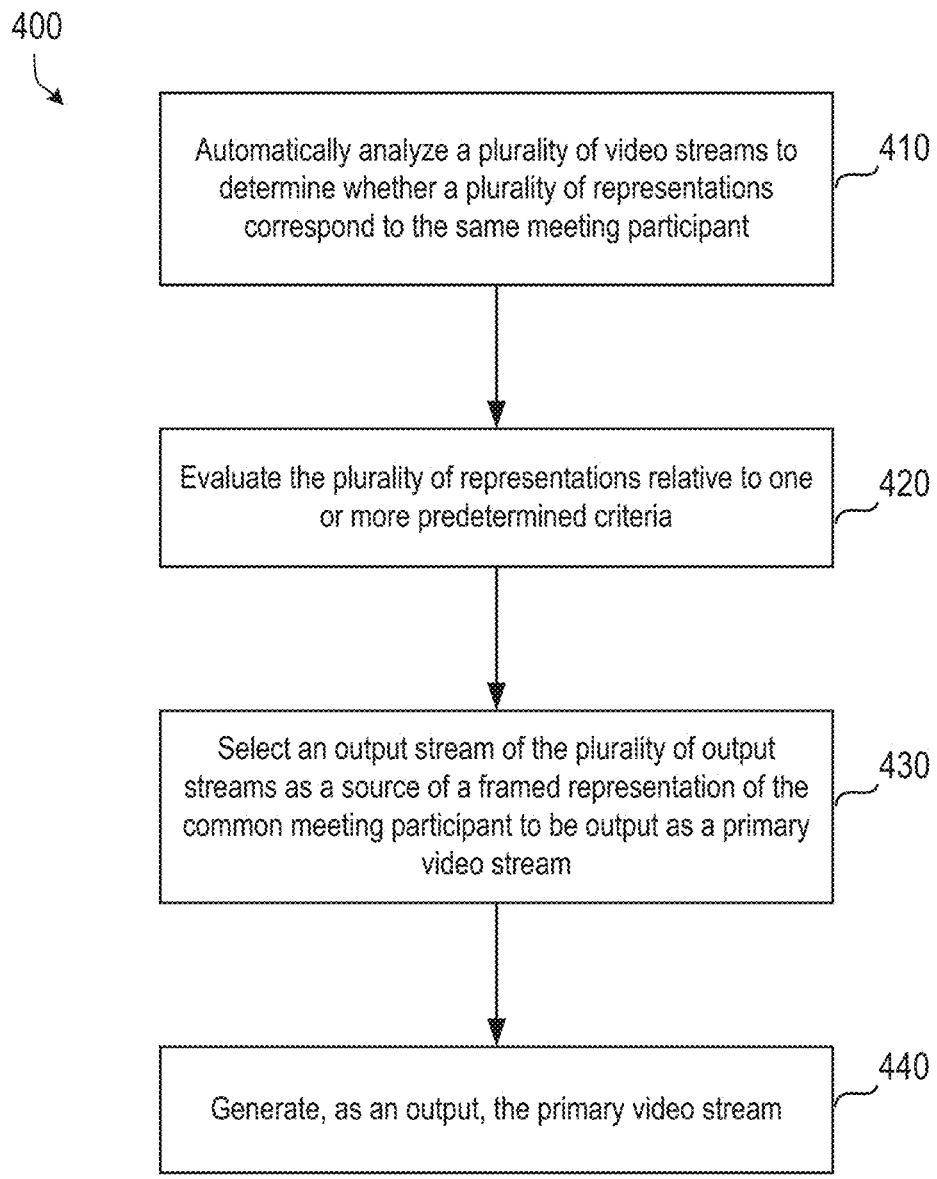
FIG. 4 is a flowchart of an example method of analyzing a plurality of video output streams and generating a primary video stream, consistent with some embodiments of the present disclosure.

Referring to FIG. 4, as shown in step 410, method 400 may include automatically analyzing a plurality of video streams to determine whether a plurality of representations, each representation included in a video stream among the plurality of video streams, correspond to the same meeting participant. For example, the video processing unit may be configured to automatically analyze the first video output stream and the second video output stream to determine whether the first representation of a meeting participant and the second representation of a meeting participant correspond to a common meeting participant (e.g., the same person). A common meeting participant may refer to a single particular meeting participant that is represented in the outputs of two or more output video streams. As an example, and referring to FIGS. 3A-C, a video processing unit (e.g., vision processing unit 113 and/or virtual director unit 114, a video processing unit located in host computer 140, etc.) may automatically analyze video output streams 370*a*, 370*b* to determine whether representations 380, 390 correspond to common meeting participant 360. A similar analysis can be performed relative to a plurality of output video streams that each include representations of multiple individuals. Using various identification techniques, the video processing unit can determine which individual representations across a plurality of camera outputs correspond to participant A, which correspond to participant B, which correspond to participant C, and so on. Such identification of meeting participants across the video outputs of multiple camera systems may provide an ability for the system to select one representation of a particular meeting participant over another representation of the same meeting participant to feature in the output of the multi-camera system. As just one example, in some cases and based on various criteria relating to the individual, interactions among meeting participants, and/or conditions or characteristics of the meeting environment, the system may select the representation 380 of meeting participant 360 over the representation 390 of meeting participant 360 to feature in the output of the multi-camera system.

The analysis for determining whether two or more meeting participant representations correspond to a common meeting participant may be based on at least one identity indicator. The identity indicator may include any technique or may be based on any technique suitable for correlating identities of individuals represented in video output streams. In some embodiments, the at least one identity indicator may include an embedding determined for each of the first representation and the second representation. As used herein, an embedding may include numerical representations of a video stream (e.g., one or more frames associated with output stream 370*a*, 370*b*), a section or segment of a video stream (e.g., sub-sections associated with one or more captured frames included in a video stream), an image, an area of a captured image frame including a representation of a particular individual, etc. In some cases the embedding may be expressed as a vector (e.g., a feature vector) of N dimension. For example, an embedding may include at least one feature vector representation. In the example of FIGS. 3B and 3C, the at least one identity indicator may include a first feature vector embedding determined relative to the first representation of the meeting participant (e.g., representation 380) and a second feature vector determined relative to the second representation of the meeting participant (e.g., representation 390).

The at least one feature vector representation may include a series of numbers generated based on features unique to the subject being represented. Factors that may contribute to the series of numbers generated may include, among many other things, eye color, hair color, clothing color, body outline, skin tone, eye shape, face shape, facial hair presence/color/type, etc. Notably, the generation of feature vectors are repeatable. That is, exposing the feature vector generator repeatedly to the same image or image section will result in repeated generation of the same feature vector.

Such embeddings may also be used as a basis for identification. For example, in a case where feature vectors are determined for each of individuals A, B, and C represented in a first image frame derived from a first camera output, those feature vectors may be used to determined if any of individuals A, B, or C are represented in a second image frame derived from the output of a second camera. That is, feature vectors may be generated for each of individuals X, Y, and Z represented in the second image frame. The distance between the various feature vectors, in vector space, may be determined as a basis for comparing feature vectors. Thus, while the feature vector determined for individual A may not be exactly the same as any one of the feature vectors generated for individuals X, Y, or Z, the A feature vector may be closely match one of the X, Y, or Z feature vectors. If the distance, for example, between the feature vector for individual A is within a predetermined distance threshold of the feature vector generated for individual Z, it may be determined that individual A in the first frame corresponds to individual Z in the second frame. Similar comparisons may be performed relative to the other meeting participants and for multiple frames from multiple different camera outputs. Based on this analysis, the system can: determine and track which individuals are represented in the outputs of which cameras; and also identify the various individuals across the available camera outputs. Such identification, correlation, and tracking may allow the system to compare available shots of a particular individual and select, based on various criteria, a particular shot of an individual over another shot of the individual to output as part of the camera system output.

Other types of identifiers or identification techniques may also be used to correlate representations of individuals across multiple camera outputs. Such alternative techniques may be used alone or in combination with the feature vector embedding approach or any other identification technique described herein. In some cases, the at least one identity indicator may include one or more of a body outline or profile shape, at least one body dimension, and/or at least one color indicator associated with an individual. Such techniques may be helpful relative to situations where one or more image frames include a representation of a face that is either not visible or only partially visible. As used herein, a body outline may pertain to the shape of a meeting participant's body. A profile shape may pertain to the shape of a meeting participant's body, face, etc. (or any subsection of a face or body) represented in an image frame. A body dimension may include, but is not limited to, height, width, or depth of any feature associated with a meeting participant's body. A color indicator may be associated with the color and/or shade of a representation of a meeting participant's skin, hair, eyes, clothing, jewelry, or any other portion of the meeting participant's body. It is contemplated that the at least one identity indicator may include any unique features of a meeting participant, such as unique facial features and/or body features.

The identifier/identification technique may be based on a series of captured images and corresponding analysis of streams of images. For example, in some embodiments, the at least one identity indicator may include tracked lip movements. For example, as shown in FIGS. 3B and 3C, both representation 380 and representation 390 may show that the mouth, or lips, of common meeting participant 360 is closed and/or not moving. The video processing unit may determine that the representations 380, 390 correspond to common meeting participant 360, fully or in part, by tracking the lip movements of common meeting participant 360 across corresponding series of captured images (e.g., a stream of images associated with the output of camera 310b and another stream of images associated with the output of camera 310c). The video processing unit may determine that the lips of common meeting participant 360 are closed and/or not moving in both representations 380, 390, and identify the common meeting participant 360 as a common meeting participant, as opposed to two different meeting participants. Further, the video processing unit may track detected movements of lips or mouths across different streams of images. Correspondence in time between lip and/or mouth movements represented across two or more image streams may indicate representations of a common meeting participant across the two or more image streams. As another example, if a first representation of a meeting participant shows lips moving and a second representation of a meeting participant shows lips that are not moving (or in a position different from the lips of the first representation), the video processing unit may determine that the first representation and the second representation correspond to two different meeting participants.

Techniques other than image analysis may also be useful in identifying common meeting participants across a plurality of camera outputs. For example, in some embodiments, an audio track may be associated with each camera output stream. An audio track may pertain to a stream of recorded sound or audio signals. For example, and referring to FIGS. 3A-3C, a first audio track may be associated with output stream 370a, and a second audio track may be associated with output stream 370b. The video processing unit may be configured to determine whether representations 380, 390 correspond to the common meeting participant 360 based on analysis of the first audio track and second audio track. Such analysis may be based on time sync analysis of audio signals and may also include time sync analysis with tracked lip/mouth movements available from image analysis techniques. Additionally, or alternatively, a single audio track may be associated with meeting environment 300, and the video processing unit may be configured to determine whether representations 380, 390 correspond to the common meeting participant 360 based on analysis of the single audio track in combination with tracked lip/mouth movements.

It is contemplated that the at least one identity indicator may include any combination of the non-limiting examples of identity indicators discussed previously. For example, the at least one identity indicator may include at least one embedding determined for each of the first representation (e.g., representation 380) and second representation (e.g., representation 390) and also at least one color indicator (e.g., hair color, eye color, skin color) associated with each of the first representation and second representation.

It is further contemplated that the video processing unit may determine that a first meeting participant representation and a second meeting participant representation do not correspond to a common meeting participant. For example, using any one or combination of the techniques described above, the video processing unit may determine that a first meeting participant representation and a second meeting participant representation correspond different meeting participants.

With information including which meeting participants are represented in which camera outputs, and which representations in those camera outputs correspond to which participants, the video processing unit can select a particular camera output for use in generated a feature shot of a particular meeting participant (e.g., a preferred or best shot for a particular meeting participant from among available representations from a plurality of cameras). The shot selection may depend on various criteria. For example, as shown in step 420 of FIG. 4, method 400 may include evaluating a plurality of representations of a common meeting participant relative to one or more predetermined criteria, which may be used in shot selection. The predetermined criteria may include—but are not limited to—a looking direction of the common meeting participant (e.g., head pose) determined relative to each of a first and second video output streams, and/or a face visibility score (e.g., associated with a face visibility level) associated with the common meeting participant determined relative to each of the first and second video output streams, and/or a determination of whether a meeting participant is speaking. It is contemplated that any or all of these criteria may be analyzed relative to any number of video output streams that include a representation of the common meeting participant. Shot selection, for example, may be based on any of these criteria alone or in any combination.

The common meeting participant may be detected as speaking based on an audio track including the voice of (or a voice originating from the direction of) the common meeting participant, and/or tracked lip movements. As used herein, a head pose may pertain to the degree that the head of a meeting participant is angled or turned, and/or the location of the head of the meeting participant relative to other anatomical body parts of the meeting participant (e.g., hand, arm, shoulders). A face visibility level may pertain to the percentage of the face of the meeting participant that is visible in a particular output stream (e.g., face visibility score).

As an example, and referring to FIGS. 3A-3C, a looking direction of common meeting participant 360 may be determined using the locations of cameras 310b, 310c and the location of common meeting participant 360. The relative distance and angle between cameras 310b, 310c and their stream directions 320b, 320c may be used to calculate the angle that a looking direction or profile of the face of common meeting participant 360 should be represented as in each output stream 370a, 370b. This calculation may be considered a predetermined criterion and may be used to evaluate the representations 380, 390 of common meeting participant 360. It is contemplated that the looking direction of common meeting participant, and/or the angle(s) associated with the looking direction, may be used for any suitable number of representations of common meeting participant 360 included in any number of video output streams from any number of cameras in the multi-camera system. In the examples of FIGS. 3B and 3C, meeting participant 360 has a looking direction of approximately 30 degrees relative to a normal to the capturing camera in FIG. 3B (meaning that the representation 380 of participant 360 is looking leftward of the capturing camera from the subject's frame of reference). In contrast, participant 360 in FIG. 3C has a looking direction of approximately 0 degrees relative to a normal to the capturing camera (meaning the representation 390 of participant 360 is looking directly at the capturing camera). In some cases, a looking direction of 0 degrees may be preferred over other looking directions. In other cases, a head pose providing an indirect gaze, such as the 30 degree head pose of FIG. 3B, may be preferred and may be used as the basis for a shot of participant 360.

Figure 5:
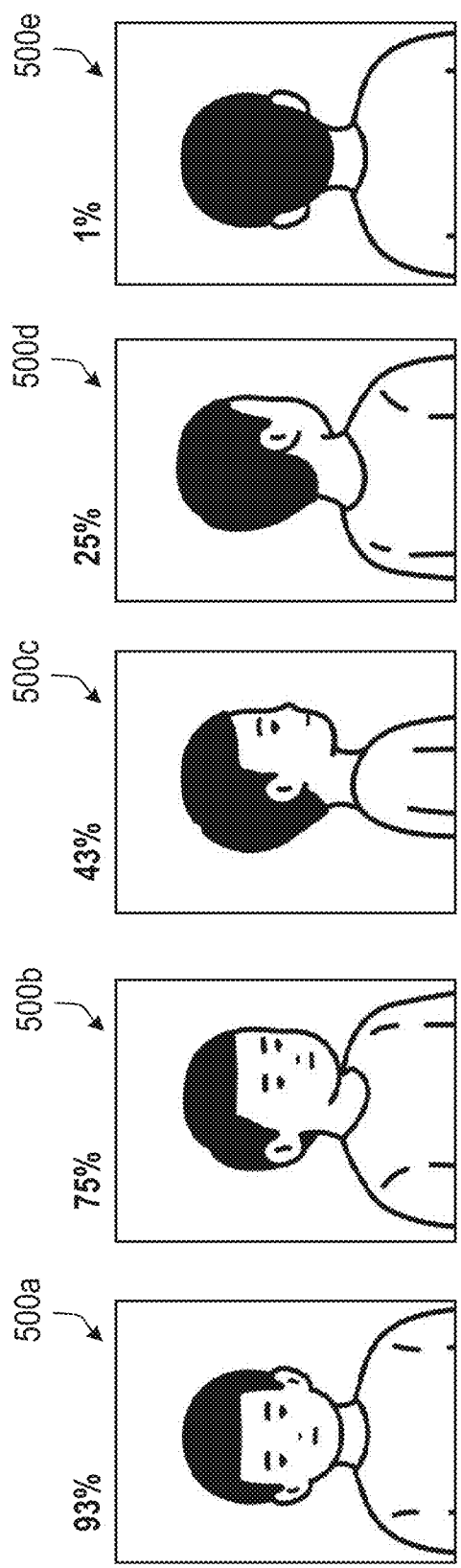
FIG. 5 is a depiction of face visibility scores, consistent with some embodiments of the present disclosure.

As another example, a face visibility score can be used to evaluate representations of a common meeting participant, which in turn, may be used as the basis for shot selection relative to a particular meeting participant. FIG. 5 provide several examples of an individual with varying head poses, resulting in various degrees of face visibility. Face visibility scores, consistent with some embodiments of the present disclosure, may be assigned to each of the different captured image frames. As shown in FIG. 5, a face visibility score may be determined based on the percentage of the face of a subject, or meeting participant, that can be seen in an output stream or frame. In some embodiments, the representations of the meeting participant may be shown in different output streams 500a-e. In other embodiments, the representations of the meeting participant may be representations of a meeting participant in different frames, or at different times, shown within a single output stream. Embodiments of the present disclosure may provide a face visibility score as a percentage of the face of a subject, or meeting participant, that is visible in a frame or output stream. As shown in FIG. 5, in output stream 500a, 93% of the face of the meeting participant may be visible. In output stream 500b, 75% of the face of the meeting participant may be visible. In output stream 500c, 43% of the face of the meeting participant may be visible. In output stream 500d, 25% of the face of the meeting participant may be visible. In output stream 500e, 1% of the face of the meeting participant may be visible. In some embodiments, the face visibility score may be a score between 0 and 1, or any other indicator useful in conveying an amount of a meeting participant face that is represented in a particular image frame or stream of image frames (e.g., an average face visibility score over a series of images captured from an output of a particular camera).

Evaluation of the shot selection criteria described above may enable the video processing unit to select a camera output from which to produce a desired shot of a particular meeting participant. Returning to FIG. 4, in step 430 method 400 may include selecting an output stream of the plurality of output streams to serve as a source of a framed representation of a common meeting participant represented in a plurality of camera outputs. The selected output stream can then be used as the basis for outputting a primary video stream featuring a framed representation of the common meeting participant (e.g., a desired shot of the common meeting participant). The framed shot of the primary video stream may include just a subregion of an overview video captured as a camera output. In other cases, however, the framed shot of the primary video stream may include the entirety of the overview video.

In one example, the video processing unit may be configured to select either the a video output stream or a second video output stream (e.g., from a first camera and a second camera, respectively) as a source of a framed representation of a common meeting participant. The framed representation may include a "close up" shot of the common meeting participant and may be output as a primary video stream. For example, referring to FIGS. 3A-C, the video processing unit may select the output associated with camera 310c and stream direction 320c as a source of a framed representation (e.g., desired shot) of common meeting participant 360. The output of camera 310c may be selected over the output of camera 310b, for example, based on any combination of the shot selection criteria described above. With the selected camera output, the video processing unit may then proceed to generate the framed representation of the common meeting participant as a primary video stream. In the example of FIG. 3C, the framed representation (desired shot) may include a sub-region of the output of camera 310c that features primarily the head/face of meeting participant 360. In other cases, meeting participant 360 may be shown in the primary video stream in combination with representations of one or more other meeting participants and/or one or more objects (e.g., whiteboards, microphones, display screens, etc.).

Figure 6:
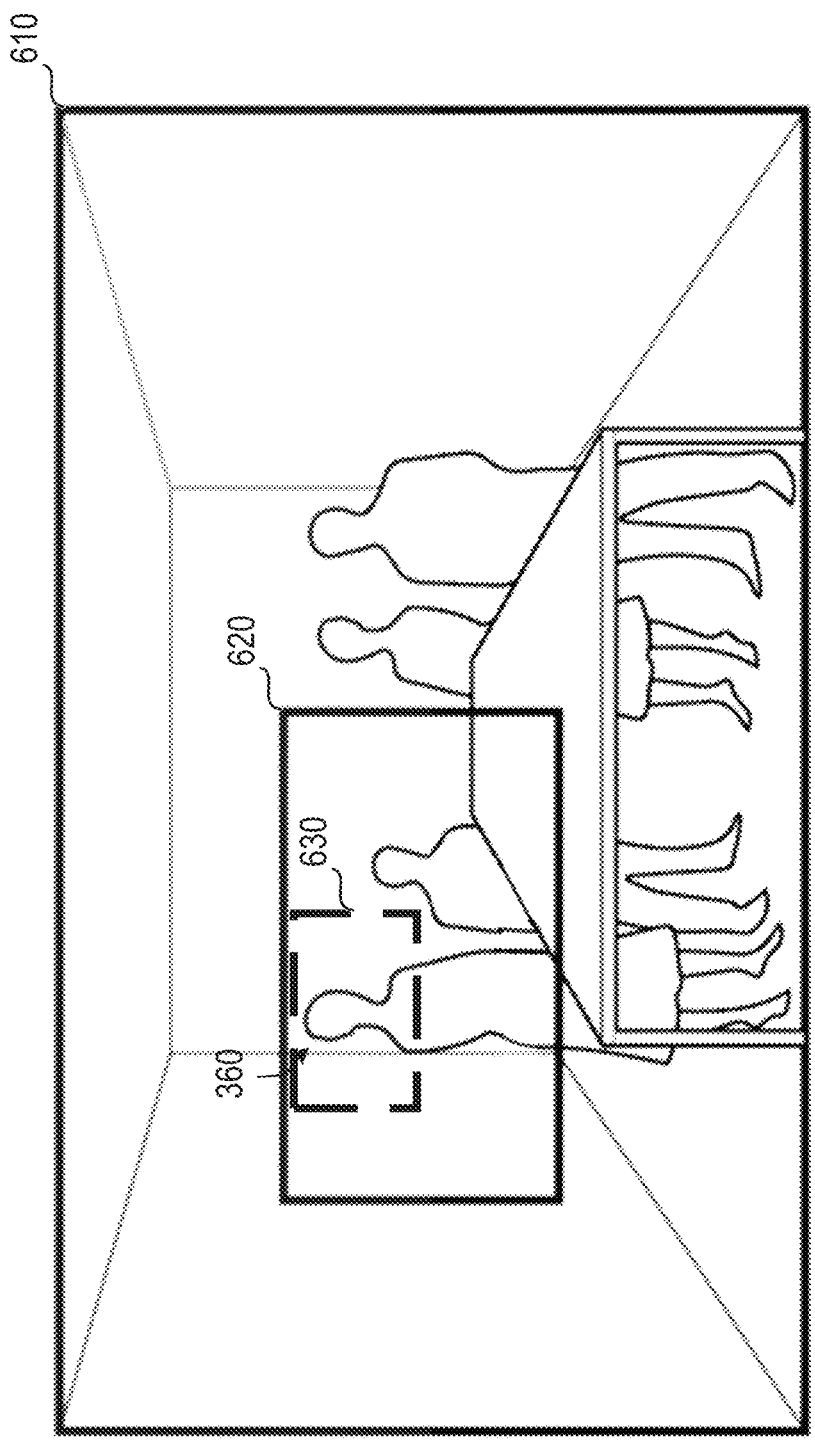
FIG. 6 is an illustration of an overview stream, output stream, and framed representation, consistent with some embodiments of the present disclosure.

FIG. 6 provides a diagrammatic representation of the relationship between an overview video stream and various sub-frame representations that may be output in one or more primary video streams. For example, FIG. 6 represents an overview stream 610. Based on the overview video, various sub-frame videos may be generated to feature one or more of the meeting participants. A first sub-frame representation includes two meeting participants and may be output by the multi-camera system as primary video stream 620. Alternatively, a second sub-frame representation includes only one meeting participant (i.e., participant 360) and may be output by the multi-camera system as primary video stream 630. As shown in FIG. 6, common meeting participant 360 may be represented in both primary video output stream 620 and in primary video output stream 630. Whether the video processing unit generates primary video output stream 620 or primary video output stream 630 as the output of the camera system may depend on the shot selection criteria described above, the proximity of meeting participant 360 to other meeting participants, detected interactions between meeting participant 360 and other participants, among other factors.

In some embodiments, and referring to the example of FIGS. 3B and 3C, output stream 610 may correspond with an overview output stream obtained from camera 310c. The video processing unit may select output stream 610 from camera 310c based on shot selection criteria, such as a face visibility score, a head pose, whether meeting participant 360 is detected as speaking, etc. Output stream 610 may be selected over other camera outputs, such as the output from cameras 310b or 310a, for example, based on a determination that meeting participant is facing camera 310c (e.g., based on a determination that meeting participant 360 has a higher face visibility score relative to camera 310c versus other cameras, such as cameras 310a or 310b). As a result, a subframe representation as shown in FIG. 3C may be generated as the primary output video 630 in this particular example.

In some embodiments, a camera among the plurality of cameras, may be designated as a preferred camera for a particular meeting participant. For example, a first or second camera associated with a selected first or second video output stream may be designated as a preferred camera associated with a common meeting participant. Referring to FIGS. 3A-3C, camera 310c, associated with output stream 370b, may be designated as the preferred camera associated with common meeting participant 360. Thus, in some embodiments, when common meeting participant 360 is determined to be speaking, actively listening, or moving, output stream 370b may be used as the source of the primary video stream. In some embodiments, the common meeting participant may be centered in an output associated with the preferred camera. In such cases, the preferred camera may be referred to as the "center" camera associated with a particular meeting participant.

As shown in step 440 of FIG. 4, method 400 may include generating, as an output, the primary video stream. For example, the video processing unit may be configured to generate, as an output of the multi-camera system, the primary video stream. In some embodiments, the generated primary video stream may include the framed representation of the common meeting participant. Referring to FIG. 6, the primary video stream may include framed representation 630 of common meeting participant 360, and the primary video stream may be transmitted to or displayed on a display unit (e.g., host computer 140; display unit 216, 236, 246, 256, 266).

In some embodiments, the common meeting participant may be determined to be speaking, listening, or reacting. Such characteristics of the meeting participant may be used in determining whether and when to feature the meeting participant in the primary video output generated by the multi-camera system. The common meeting participant may be determined to be speaking based on, for example, audio track(s) and/or tracked lip movements. In some embodiments, the common meeting participant may be determined to be listening based on, for example, a head pose (e.g., tilted head), a looking direction (e.g., looking at a meeting participant that is speaking), a face visibility score (e.g., percentage associated with looking in the direction of a meeting participant that is speaking), and/or based on a determination that the meeting participant is not speaking. Furthermore, in some embodiments, the common meeting participant may be determined to be reacting based on a detected facial expression associated with an emotion such as, but not limited to, anger, disgust, fear, happiness, neutral, sadness, or surprise. The emotion or facial expression of a meeting participant may be identified using a trained machine learning system, such as a neural network. As used herein, a neural network may pertain to a series of algorithms that mimic the operations of an animal brain to recognize relationships between vast amount of data. As an example, a neural network may be trained by providing the neural network with a data set including a plurality of video recordings or captured image frames, wherein the data set includes images representative of emotions of interest. For a particular image, the network is penalized for generating an output inconsistent with the emotion represented by the particular image (as indicated by a predetermined annotation, for example). Additionally, the network is rewarded each time it generates an output correctly identifying an emotion represented in an annotated image. In this way, the network can "learn" by iteratively adjusting weights associated with one or models comprising the network. The performance of the trained model may increase with the number of training examples (especially difficult case examples) provided to the network during training.

As noted above, multiple meeting participants may be tracked and correlated across the outputs generated by two or more cameras included in the described multi-camera systems. In some embodiments, a meeting participant may be tracked and identified in each of a first, second, and third video output stream received from first, second, and third cameras, respectively, among a plurality of cameras included in a multi-camera system. In such an example, the video processing unit may be configured to analyze the third video output stream received from the third camera, and based on evaluation of at least one identity indicator (as described above), may determine whether a representation of a meeting participant included in the third video stream corresponds to a common meeting participant represented in the outputs of the first and second cameras. For example, referring to FIGS. 3A-3C, a third representation (not shown) of common meeting participant 360 may be included in a third output stream from camera 310a. The video processing unit may analyze the third output stream and determine that the third representation corresponds to common meeting participant 360. In this way, the described systems may correlate and track a single meeting participant across three or more camera outputs.

Using similar identification techniques, the described systems can track multiple different meeting participants across multiple camera outputs. For example, the describe system may receive an output from a first camera and an output from a second camera where both of the outputs include representations of a first and a second meeting participant. Using disclosed identification techniques, the video processing unit may correlate the first and second representations with the first and second meeting participants. In example the first and second camera outputs may also include representations of one or more other meeting participants (e.g., a third representation of a meeting participant included in the first video output stream from the first camera and a fourth representation of a meeting participant included in the second video output stream from the second camera). The video processing unit may be further configured to analyze the first video output stream and the second video output stream, based on the at least one identity indicator, to determine whether the third representation of a meeting participant and the fourth representation of a meeting participant correspond to another common meeting participant (e.g., a common meeting participant different from both the first and second meeting participants).

Based on a determination that the first and second camera outputs each include representations of three common meeting participants (e.g., meaning that a representation of each of the three common meeting participants appears in both the output from the first camera and the output of the second camera), the video processing unit can select the first camera or second camera as the source of a primary video stream featuring any of the first, second, or third common meeting participants. In other words, the video processing unit may be configured to evaluate the third representation and the fourth representation of the another common meeting participant (e.g., the representations of the third common meeting participant included in the outputs of the first and second camera outputs) relative to one or more predetermined shot selection criteria. Based on the shot selection evaluation, the video processing unit may select either the first video output stream or the second output stream as a source of a framed representation of the another common meeting participant (e.g., the third common meeting participant) to be output as an alternative primary video stream. The video processing unit may be configured to generate, as an output of the multi-camera system, the alternative primary video stream including the framed representation of the another/third common meeting participant. The alternative primary video stream may be a video stream that is shown in addition to, or alternative to, the first primary video stream. As an example, referring to FIGS. 3A-3C, output stream 370a may be selected as the source of the alternative primary video stream based on the evaluation of the representations (not shown) of the second meeting participant 332 shown in output streams 370a, 370b.

In the example of FIGS. 3B and 3C, only a single meeting participant is shown in the primary video output. In some cases, however, multiple meeting participants may be shown together in a single primary video output. For examples, in some conditions, a first common meeting participant and a second common meeting participant may both be shown together in a primary video stream. Such conditions may include whether the first and second meeting participants are determined to both be speaking, actively engaged in a back and forth conversation, looking at each other, etc. In other cases, whether to include both the first and second meeting participant together in the same primary video output stream may depend on other criteria, such as a physical distance between the two meeting participants, a number of interleaving meeting participants located between the first and second meeting participants, etc. For example, if a number of interleaving meeting participants between a first common meeting participant and a second common meeting participant is four or less and/or if a distance between the first common meeting participant and the second common meeting participant is less than two meters, then the first and second meeting participants may be shown together in the same primary video output stream. Where more than four meeting participants separate the first and second meeting participants and/or where the first and second meeting participants are separated by more than 2 meters, for example, the first and second meeting participants may be featured alone in respective primary video output streams.

Figure 7A:
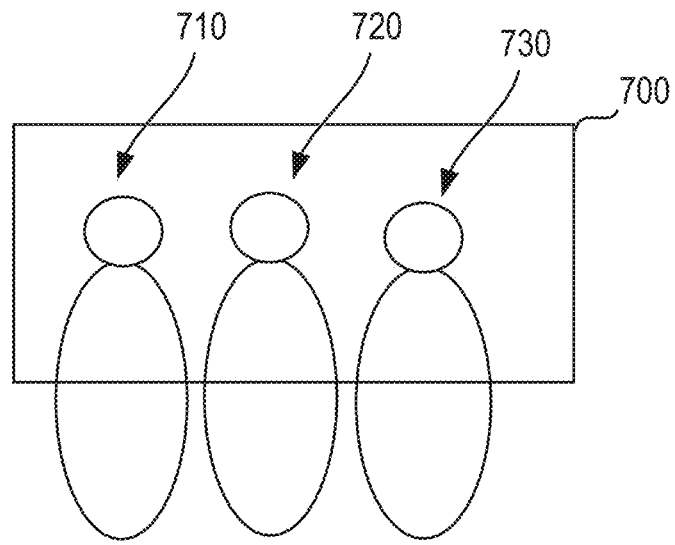
FIGS. 7A and 7B are examples of a primary video stream, consistent with some embodiments of the present disclosure.
Figure 7B:
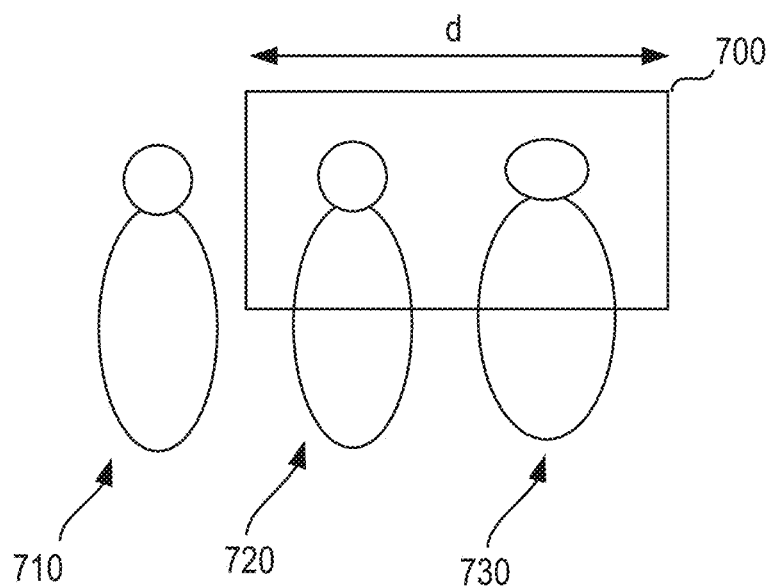

FIGS. 7A and 7B are examples of primary video streams that may be generated as output of the described multi-camera systems. As shown in FIG. 7A, a first common meeting participant 710, a second common meeting participant 720, and a third common meeting participant 730 may all be shown together in a primary video output stream 700. In this example, first common meeting participant 710 and third common meeting participant 730 may be shown together, as the number of interleaving meeting participants between them is four or less (or less than another predetermined interleaving participant threshold) and/or because the distance between them is less than 2 meters (or less than another predetermined separation threshold distance). In the example of FIG. 7B, second common meeting participant 720 and third common meeting participant 730 are shown together in primary video stream 700, but first common meeting participant 710 is excluded. Such a framing determination may be based on a determination that first common meeting participant 710 and third common meeting participant 730 are separated by more than a threshold distance d. It should be noted that other shot selection criteria may also be relied upon for featuring participants 720 and 730 together while excluding participant 710. For example, participants 720 and 730 may be determined as speaking to one another, looking at one another, or interacting with one another in other ways, while participant 710 is determined as not speaking or otherwise engaging with participants 720 and 730.

The following sections describe examples of various shot selection scenarios and corresponding primary video outputs. In one example, the video processing unit may be configured to determine whether a first common meeting participant or a second common meeting participant (e.g., a common meeting participant corresponding to a meeting participant featured in two or more camera output video streams) is speaking. Further, the video processing unit may be configured to generate, based on the determination of whether the first or second common meeting participant is speaking, a first primary video stream as an output of the multi-camera system if the first common meeting participant is determined to be speaking and generate a second (alternative) primary video stream as an output of the multi-camera system if the second common meeting participant is determined to be speaking. The first primary video stream may feature the first common meeting participant and the second/alternative primary video stream may feature the second common meeting participant.

Additionally, or alternatively, the video processing unit may also be configured to, based on the speaking participant determination, generate the primary video stream as an output of the multi-camera system if the first common meeting participant is determined to be not speaking and generate the second/alternative primary video stream as an output of the multi-camera system if the second common meeting participant is determined to be not speaking. These options may be useful, for example, for providing listener shots featuring either the first or second common meeting participant. Such video output may enable showing meeting participants that may be actively listening or otherwise reacting to a meeting participant that is speaking.

In some embodiments, the determination of whether the first common meeting participant or the second common meeting participant is speaking may be based on directional audio information received at the video processing unit from one or more directional microphones. As discussed with respect to FIG. 1, DOA/Audio unit 112, 122 may include a microphone array that may detect audio signals from different locations relative to main camera 100 and/or one or more peripheral cameras 120. DOA/Audio unit 112, 122 may use the audio signals from different microphones and determine the angle and/or location that an original of an audio signal (e.g., a voice) originates.

Additionally, or alternatively, in some embodiments, the determination of whether the first common meeting participant or the second common meeting participant is speaking may be based on an output of a trained network, such as a neural network, configured to detect voice activity based on input including one or more captured images or one or more audio signals. Voice activity may include the location of origin, decibel level, and/or pitch of an audio signal that corresponds to a voice or audio track. In some embodiments, the voice processing unit may be configured to associate a voice or audio track with a particular meeting participant. The association may be based on, for example, a location of origin or a pitch of an audio signal. Furthermore, in some embodiments, the determination of whether the first common meeting participant or the second common meeting participant is speaking may be based on lip movement detection across a plurality of captured image frames.

In some embodiments, the output of the multi-camera system may further include an overview video stream including a representation of the first common meeting participant along with one or more other meeting participants. For example, referring to FIG. 6, the output of the multi-camera system may include overview stream 610, which may include common meeting participant 360 along with one or more other meeting participants. As another example, referring to FIGS. 7A-7B, meeting participant 720 may be shown with meeting participant 710 and meeting participant 730 in an overview shot, as shown in FIG. 7A. Alternatively, meeting participant 720 may be shown with meeting participant 730 but not first meeting participant 710 in another type of overview shot. In some cases, the overview shot output from the camera system may be commensurate with the output of any one of the plurality of cameras included in the camera system.

Multiple outputs of the multi-camera system may be shown together on a single display. For example, in some embodiments, an overview video stream may be output from the camera system along with one or more primary video streams, and the overview video stream and any of the one or more primary video streams may be shown in respective tiles on a display. In yet other embodiments, the output of the multi-camera system may multiple primary video streams for inclusion in respective tiles to be shown on a display. In one example, the output of the multi-camera system may include an overview video stream captured by a first camera, a first primary video stream captured from a second camera and featuring a meeting participant determined to be speaking, and a second primary video stream captured from a third camera and featuring a meeting participant determined to be listening or otherwise reacting to the speaking meeting participant. The overview video stream, the first primary video stream, and the second primary video stream may all be featured simultaneously in different tiles shown on a display. Any number of additional tiles may be included to feature additional primary video streams. Further, a tile layout and or a timing associated with displayed tiles may be varied such that in some cases, a first primary video output stream is shown on the display together with a second primary video output stream, and in other cases the first primary video output stream may be alternatingly shown on the display relative to the second primary video output stream.

As used herein, a tile may refer to a section of a display unit (e.g., a square, rectangle, or other shaped region) in which a video output stream may be displayed. A plurality of video streams may be displayed on a display unit (e.g., tablet, mobile device, television), where each video stream is included in a respective tile, and the collection of tiles may form a gallery view. As used herein, a gallery view may pertain to the simultaneous display of a plurality of video streams and/or system outputs on a display unit. As an example, a first primary video stream and a second primary video stream may be shown in respective tiles on a display. In another example, a first primary video stream, a second primary video stream, and an overview stream may be shown in respective tiles on a display. In some embodiments, a primary video stream may be generated for each meeting participant in a meeting environment, and the generated primary video streams may be shown in respective tiles on a display (e.g., showing each meeting participant in a tile on the display).

As noted, the timing used to show various video outputs may be varied. In some examples, the output of a multi-camera system may be alternated between a first primary video stream and a second primary video stream. Alternatively, the output of the multi-camera system may include a plurality of video outputs (e.g., one or more overview video outputs and one or more primary video outputs), and the particular outputs selected for showing on a display may be varied (e.g., alternated from one to another). It is contemplated that an output of the system (or video output selection) may be alternated between a first primary video stream and a second primary video stream, between a first primary video stream and any of a second, third, or other primary video stream, between a first primary video stream and an overview video stream, or any other combination of video outputs.

The alternation between the primary video stream and the alternative primary video stream may include any suitable type of transition. In some examples, the transition between video stream outputs may include a hard cut transition or a smooth transition. A hard cut transition may include an immediate (or near immediate) transition from a first video stream to a second video stream. The hard cut transition may involve little to no smoothing between video signals. A smooth transition may include processing to blend, fade, etc. from one video stream to another video stream. In some cases, the smooth transition may involve a non-liner transition (e.g., a transition where the associated frame changes occur slowly at first and accelerate from a frame associated with a first video stream to a frame associated with a second video stream). In some embodiments, the alternation between the primary video stream and the alternative primary video stream may be based on whether the common meeting participant or the another common meeting participant is determined to be speaking (e.g., speaker shot) or listening (e.g., listener shot). That is, the transition from one video stream to another may be based on a determination that a first meeting participant has started speaking (which may be used to initiate a transition to a video output feature the first meeting participant) and/or based on a determination that a second meeting participant has stopped speaking.

The disclosed embodiments may also make use of "over the shoulder" shots. Such shots may be shown in a primary video stream including a representation of a face of a first meeting participant together with a representation of at least a portion of a back of a head of a second meeting participant. Such a shot may be used a contrast from other multi-participant shots, such as the shot of FIG. 7B in which a primary video stream may include a representation of a face of both a first meeting participant and a representation of at least a face of a second meeting participant. While the over the shoulder shot may not show a face of the second participant (or at least not a significant portion of the face), this type of shot can convey a significant amount of information to a viewer. For example, the over the shoulder shot may represent an interaction between two participants engaged in a direct dialogue (and may convey to the viewer precisely who is involved in the conversation), may indicate a reaction by the listener (the second participant) to the speaker (the first participant), and/or may convey other information associated with body language of the participants.

In other examples, a primary video stream may include a group shot where multiple meeting participants are featured together in a single frame. In some cases, two or more of the participants may be facing one another to form an over the shoulder arrangement, while one or more additional participants may be facing in a common direction with other meeting participants. In some examples, a primary video stream may include representations of faces of each of three different common meeting participants (e.g., primary video stream 700 in FIG. 7A).

Figure 8:
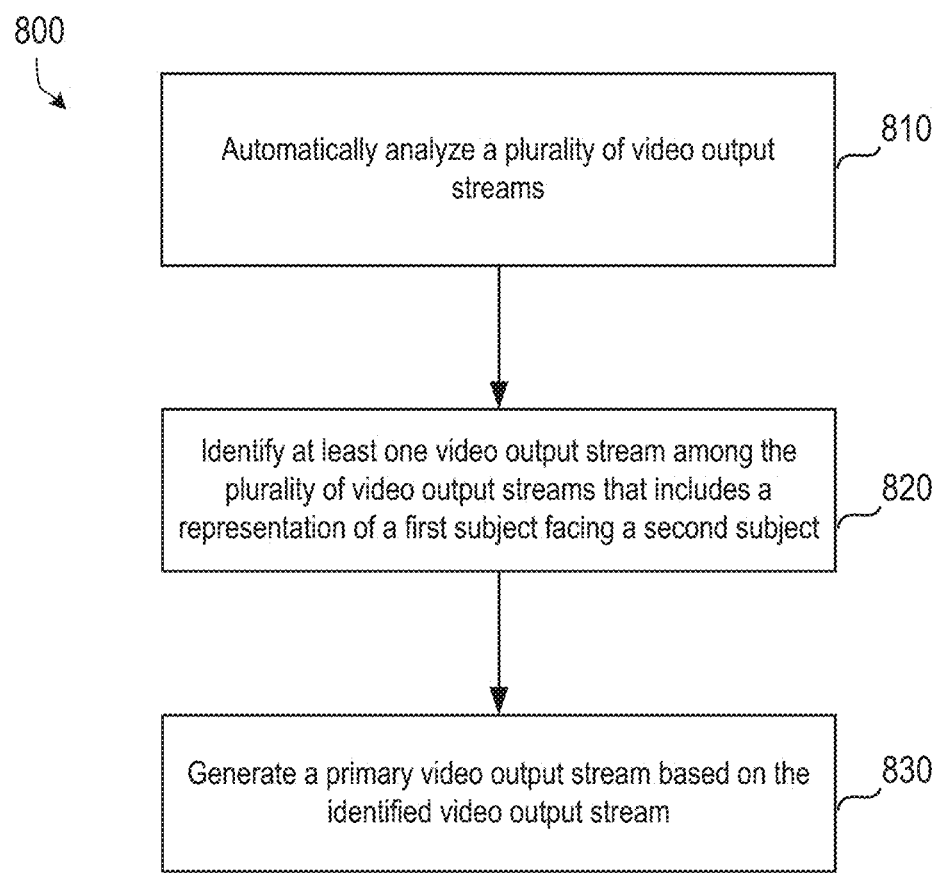
FIG. 8 is a flowchart of another example method of analyzing a plurality of video output streams and generating a primary video stream, consistent with some embodiments of the present disclosure.

FIG. 8 is a flowchart of another example method 800 of analyzing a plurality of video output streams and generating a primary video stream, consistent with some embodiments of the present disclosure. In some embodiments, a video processing unit may be configured to perform method 800.

As shown in step 810 of FIG. 8, method 800 may include automatically analyzing a plurality of video output streams. For example, a video processing unit may be configured to automatically analyze a plurality of video output streams received from the plurality of cameras. Each of the plurality of cameras of the multi-camera system may be configured to generate a video output stream representative of a meeting environment.

As shown in step 820 of FIG. 8, method 800 may further include identifying at least one video output stream among the plurality of video output streams that includes a representation of a first subject facing a second subject. For example, a video processing unit may be configured to, based on the analysis, identify at least one video output stream among the plurality of video output streams that includes a representation of a first subject facing a second subject. In some embodiments, the first subject may be an active speaker or presenter. Additionally, or alternatively, in some embodiments, the face of the first subject may be visible in the identified video output stream. Furthermore, in some embodiments, at least a portion of a back of a shoulder of the second subject may be visible in the identified video output stream. As used herein, an active speaker may pertain to a subject or meeting participant that is speaking at the time of identification.

As shown in step 830 of FIG. 8, method 800 may include generating a primary video output stream based on the identified video output stream. For example, a video processing unit may be configured to generate a primary video stream based on the identified video output stream. In some embodiments, the primary video stream may include a framed composition including representations of at least the face of the first subject and the at least the portion of the back of the shoulder of the second subject. As used herein, a framed composition may include a subframe of a video output stream that may include more than one subject, meeting participant, or object. In some embodiments, at least a portion of the back of the head of the second subject may also be visible in the identified video output stream.

Figure 9:
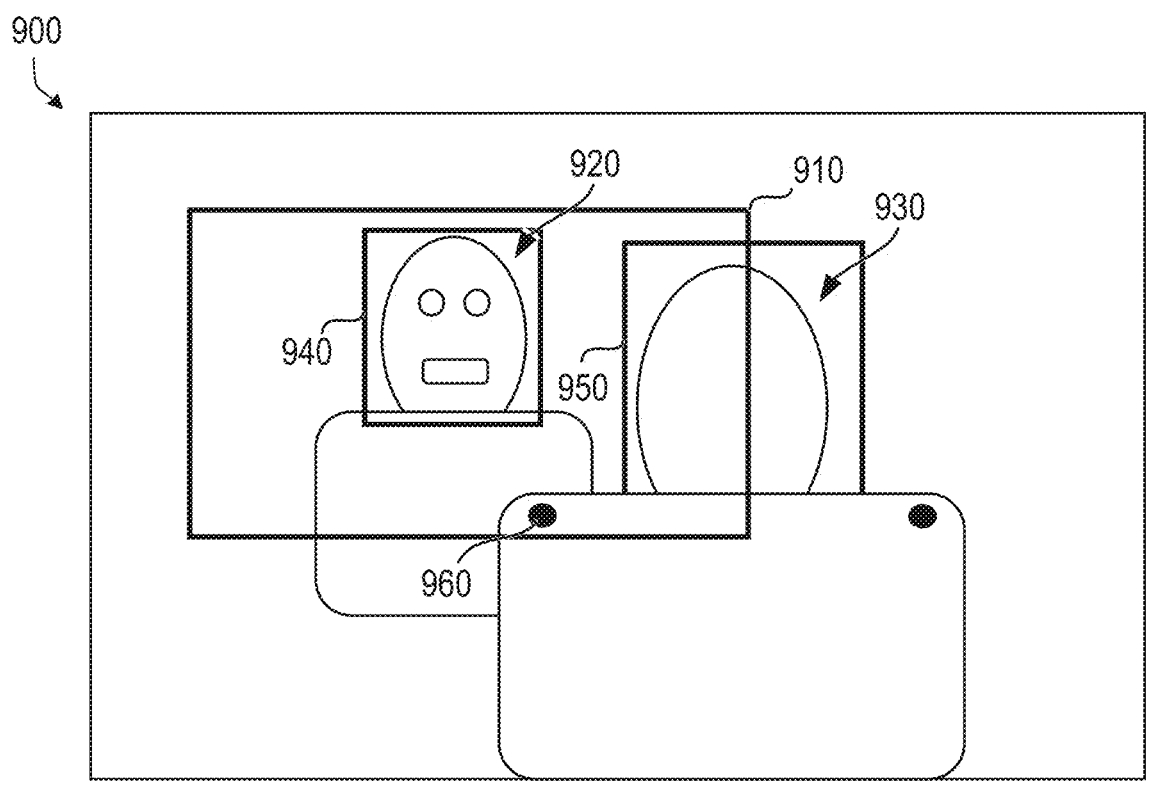
FIG. 9 is an example of a framed composition in an identified video output stream, consistent with some embodiments of the present disclosure.

FIG. 9 is an example of a framed composition 910 in an identified video output stream 900, consistent with some embodiments of the present disclosure. Composition 910 is representative of an over the shoulder shot as described above. For example, framed composition 910 may include a representation of the face of first subject 920 and a portion of the back of the shoulder of second subject 930. Furthermore, as shown in FIG. 9, framed composition 910 may optionally include a representation of a portion of the back of the head of second subject 930. In some embodiments, framed composition 910 may be included in the primary video stream.

In some embodiments the framed composition may be determined based on one or more of a head box, head pose, or shoulder location. As used herein, a head box may refer to a frame or box identifying the head of a subject. Referring to FIG. 9, head boxes 940, 950 of subjects 920, 930 are shown. Additionally, or alternatively, as shown in FIG. 9, a shoulder location 960 of second subject 930 may be used in determining a framed composition 910 associated with an over the shoulder shot.

As noted in the sections above, identification of a video output stream to be featured on a display may be determined based on an evaluation of a plurality of output streams from a plurality of cameras. At least a portion of the plurality of output streams (e.g., two or more of the output streams) may include representations of a first meeting participant. The identified video stream may be selected based on one or more predetermined criteria (e.g., shot selection criteria). Predetermined criteria may include—but are not limited to—a looking direction of the first meeting participant as represented in the plurality of output streams and/or a face visibility score associated with the first meeting participant as represented in the plurality of output streams, etc. Referring to FIG. 9, first subject 920 may be determined to be looking at second subject 930. This may be indicative of a dialogue or conversation taking place between first subject 920 and second subject 930. Furthermore, the representation of first subject 920 in identified output stream 900 may include a face visibility score of 93%, and the representation of second subject 930 in identified output stream 900 may include a face visibility score of 1%. This may indicate that first subject 920 and second subject 930 are facing each other, and that output stream 900 can be used to capture dialogue or a conversation between first subject 920 and second subject 930.

The following sections introduce additional features, description, and techniques related to the multi-camera systems and/or to the various features described above. Any of these additional features, techniques, and/or structures may be used together in combination with any of the multi-camera systems or features of the multi-camera systems discussed in the sections above.

Figure 10:
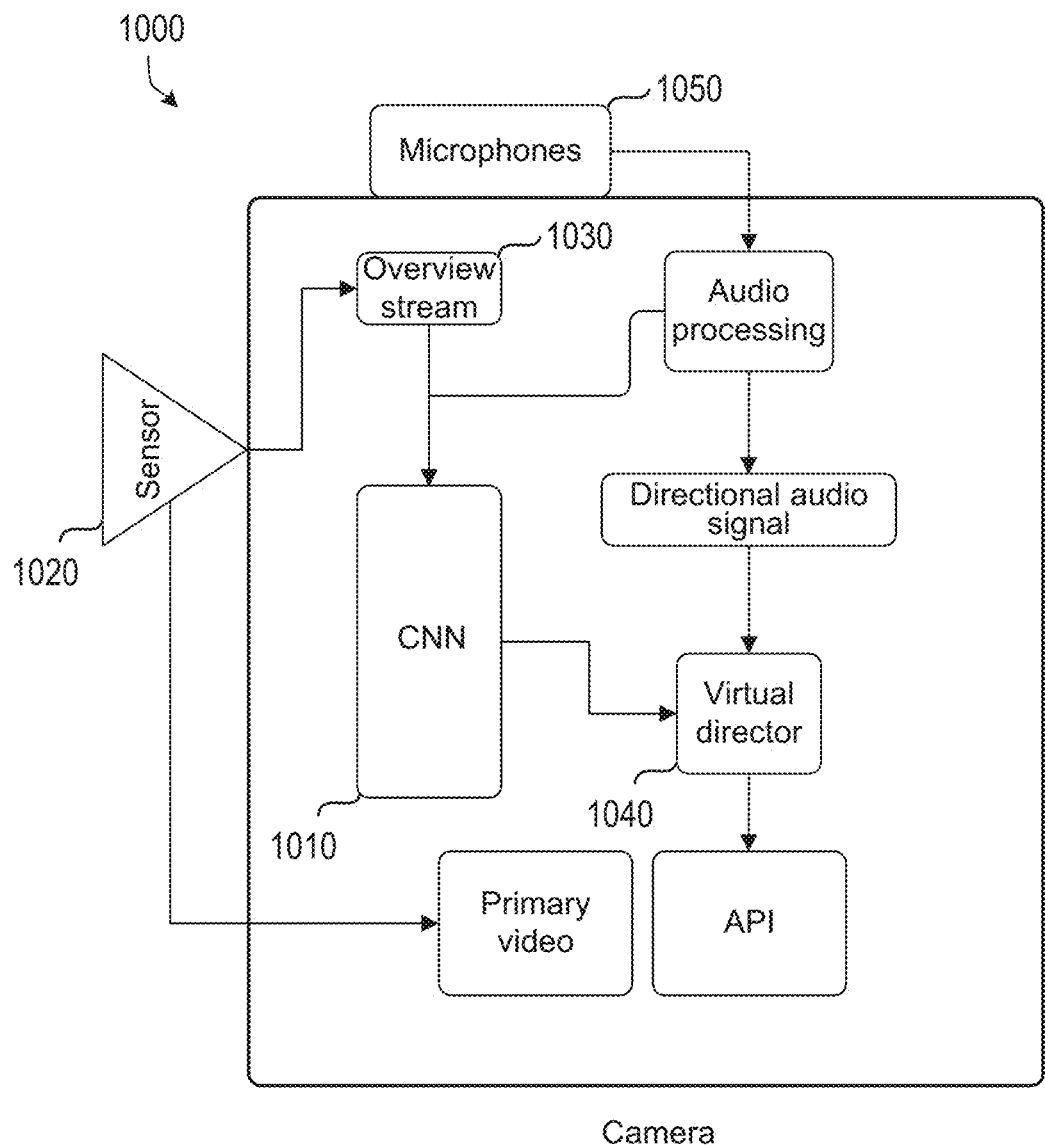
FIG. 10 is a diagrammatic representation of a camera including a video processing unit, consistent with some embodiments of the present disclosure.

FIG. 10 is a diagrammatic representation of a camera 1000 including a video processing unit 1010. As shown in FIG. 10, a video processing unit 1010 may process the video data from a sensor 1020. Furthermore, video processing unit 1010 may split video streams, or video data, into two streams. These streams may include an overview stream 1030 and an enhanced and zoomed video stream (not shown). Using specialized hardware and software, the camera 1000 may detect the location of meeting participants using a wide-angle lens (not shown) and/or high resolution sensor, such as sensor 1020. Furthermore, in some embodiments, camera 1000 may determine-based on head direction(s) of meeting participants-who is speaking, detect facial expressions, and determine where attention is centered based on head direction(s). This information may be transmitted to a virtual direction 1040, and the virtual director 1040 may determine an appropriate video settings selection for video stream(s).

Figure 11:
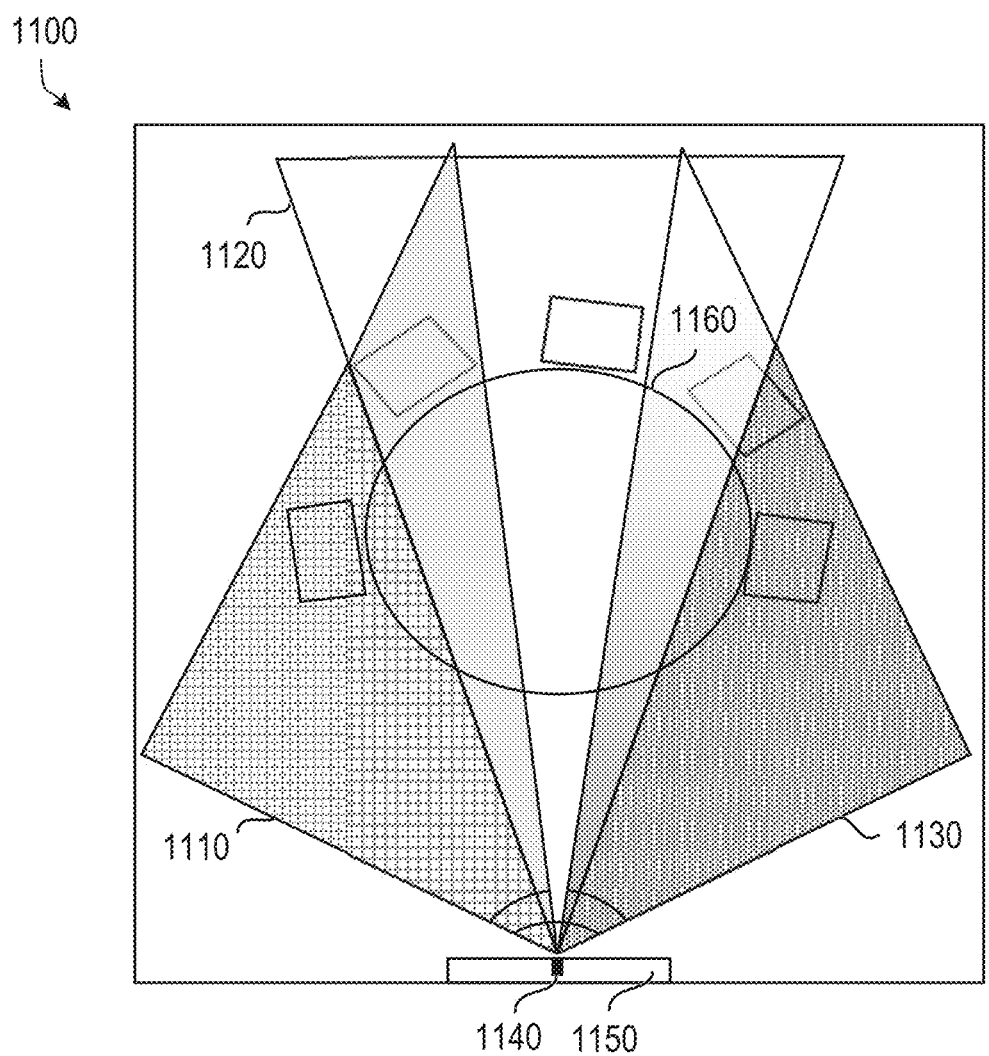
FIG. 11 is a diagrammatic representation of zones in a meeting environment, consistent with some embodiments of the present disclosure.

FIG. 11 is a diagrammatic representation of zones 1110, 1120, 1130 in a meeting environment 1100. As shown in FIG. 11, in some embodiments, a camera 1140 may be located on top of or below a monitor or screen 1150. In some embodiments, camera 1140 may be located at a short end of a table, such as table 1160. Meeting environment 1100 may be divided into zones 1110, 1120, 1130 by camera 1140. In some embodiments, camera 1140 may use zones 1110, 1120, 1130 to determine locations of meeting participants.

In some embodiments, a video camera, or camera with a field of view lens wide enough to capture an entire space of a meeting environment may be provided. The video camera may be equipped with machine learning technology (e.g., learning models/algorithms, trained networks, etc.). The machine learning technology may enable the camera to determine where within the field of view of the camera people are located, who is speaking, who is listening, and in what directions the heads of the people in view of the camera are pointed. The camera may use an algorithm adapted to include a flexible image pipeline to capture the relevant views from the room.

For example, the output of the algorithm may identify a part of the camera's field of view recommended to be shown in a video client. In response, the camera may change video streams or content provided via the host stream. The desired view of the host video stream may be managed by the virtual director, or any other software component.

Such an operation may be used in single or multi-camera systems. In multi-camera systems, for example, the cameras may communicate with each other via defined application program interfaces (APIs) provided over an internal network bus. In some embodiments of the system, the communication may include information about the status of a camera, what the camera currently detects, audio/video streams, potential framings from the virtual director, and camera settings.

In some embodiments, such as when cameras are placed in smaller meeting environments, each camera may have a field of view of approximately 150 degrees field of view. In other embodiments, such as when cameras are placed in larger meeting environments, each camera may have a field of view of approximately 90 degrees field of view. It is contemplated that cameras with a field of view of approximately 150 degrees may be used in larger meeting environments, and cameras with a field of view of approximately 90 degrees may be used in smaller meeting environments. It is further contemplated that any combination of cameras with different fields of view may be used in any meeting environments. Furthermore, cameras with any field of view may be used, and are not limited to the examples provided herein.

In some embodiments, each camera may include an optical lens with an appropriate field of view and a high-resolution image sensor, allowing the camera to zoom in without losing perceived resolution. The cameras may have the ability to process video data from their sensors and, in some embodiments, split the video data into two or more streams. These streams may include one stream that is zoomed out (e.g., overview stream) and at least one other stream that provides an enhanced and zoomed video stream (e.g., primary stream).

Figure 12:
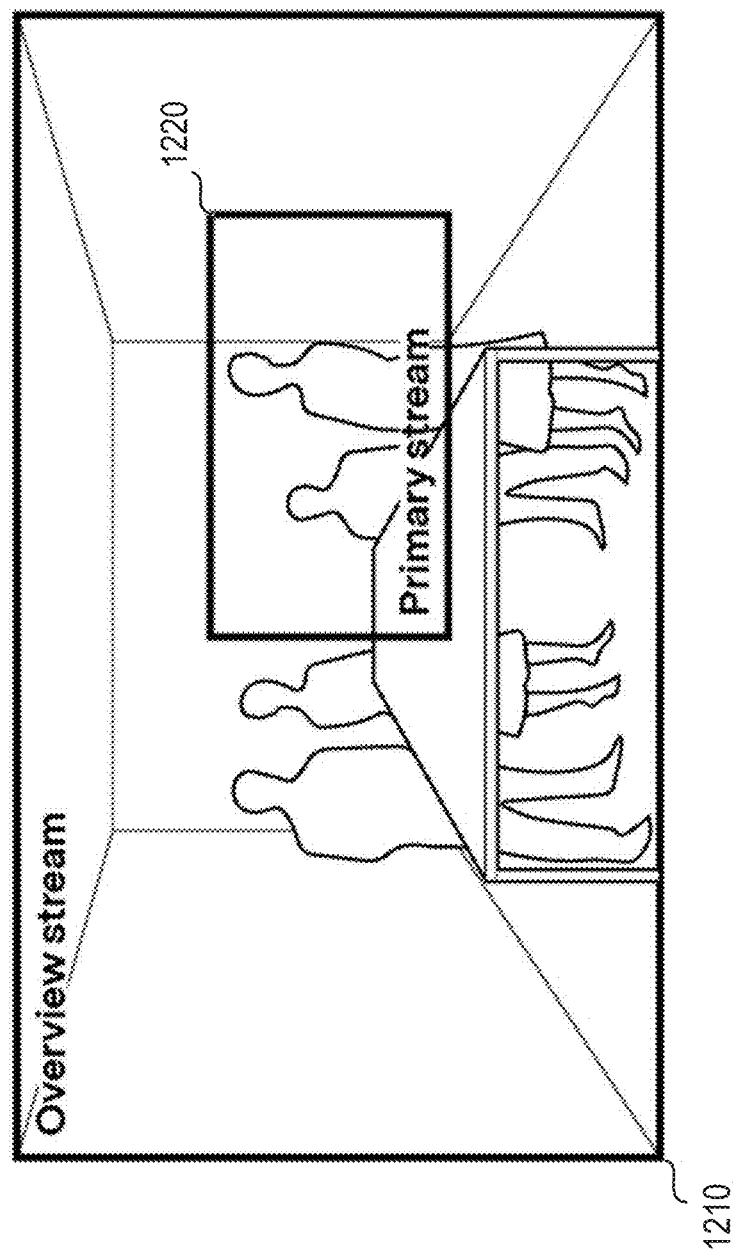
FIG. 12 is an illustration of an overview stream and primary stream, consistent with some embodiments of the present disclosure.

FIG. 12 is an illustration of an overview stream 1210 and primary stream 1220. As shown in FIG. 12, each smart camera in the system may include two video streams internally: one high-resolution stream (e.g., primary stream 1220) where video settings may be applied to zoom and change other video stream properties; and a secondary stream (e.g., overview stream 1210) that captures the entire scene and is consumed by the vision pipelines.

Referring to FIG. 10, camera 1000 may be equipped with a microphone array 1050 that may capture audio signals from different locations relative to the camera. By using the signals from different microphones within microphone array 1050, camera 1000 may determine the angle a voice is coming from (e.g., direction of audio, or DOA). Additionally, in some embodiments, based on input from the microphone array 1050, camera 100 may be equipped with systems for distinguishing between situations where someone is speaking and other situations where there is silence. This information may be communicated to a convolution neural network (CNN) pipeline 1010 and the virtual director 1040.

Camera 1000 may include one or more hardware accelerated programmable convolutional neural networks, such as CNN pipeline 1010. In some embodiments, CNN pipeline 1010 may operate on one or more machine learning models that may use the overview stream to allow the associated hardware to provide information about people, such as meeting participants, that are in view of the camera. The CNN pipeline 1010 may look at the overview stream 1030 and detect where in the view of the camera 1000 people are detected. It may also provide information about people in view of the camera 1000 such as—but not limited to—whether they are speaking or not, facial expressions, how much of the person is visible, and a head pose. It may also track each person over time, to determine where each person was previously in the field of view and if they are in motion. The advantage of using CNN pipeline 1010 and machine learning to detect people in the overview stream 1030 may include that the machine learning model running on CNN can be trained to not be biased on parameters such as—but not limited to—gender, age and race. In some embodiments, the CNN pipeline 1010 may also be able to understand a partial view of a person and people viewed from different angles (e.g., from behind). This may create a robust video conferencing experience. CNN hardware may run these detections multiple times in one second, allowing the camera 1000 to react to changes in view of the camera 1000 at an appropriate time.

In some embodiments of the system, the audio signals from microphone array 1050 may be aggregated and processed by the CNN pipeline 1010, and the CNN pipeline 1010 may distinguish between voices during a meeting in a meeting environment. Based on this distinguishing, the CNN pipeline 1010 can combine voice characteristics classification with other information, such as the angle, where in the room the person is, and/or other related detections. Voices that do not belong to any meeting participant may be classified as artificial sound sources, such as loudspeakers.

Virtual director 1040 may be a software component that takes input from the CNN pipeline 1010 and determines which area of the camera view that should be shown to the host (e.g., host computer 140). In some embodiments, virtual director 1040 may create an automated experience that resembles that of television (TV) talk show production.

Virtual director 1040 may use rules similar to those of TV productions and adapt said rules for interactive video calls and/or to select a framing option to be applied to the camera stream that will be relayed to the host stream.

The virtual director 1040 may perform its functions by evaluating possible framing angles in the room and by monitoring ongoing events and event history associated with the room. For example, for each participant, the virtual director 1040 may evaluate different crops of the image (e.g., frames) including the person to find a preferred frame for a particular situation. The properties that may be evaluated may include: whether a person is speaking, the duration of time a person has been speaking or has spoken, where a person is looking, how much of a person is visible in the frame, the reactions and body language the person is showing, and/or what other persons are visible in the frame. The person visible in the frame may be placed in a framed composition that is natural regarding a direction of attention, a golden rule for viewer comfort, and nearby people, to avoid unflattering, unnatural, or cluttered frames. Based on this evaluation, a frame may be selected when something changes in the meeting environment, or based on previous events in the meeting environment. Examples of such changes include, but are not limited to: a second person begins to speak, someone moves, someone stands up, someone changes the direction they are looking in (e.g., change in looking direction), someone has a reaction, someone shows an object, and/or someone has spoken for a long time, among other detected events. In some embodiments, a person speaking for an extended period of time may suggest a lack of reactions.

Virtual director 1040 may determine the video settings needed to change the camera's primary stream to the selected frame, and then apply the video settings to the selected camera's primary stream. In some embodiments, additional input may be provided to the virtual director unit by smart sensors, such as placement and movement of meeting participants in the meeting environment, the number of meeting participants in the meeting environment, physiological properties of the meeting participants in the meeting environment, and other physical properties of the meeting environment.

The frame applied with the video settings may be selected from the full wide-angle field of view image that each camera captures. This may be based on principles from TV production. In some embodiments, the system may operate with different shot types such as, but not limited to, close shot (e.g., framing a person's head and shoulders), medium shot (e.g., framing one or more persons, showing their upper body), and a total shot (e.g., showing one or more person fully, or showing a table in its entirety). Each frame may be positioned based on photographic principles, where a person may be placed according to a golden rule that includes leaving one-third space from the center of their head to the top of the image, leaving space horizontally in the direction they are looking, and leaving space around the subject in the frame. It is contemplated that parameters may be adjusted in the system.

Figure 13:
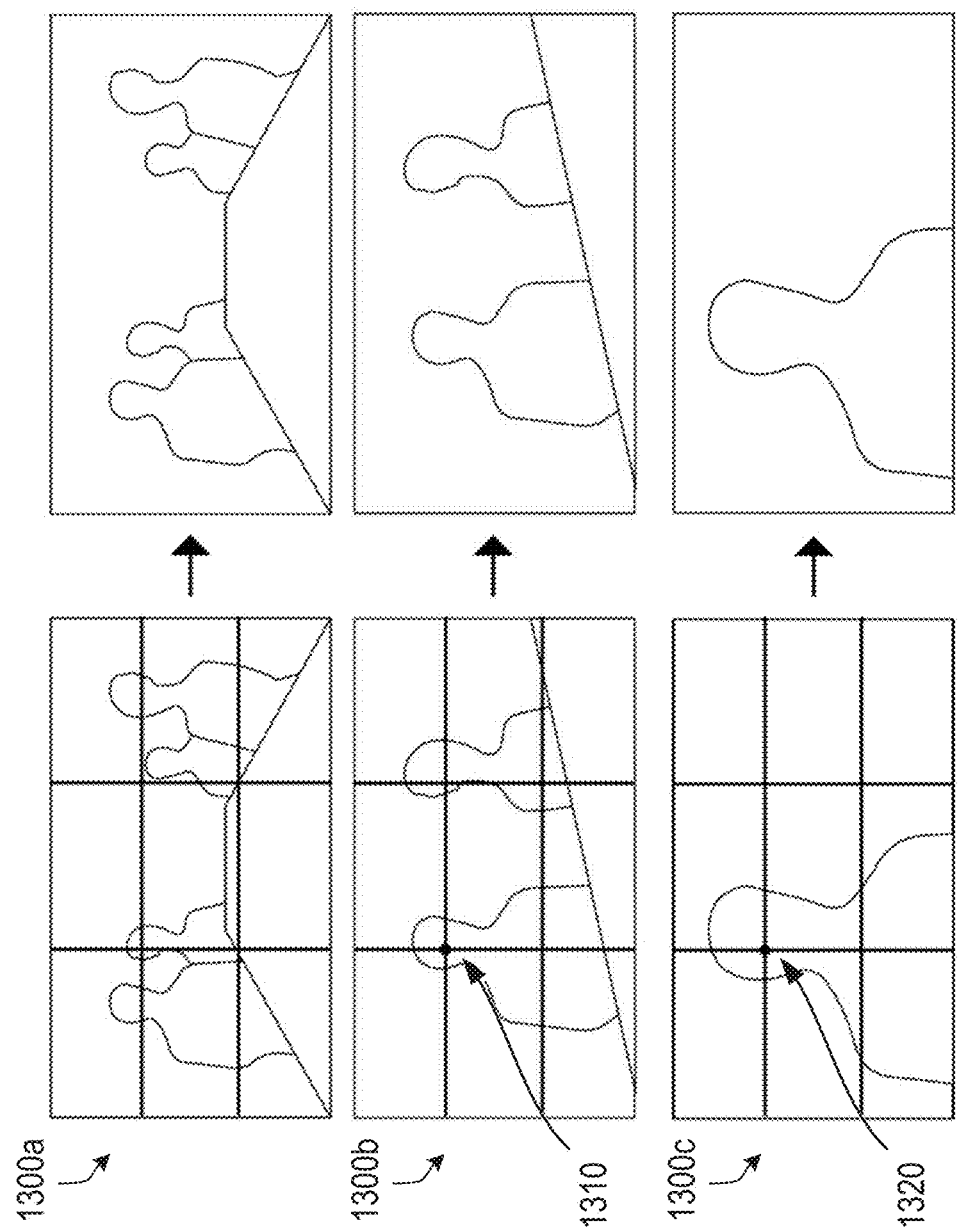
FIG. 13 illustrates an example of a golden rule, consistent with some embodiments of the present disclosure.

FIG. 13 illustrates an example of a rule-based approach to shot determination. As shown in FIG. 13, the eyes 1310, 1320 of one or more persons may be aligned in the top one-third of an image 1300a, 1300b, 1300c.

In some embodiments, the virtual director 1040 may start with showing a fully zoomed out frame to create an understanding of the context, the meeting environment (e.g., room) and the visual relationship between meeting participants (e.g., people) in the room. After a predefined time, virtual director 1040 may switch to the zone (e.g., zone 1110, 1120, 1130) with the best view where a group of meeting participants in the room can be seen. In some embodiments, the zone with the best view may be on the left and/or right side of a table (e.g., table 1160). Virtual director 1040 may continue to frame the person who is speaking. If the speaking person talks for longer than a predetermined time, virtual director 1040 may switch to framing other people in the room that are listening. If no one is speaking or the virtual director 1040 determines that the voice is coming from an artificial sound source (e.g., a loudspeaker), virtual director 1040 may switch to framing everyone in the room.

Other embodiments of the system may use more of the information detected by cameras to frame other activities. For example, when a meeting participant holds up an object, the camera may switch to framing both the person and object. When more than one person gazes in the same direction, the system may change to frame the persons that are looking and or switch to the person they are looking at, using framing principles described above.

Virtual director 1040 may switch between frames at a rhythm to maintain engagement of far end participants (e.g., people watching the video stream from the host computer 140), where active speakers and content will get more time than listeners. Live TV production can switch rapidly with frames lasting less than a second, but for an interactive video call each frame may be required to last longer than what is common practice in TV productions to allow opportunities for far end participants to speak.

Figure 14:
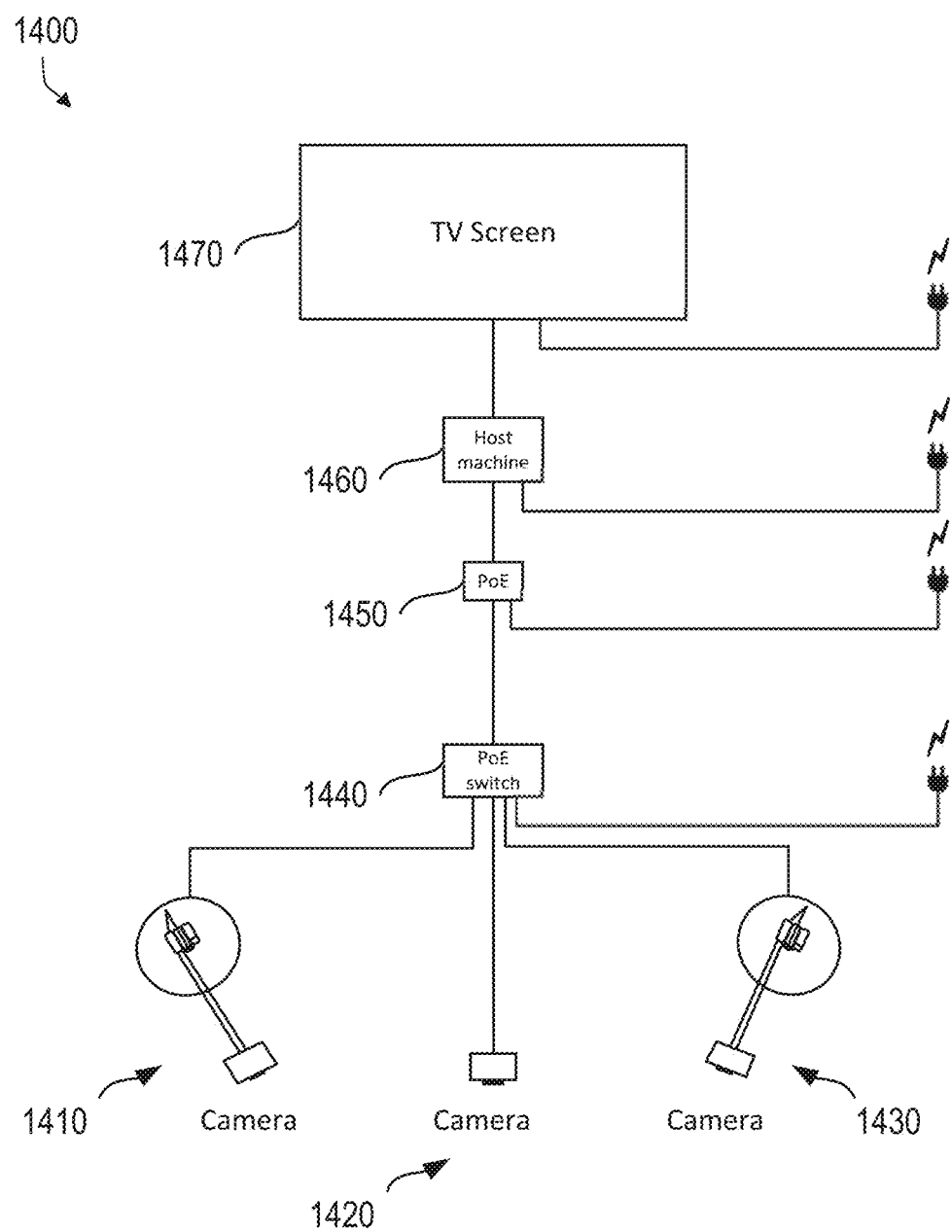
FIG. 14 is a diagrammatic representation of components and connections of an example multi-camera system, consistent with some embodiments of the present disclosure.

FIG. 14 is a diagrammatic representation of components and connections of an example multi-camera system 1400 in a video conferencing environment. As shown in FIG. 14, a multi-camera system may include a plurality of cameras 1410, 1420, 1430 connected to a power-over-ethernet (PoE) switch 1440. PoE switch 1440 may be connected to PoE 1450, which may be connected to host machine 1460. Host machine 1460 may be connected to a display, such as TV screen 1470. Connections between components of multi-camera system 1400 are not limited to what is shown in FIG. 14 and may include, for example, wired connections, wireless connections, or any combination thereof.

In some embodiments, a plurality of smart cameras that can understand the dynamics of the meeting room participants using artificial intelligence (AI) and that can work together to provide an engaging experience to far end participants based on knowledge about how many people are in the room, who is speaking, who is listening, and where attendees are focusing their attention may be provided. This may make it easier to pick up social cues and increase engagement.

In some embodiments, one or more smart sensors, such as a wide field of view camera that can see the whole room with dedicated hardware to run a vision pipeline that can detect what is happening in the room, may be connected together and sense what is happening in the room. This information may be provided to a software component that evaluates the provided information from the room and makes a decision on the best camera angle and frame to show from the room. The virtual director unit may control the main video stream that is consumed by the connected host computer, this information my also be available through an application programming interface (API) that can be used to adjust the system.

Referring to FIG. 14, the cameras 1410, 1420, 1430 in the multi-camera system 1440 may be connected together via ethernet through a PoE switch 1440 and the cameras 1410, 1420, 1430 may be able to communicate with each other. In some embodiments, the system 1400 may be connected to a host machine 1460 (e.g., computer, mobile device) that consumes the video stream (e.g., host stream) created by the camera system 1400. The video stream may be consumed by a video application on host machine 1460.

Host machine 1460 may consume multiple streams, and each stream of the multiple streams may frame a particular meeting participant of the meeting participants in a meeting environment. If content cameras are connected, the content may also be displayed in a dedicated stream when the content is determined to be relevant. This may allow the video clients to mix video streams into their layout, allowing (for example) one square (or tile) per person, that shows the most interesting shot and camera angle of that person.

In some embodiments, main camera 1420 may be directly connected to a network that is attached to the Internet. Main camera 1420 may detect that it has access to the Internet, and establish a connection to a cloud service that may relay the video stream to the selected video content analysis (VCA). This may be through a cloud-to-cloud connection where the camera talks to a cloud, and the cloud may relay the video service to the chosen video conferencing provider. In other embodiments, the cloud connection may relay the video stream to a local application running on a connected computer that may present the relayed video as a camera.

The cameras may communicate with each other through messages via defined APIs that may be sent over the internal network bus. These messages may include information about the status of the camera, if the camera is connected, the type of software the camera is running, current health status, etc. It may also communicate what it detects in the image, such as where in the image a person or item is detected, where in the room they are placed, and other information detected by the vision pipeline. Additionally, the messages may communicate the video setting that has been applied to the primary stream, such as image properties, color/brightness, and/or white balance. In some embodiments, the messages may communicate the virtual director unit parameters, which may allow the system to automatically adjust the virtual director unit experience and/or allow users of the system to control/personalize the virtual director unit experience based on their preferences.

The camera may typically have a field of view of approximately 150 degrees field of view in smaller conference rooms and approximately 90 degrees field of view in larger conference rooms. Furthermore, the camera may include an optical lens with an appropriate field of view and a large resolution image sensor, allowing the camera to zoom in on the video without losing perceived resolution. The camera may have the ability to process the video data from the sensor, including splitting the video data into two streams: an overview stream and a primary stream.

In some embodiments, one or more of cameras may have a smaller field of view but the ability to zoom the primary stream up to 10×. These cameras may be able to frame presenters or participants that are located further away from the camera (e.g., a presenter in a classroom where the camera is placed far away from the board/presenter).

Furthermore, in some embodiments, the system may have a special camera to capture content or whiteboards/walls. This camera may have adapted optics, image processing, and mounting to capture content on a whiteboard/wall as best as possible. Content/object cameras may be smaller and easy to handle, and may be mounted in the ceiling or held by a person, to capture content/objects that the participants in the meeting are working with, holding, or presenting.

A computational device may be attached to the system. The computational device may connect to the ethernet switch and provide additional services to the system. For example, the computational device may have one or more high performance central processing units (CPUs), which may run parts of the vision pipeline of the cameras connected to the system. This may enable the vision pipelines to run faster and do additional tasks.

In some embodiments, smart sensors may be connected to the system (e.g., via wireless of wifi, or directly to the wired network). Smart sensors may provide additional input to the virtual director unit for decision making. For example, a smart sensor may include a smart phone that provides data input from various sensors, such as movement, position, audio signal, etc. Non-limiting examples of additional input may include other types of room occupation information, such as who booked the room for how long, etc. All these inputs may be provided to the virtual director unit through the API.

In some embodiments, one of the cameras in the system may be selected as the primary camera, and may be responsible for controlling the host stream. The primary camera may consume each camera's primary video streams and relay the selected primary stream to the host stream, based on input from the virtual director unit.

A camera may be equipped with a microphone array that takes in audio from different locations on top of the camera. By using the signal from different microphones, the camera can determine at what angle a voice is coming from (e.g., direction of audio or DOA). Additionally, in some embodiments, the camera or the multi-camera system may be able to distinguish between when someone is speaking, the difference between person A/B, and when there is silence, based on input from the microphones. This information may be communicated to the vision pipeline and the virtual director unit.

Disclosed embodiments may include a vision pipeline. For example, each camera may include one or more hardware accelerated programmable convolutional neural networks with pretrained weight that are able to detect different properties from video and/or audio (e.g., vision pipeline model). In some embodiments, the vision pipeline models may analyze the overview stream and detect where, in the view of the camera, people are. The vision pipeline model(s) may also provide information about people in view of the camera such as—but not limited to—if they are speaking or not, facial expressions, how much of the person is visible, the position of the person, and head pose. The vision pipeline model(s) may also track each person over time to determine where each person was previously in the field of view, if they're in motion or not, and in what direction they're heading.

One advantage that may be realized using convolutional neural networks and machine learning to detect people in the overview stream may include a vision pipeline model that can be trained to not be biased on parameters like gender, age and race, scene, light, and size. This may allow for a robust experience. The vision pipeline hardware can be a CPU or special purpose chip with hardware accelerators for different mathematical operations used in the convolutional neural network architecture in the vision pipeline model(s). This may allow the vision pipeline model(s) to run these detections multiple times within one second, allowing the camera to react to changes in view of the camera at an appropriate time.

Embodiments of the present disclosure may include vision pipeline model training. Vision pipeline models, as discussed above, may operate by taking in an overview image and/or audio signal from a camera and run the overview image and/or audio signal through pre-trained convolutional neural networks (CNNs). The vision pipeline models may be trained by running thousands of images and videos relevant to the scene and the objective of the task. During the training of the vision pipeline model, the model may be evaluated with a loss function that measures how well it can perform the task. The feedback from the loss function may be used to adjust the parameters and weights of the vision pipeline model until it can perform its task satisfactorily. These methods and others may include well known machine learning tools and best practices which may be applied to train convolutional neural networks. The trained vision pipeline models may then be converted from the chosen training tools (such as tensorflow), and optimized for the chipset of the vision pipeline hardware (HW) using the chipset manufacturing conversion tools to utilize hardware (HW) accelerated blocks. The trained vision pipeline may be bundled with the camera software. In some embodiments, the bundled vision pipeline model may be fine-tuned for a specific use case. For example, if the system is to be used in a classroom, the vision pipeline models may be fine-tuned based on a training set with images, audio, and video that represents a classroom scenario.

For some of the vision pipeline models, it may be necessary to adapt the convolutional neural network architecture to fit the hardware chipset of the vision pipeline best. This may be performed by removing or replacing mathematical operations in the vision pipeline convolutional neural network architecture with equivalent mathematical operations supported by the chipset.

Embodiments of the present disclosure may include using audio signals to distinguish voices of various meeting participants in a meeting environment. In some embodiments, the audio signals from the microphones may be aggregated and processed by the vision pipeline models. The vision pipeline model(s) may be able to distinguish the voices during the meeting and if they're raising their voice or lowering depending on what happens in the room. In some embodiments, the vision pipeline model(s) may be able to classify what the topic of a conversation is. Based on this, the vision pipeline models may combine voice characteristics classification with other information, such as the angle, where in the room the person is, and other related detections. Voices that do not belong to a person may be classified as artificial sound sources, such as loudspeakers. This information may be provided to the virtual director unit, and the virtual director unit may use this information to select the best shot from the room.

In some embodiments, the disclosed systems may include a video processing unit implemented to include one or more microprocessors onboard a camera and/or one or more microprocessors remotely located relative to a camera (e.g., in a server system, cloud-based system, etc.). The video processing unit may be configured to analyze video from at least one camera and aggregate audio signals from a plurality of audio sources (e.g., microphones included on one or more cameras, distributed about an environment, etc.). The aggregation of the audio signals may include selection of certain audio signals to feature and/or filtering of one or more audio signals (e.g., background noise, voices of non-presenters, voices of side conversation participants, voices reproduced via a loudspeaker, etc.). The aggregation of the audio signals may be based on one or more detected features of at least one subject represented in a video captured by a camera.

The one or more detected features may include any recognizable characteristic of a subject that has a relationship with encountered audio. For example, in some cases, the one or more detected features may include mouth movements of a subject, especially where those mouth movements sync with, or are otherwise consistent with, a received audio signal. For example, the system may detect whether a subject's mouth movements are consistent with a voice audio stream representative of speech. Other detected features may also be relied upon to aggregate audio signals. Such features may include gestures of subjects, audio signatures known to be associated with certain individuals, etc.

In some cases, the selection of audio signals from corresponding audio sources may depend on proximity of various subjects to the audio sources. For example, in a conference room setting where each participant can be paired or associated with a nearest audio source, a participant's voice signal may be featured in the aggregated audio when it is received from the nearest audio source to that participant. In other cases, however, audio signals from audio sources more distant relative to a particular participant may be featured in the aggregated audio. For example, where a first participant is speaking in the direction of a second participant, the voice signal of the first participant may be selected for the aggregated audio even if it is received primarily from an audio source nearest to the second participant, but not nearest relative to the first participant. ML vision/audio pipeline can detect people, object speech, movement, posture, or canvas enhancement, document detection and depth.

One camera system according to the invention, consisting of one or more cameras with an overview video stream that sees the whole FOV from the camera, and one or more microphones. The microphones may be part of the cameras but can also be separate.

Embodiments of the present disclosure may include features and techniques for identifying and including auxiliary items in a stream. In some embodiments, the vision pipeline models may determine objects of interest in the room. The determination may be based on the input of where the participants are looking, and items that are being held or pointed to. The input may be generated by using vision pipeline models that can determine gestures such as pointing, head postures, object classification, and temporal maps of where people are looking. By knowing where the head is from different angles and by having the head position, the depth may be available. From there, a two-dimensional (2D) overview space may be created to project and find the space where the angles cross (e.g., corresponding to where persons/participants are looking).

In some embodiments, the vision pipeline models may be able to determine that someone is drawing on an auxiliary item such as, but not limited to, a non-digital whiteboard. The determination may be based on the input that someone is standing in front of a non-digital whiteboard. The input may be generated by a vision pipeline model that may determine a person's motion patterns and gestures in front of a non-digital whiteboard.

Embodiments of the present disclosure may implement principles from TV production. For example, the frame applied with the video settings may be selected from the full wide-angle field of view image that each camera captures. This may be based on principles from TV-production.

Figure 15:
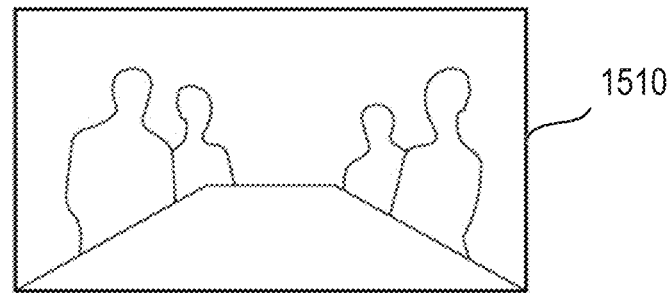
FIG. 15 illustrates examples of different shot types, consistent with some embodiments of the present disclosure.
Figure 15:
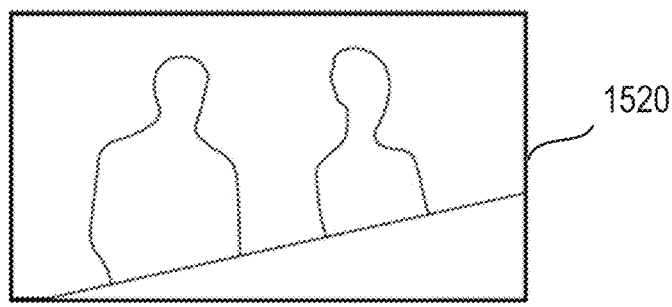
Figure 15:
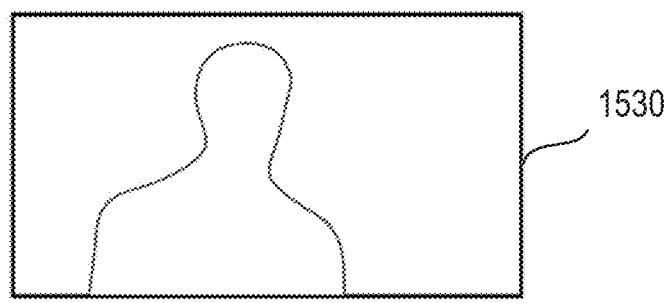

FIG. 15 provides examples of different shot types. As shown in FIG. 15, total shot frame 1510 may include most or all of the meeting participants and most of the room. Total shot frame 1510 may provide context of the scene (e.g., meeting environment) and understanding of the room and where people and items are positioned. The shot may frame most of the participants' heads in the top third of the shot, and add equal amounts of space between the edge of the frame to the left most and right most person to fit the requested aspect ratio from the video stream, to give enough visual space, and fit to the aspect ratio of the video stream.

Medium shot frame 1520 may include representations of two to three participants and focus on one participant. Medium shot frames 1520 may be used when focusing on a dialogue, conversation, or a speaker. The system may frame the person speaking typically in the foreground of the shot, and align the speaker's head and the other participants heads in the top third of the shot. Padding may be added in the direction the speaker is looking, bringing the shot to the correct aspect ratio and providing adequate visual space.

Close shot frames 1530 may frame only one person. Close shot frames 1530 may be used to focus on one participant talking over a long period or duration of time. Close shot frames 1530 may be employed after a medium shot frame 1520, where the same person is included in both shot frames 1520, 1530. In a close shot frame 1530, the participant's eyes may align with the top one-third line, and the close shot frame 1530 may show the participant's upper body shoulder/chest. In some embodiments, the participant may not be framed in the center of the frame, but be framed slightly off-center based on a looking direction. For example, a person that looks to the right may be placed off center to the left of the close shot frame 1530. Additional space may be added in the direction the person is looking and the area behind the person, to bring the frame to an ideal aspect ratio.

Figure 16A:
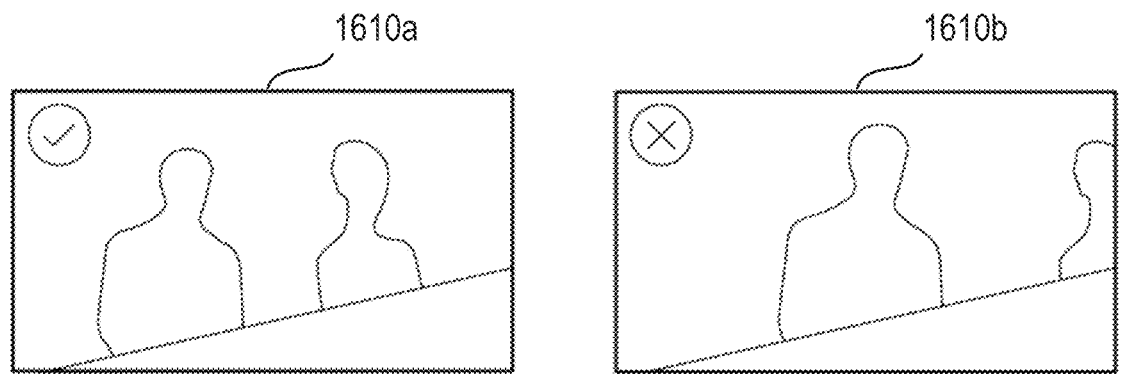
FIGS. 16A-16B illustrate examples of shot frames including other meeting participants and auxiliary items, consistent with some embodiments of the present disclosure.
Figure 16B:
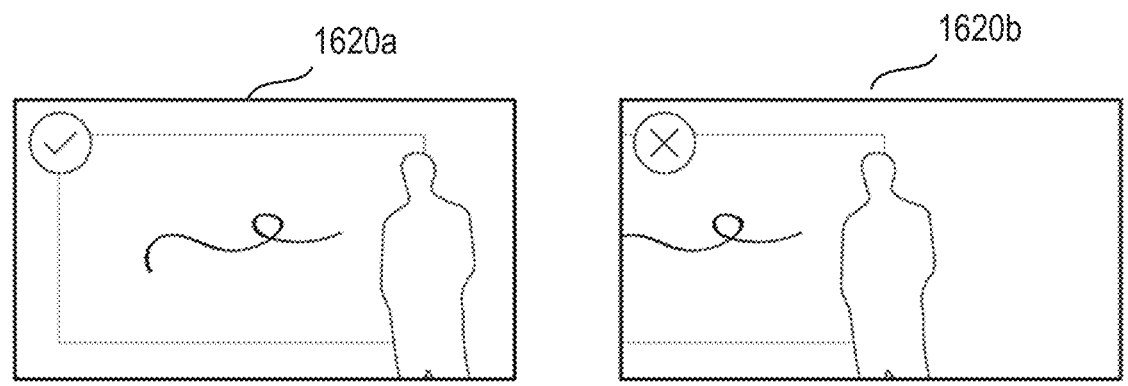

FIGS. 16A-16B provide examples of shot frames including other meeting participants and auxiliary items. The virtual director unit may continuously evaluate all the shots possible of each participant and selects clean shots. The selection may be determined by a set of rules, including not selecting a shot where a person is partially visible, as shown in FIG. 16A. As shown in FIG. 16A, the virtual director unit may prioritize a clean medium shot 1610a, where person A and B is fully visible, rather than a close up shot 1610b of person A, where person B is partially visible. In some embodiments, the virtual director unit may add additional padding in the direction a person is looking, providing the representation of the participant space to look into. This may also be the case for medium shots and total shots, where there may not be enough participants to fill the shot completely. As shown in FIG. 16B, in some embodiments, items of interest (such as a whiteboard), may also be considered in the evaluation. As shown in FIG. 15B, the virtual director unit may prioritize a shot 1620a including the entire auxiliary item (e.g., whiteboard) over a shot 1620b that includes a portion of the auxiliary item.

Disclosed embodiments may include interest shot frames. An interest shot frame may include an item or person that the vision pipeline determines is interesting in the context of the scene. This could be an item/person that everyone is looking at, or a classified item that is recognized from sound and video. This item may be framed following any of the principles disclosed herein. Furthermore, in some embodiments, a close shot may be used to frame this item/person.

Disclosed embodiments may include listening shots. Listening shots may include a shot framing one or more of the participants that are not speaking. This type of shot may be a medium shot or a close shot, depending if one or more participants is to be framed. The system may use these shots in different situations, such as when the active speaker has spoken for a predetermined time or duration. Furthermore, in some embodiments, the shot may switch to a listening shot if the vision pipeline determines that someone is looking away, looking bored, looking at the table, or has not been framed for a long time. This may give participants watching the video stream from the room an equal opportunity as participants in the room to understand the engagement of the other participants in the meeting room.

Disclosed embodiments may include presenter shots. Presenter shots may focus on classroom presenter scenarios. For example, in some embodiments, where one participant is talking for the majority of the meeting, the system may add presenter shots and listening shots. These shots may be variations of a close shot or medium shot, only showing the presenter, but using different camera angles and compositions to give variation in the video, and prevent it from feeling static.

Embodiments of the present disclosure may relate to features and techniques for providing different types of user experience based on the type of meeting environment. For example, in a meeting room, the virtual director unit may use a total shot of the center most camera in the beginning of the stream to create an understanding of the context, the room, and the visual relationship between people in the room. After a predefined time, the virtual director unit may switch to a camera with the best view showing a group of the persons in the room (using a medium shot). In some embodiments, the best view may include the left and/or right side of a table. The virtual director unit may then frame the person who is speaking through the camera that can see the speaker best from the front of their face (using a medium shot). If the speaking person talks for longer than a predetermined time, the virtual director unit may switch to framing other people in the room that are listening (using a listening shot), using the camera that can see the selected listening person best from the front of their face. If no one is speaking or the virtual director unit determines that the voice is coming from an artificial sound source (e.g., loudspeaker), the virtual director unit may switch to framing most or all participants in the room using the camera that can see all of them best from the front (using a total shot).

As another example, in a classroom, the parameters in the virtual director unit and vision pipeline may be adapted for a presenter scene. The presenter scene may be employed in a classroom or lecture meeting environment, where one person talks for most of the meeting (e.g., more than half of the meeting duration) and an audience listens and partially participates. In some embodiments, the virtual director unit may start with showing the presenter and the audience in the room, and then transition to framing the presenter (using a presenter shot). After the presenter has spoken for a determined amount of time, the virtual director unit may then frame the audience in medium shots, switch to presenter shots in between different medium shots. If the presenter stands up or moves in the room, the virtual director unit may use a medium shot, leaving the presenter space in the direction they are moving and follow the movement of the presenter.

As yet another example, the virtual director unit parameters and the vision pipeline may be adopted for us in workshops. In this variation, the virtual director unit may start with showing all the participants in the workshop with a total shot, and then transition to use a medium shot of the person talking, and then transition to capturing someone who moves or is moving. In a workshop meeting environment, the system may be equipped with cameras that can capture content on whiteboard and/or walls. The vision pipeline may be able to detect if one person adds something to the wall/whiteboard and accordingly switch to a camera and shot that frames the person performing an action associated with the change in addition to framing what has been added. The virtual director unit may follow principles described herein, such as—but not limited to—switching to a listening shot when someone speaks for a long time, switching to a total shot from the center camera when someone that is participating remotely is speaking. In some embodiments, such as meeting environments including dialogue or conversation, the virtual director unit may follow modified principles, such as—but not limited to—allowing switching back and forth between speakers without using a frequent or predefined time interval for a listening shot.

Furthermore, embodiments of the system that include content cameras or whiteboard cameras may have a virtual director unit adapted to this scenario. If someone stands up to draw on a whiteboard, the virtual director unit may switch or alter the framing to a center camera showing an overview of everyone during movement. After a person has arrived at the whiteboard, the virtual director unit may switch or alter to a frame or shot that includes the whiteboard and the person in the frame, to establish a context. When context is established, it may keep in line with principles described herein, including displaying content on a whiteboard when everyone is looking toward the whiteboard.

Some embodiments of the present disclosure may provide flexibility in various scenarios. For example, some embodiments will use information detected by cameras to frame other activities. For example, when someone holds up an object, the camera may switch to framing both the person and object. As another example, when more than one person gazes in the same direction, the system may change frames to use the camera that frames them best from the front of their face, and/or switch to the person they are looking at, using any framing principles, alone or in combination, described herein.

The virtual director unit may switch between frames using a rhythm to keep engagement on the far end (e.g., the people watching the video stream from the host computer 140), where active speakers and content may get more time than listeners. For example, live TV production can switch quite fast with frames lasting less than a second, but for an interactive video call each frame may be required to last longer to allow for opportunities to speak up on the far end.

Embodiments of the present disclosure may include features or techniques involving virtual director unit parameters. In some embodiments, the virtual director unit may be parametrized, which may govern how the system selects a shot and how a camera can be adapted and changed, either by the user or automatically. Non-limiting examples of parameters that may be changed include: where space is added around a person in the shot; how a person is placed in the shot; how input from the vision pipeline is weighted in order to determine what shot is selected; the order shots are used; what determines how which camera in the system is used; how long the virtual director unit frames the active speaker before switching; how long should there be activity on a whiteboard before the shot is selected; how long a listening shot is held; and how much movement is necessary before the virtual director unit frames the person moved or transitions from a medium shot including the moving person to a close shot only framing the speaking person; a rhythm of cutting based on detections of what is happening in the room (tone of voice, activity, mood, etc.) or a manual setting.

The parameters may be automatically adapted depending on, for example, the smart sensors connected to the system and/or the virtual director unit. This may allow the users of the system to adjust some parameters to their preference.

Embodiments of the present disclosure may include features, functions, and techniques directed toward discovery updates from one or more cameras. In some embodiments, a discovery function may be provided. The discovery function may use the a discovery protocol. The client side in each camera may receive discovery updates from other cameras in the network. When the client detects a new camera, the discovery information for a camera may change. Alternatively, when a camera is removed from the network, the camera may evaluate its main director status.

The discovery process for a camera may include comparing the camera's own information with that of other cameras, or every other camera, on the network. If another camera reports that it is the main director, the camera may not become the main director. If no other camera is main director, the camera with the highest serial number may become the main director. Each camera may compare its own serial number with that of every other discovered camera to find out if it will become the main director.

Figure 17:
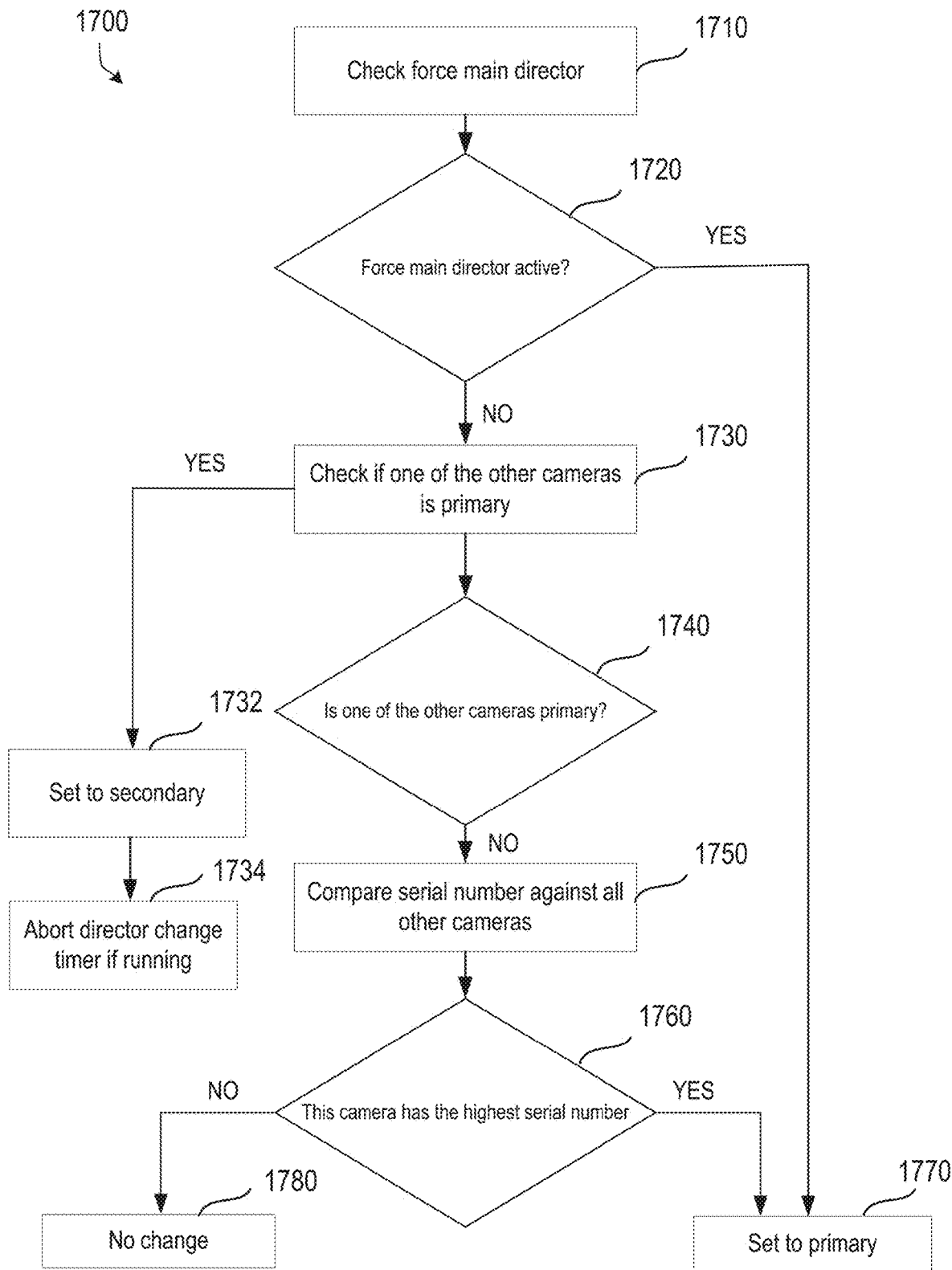
FIG. 17 is a diagrammatic flowchart illustrating a discovery process, consistent with some embodiments of the present disclosure.

FIG. 17 is a diagrammatic flowchart illustrating a discovery process 1700. As shown in step 1710 of FIG. 17, discovery process 1700 may include checking for if a first camera has been force selected, or identified, as the main director. The method may include checking if the force main director is active, as shown in step 1720. If the force main director is active (1720), the first camera associated with the force main director may be set to be the primary camera 1770. If the force main director is not active (1720), the method may include checking if one of the other cameras is a primary camera, as shown in step 1730. As shown in step 1732, 1734 of FIG. 17, if one of the other cameras is a primary camera (1740), the first camera may be set to be a secondary camera and a director change may be aborted if a timer is running. If one of the other cameras is not a primary camera (1740), the serial number of the first camera may be compared to the serial number of all other cameras in a system, as shown in step 1750. If the first camera has the highest serial number (step 1760), the first camera may be set to primary, as shown in step 1770. If the first camera does not have the highest serial number, no change in setting of a camera as primary may be performed, as shown in step 1780.

In some embodiments, a "mode" field in a discovery message may be used to show director status. If mode=0, the camera is may be a non-camera. If mode=1, the camera may be a non-director camera. If mode=2 the camera may be a director camera.

Furthermore, if the main director camera disappears from the network, other cameras may wait for 30 seconds before assuming the main director role. This may avoid the changing of the main director camera when cameras reboot during software upgrades.

In some embodiments, external discovery using the Web Service Discovery host and client daemon (WSDD) and Avahi discovery services may be run from the main director camera only, to ensure that this camera is the only one discoverable by connected personal computers (PCs).

Embodiments of the present disclosure may include features, techniques, and processes for directing and framing. In some embodiments, directing (e.g., deciding which camera to use) and framing (e.g., deciding which cut or shot to use) may be delegated to a new independent process termed "DirectorWits". The process may include receiving detection events and sound observations from each camera and making decisions based on these events and observations roughly once every second.

The algorithm, or process, may implement a fuzzy state machine looping over a set of rules for directing. At regular intervals, each rule may be asked to bid on what should happen next given a bag of recent events. The rule that wins the auction may decide the next shot and for how long it should be held. Some rules may preempt the decided shot time. The rule set may include: Default (e.g., nothing is happening, revert to an overview shot); Speaker (e.g., human speech is detected in the room, frame the speaker if they can be located); Listener (e.g., human shape is detected in the room and is not speaking, frame the listener along with optional other people sitting close by); Entropy (e.g., humans are moving about in the room, frame all people from a well-placed camera); Interruption of current framing (e.g., someone is leaving or entering the room); Alternate (e.g., irrespective of activities, frame something for a camera ensuring all cameras are used in sequence); Presenter (e.g., on nominated cameras, frame a person and a target (e.g., screen, painting, whiteboard) to the left or right of the presenter, may require minimal camera placement); Sequencer (e.g., prime the state machine with combinations of the other rules and parametrization). Each set may be active for a specified time, and may loop from the beginning after all sets are complete (e.g., performed).

Rules may implement the virtual methods declared in a core class. The following declarations may be used in implementing disclosed embodiments.

ComputeScore from and EventCollection may make a bid for the current auction, where values are in the range 0.0 to 1.0. If the rule wants to participate it may return the (configurable) value termed Importance; otherwise it may return the value 0.0. A special score of 1.0 may override all other bids and even hijack the current framing.

ApplyDecisons may be called if the rule wins the auction. It may decide which camera to present data from and what kind of shot.

FrameTime may define the number of seconds the shot will be held before the next framing. For example, when framing a speaker, the shot may be held for at least 4 seconds. In some embodiments, the speaker shot may be held for about 8-10 seconds. Note that there may be auctions held before the time has expired. One reason is that the framing can be preempted in special cases, for example, when people are leaving or entering the room.

Delay may include a self-imposed quarantine time for when the rule can be applied again. For example, if there was a listener shot, that rule may not be used again in the next 60 seconds. Delay and FrameTime may be tweaked to reflect the intended pace of the meeting (room and situation).

Incoming events may be captured by the core class, and outgoing events may be termed framing events. Events may be passed around in collections or clusters when there is a spatial relationship between them.

A core rule may define the common contract for bidding on the next shot and executing it when winning the auction. The derived rules may evaluate different features of an event collection and may choose a suitable shot type for a particular situation.

A state machine may orchestrate the overall DirectorWits behavior. It may implement the auction that is held every second or so, and may give control to the rule with the highest bid.

Figure 18:
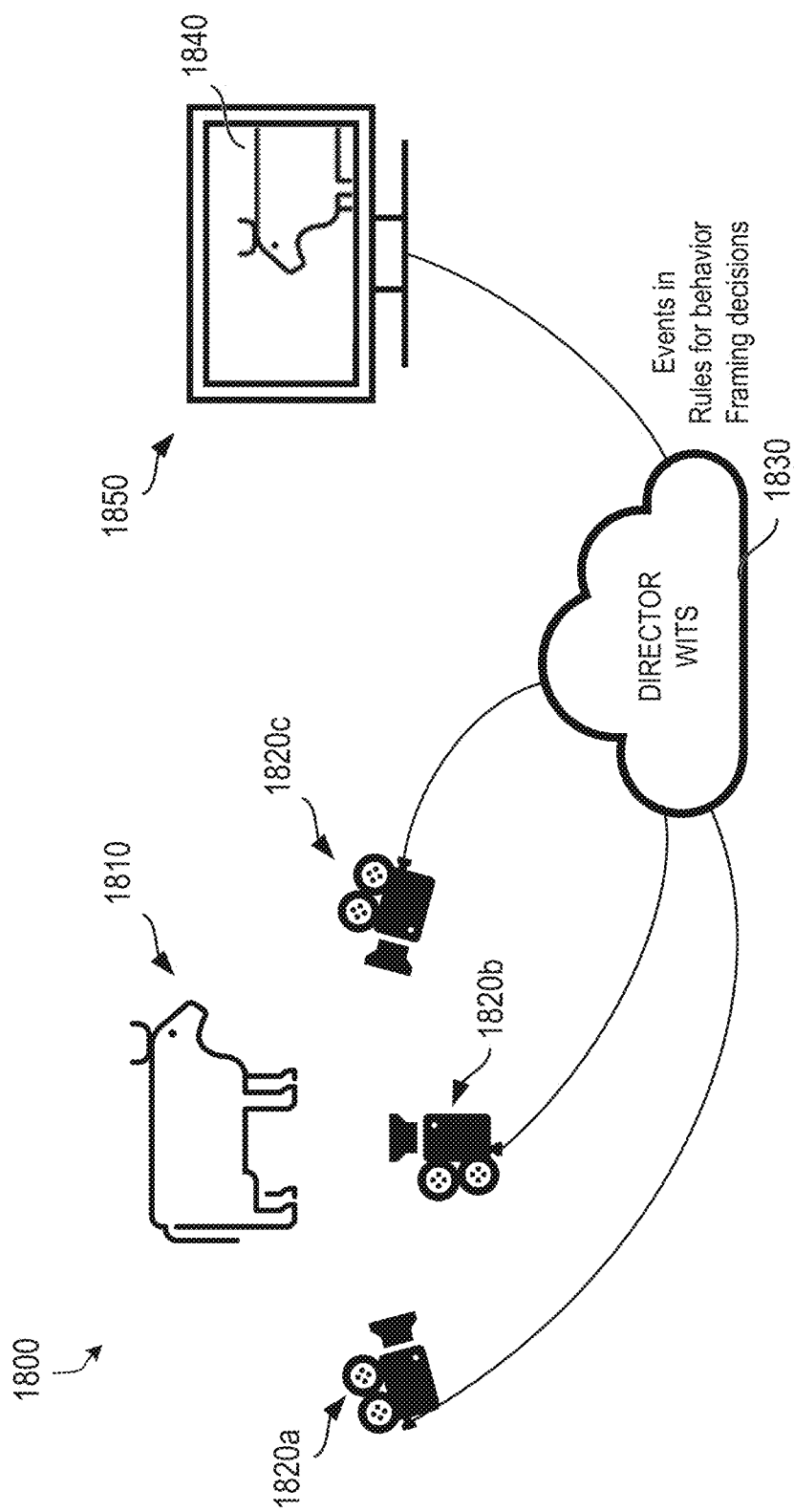
FIG. 18 is a diagrammatic representation of an example DirectorWits architecture, consistent with some embodiments of the present disclosure.

FIG. 18 is a diagrammatic representation of an example DirectorWits architecture 1800. As shown in FIG. 18, sub-ject 1810 may be recorded or filmed by cameras 1820a-c. The DirectorWits process 1830 may make decisions based on received detection events and sound observations from each camera, and output a stream 1840 to display unit 1850.

In some embodiments, the DirectorWits (wits) may implement an autonomous world, one that does not depend directly on other parts of the multi camera parts, to reduce coupling and improve cohesion. There may a bridge implementation in place to achieve this, an example of which as follows:

1. EventGenerator may receive person and head detections as well as sound estimates to be formulated as wits events. This information may be sent into wits through the DirEventBridge class.
2. EventExecutor receives framing commands from wits and passes them on to the process for controlling the video stream sent to the consumer.

Figure 19:
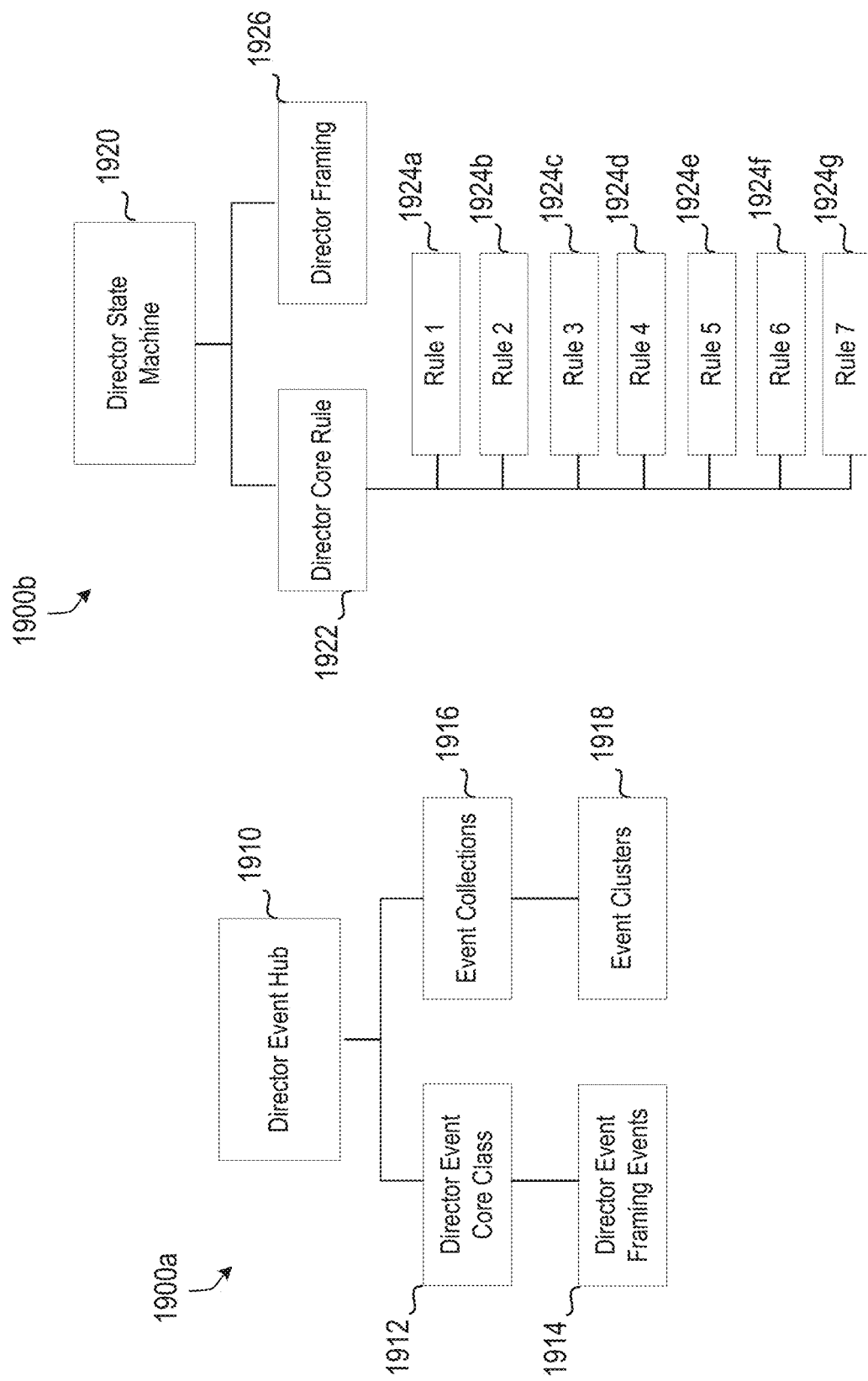
FIG. 19 is a flowchart illustrating main concepts an relations in an example of DirectorsWits, consistent with some embodiments of the present disclosure.

FIG. 19 is a flowchart illustrating main concepts and relations in an example of DirectorsWits. As shown in FIG. 19, incoming events may be processed through an incoming event process 1900a. Incoming events in the Director Event Hub 1910 may be captured by the core class 1912 and outgoing events may be considered framing events 1914. Events may be passed around in collections 1916 or clusters. The director state machine process 1900b using Director State Machine 1920 may include a core rule 1922 that defines the common contract for bidding on the next shot and executing the next shot when winning the auction. Rules 1924a-g may evaluate different features of an event collection and may choose a suitable shot type for a particular situation or event. The director may direct a frame 1926, or shot, accordingly.

Embodiments of the present disclosure may include features and techniques for finding, or discovering, direction of arrival (DOA). To know which participants are talking and when, an understanding relative to generated audio signals may be important. Direction of Arrival (DOA) algorithms may indicate the direction of the speaker while Voice Activity Detection (VAD) may provide information about when someone talks.

DOA of a sound source may be determined based on at least two synchronized microphones. The Steered Response Power with Phase Transform (SRP-PHAT) is a simple and robust DOA algorithm, and may estimate the time delay between two microphones by calculating the phase difference of the Fourier transform of simultaneous short sound segments from the two microphones. A set of search angles may be defined (e.g., every 1°) and for each angle, a steering angle may be applied to calculate the response value (e.g., power) for each frequency. After summing over all frequencies, the max peak of this power may be the estimated DOA.

Detecting whether a signal contains speech has been solved in different ways. The simplest may be the so-called "energy VAD", which may calculate the energy of the signal for each short time segment and then establishe an energy value for the general noise floor. Sounds with significantly higher energy (e.g., sounds that are above a certain threshold relative to the floor) may be considered to be not background noise and, in some embodiments, assumed to be speech. The noise level may be slowly adapted to the general energy level between bursts of higher energy. This may work well because speech is continuously varying and thus does not increase the general noise floor level even if someone speaks continuously for a long time.

A more robust approach may account for certain speech characteristics. Such approaches may consider the frequency spectrum of speech. For example, deep neural network models may be used to recognize whether certain audio signals are representative of speech. In some cases, neural network approaches may be combined with the energy VAD described above.

Embodiments of the present disclosure may include features and techniques including a virtual audio director unit. A virtual audio director may include a software component that takes input from the vision pipeline component and determines what microphone/audio signal it should use. Properties that may be evaluated include: whether a person is speaking or not, and if they are speaking, for how long they have spoken and where they are looking.

As an example, a room with one smart camera placed underneath the TV, and one smart canvas camera attached to a whiteboard, with four people in the room sitting around a table in front of the TV may be provide. Person A may be presenting and may begin talking. The virtual audio director may consider the position of Person A and direction of the audio signal to only relay the audio signal from the direction of Person A. When Person A gets up to draw something on the whiteboard the virtual director may use the information from the vision pipeline to see that Person A is now underneath the smart canvas camera, and is looking away from the smart camera placed underneath the TV. The virtual audio director may switch over to use the audio signal from the microphones on the smart canvas camera. When Person B, who is still sitting by the table, begins discussing (e.g., speaking) with Person A standing by the whiteboard, the virtual audio director may combine the audio signal from the smart canvas camera and the smart camera underneath the TV to only pick up audio from Person A and Person B.

Embodiments of the present disclosure may include features and techniques for image processing. Image signal processing may be a core part of a digital camera and may constitute one or more camera image processing pipelines. The camera image processing pipelines may process a raw sensor input and its associated control function blocks, which in combination may act to produce higher quality images suitable for various use cases.

The control functions may optimize the settings for image pipelines in addition to the settings of any image sensors or image actuators in the camera. The optimization may be based on image statistics which are most often calculated as part of the image pipelines. Additionally, or alternatively, the control functions may receive external input in the form of user settings or decisions and analytics from computer vision algorithms in a camera system.

Figure 20:
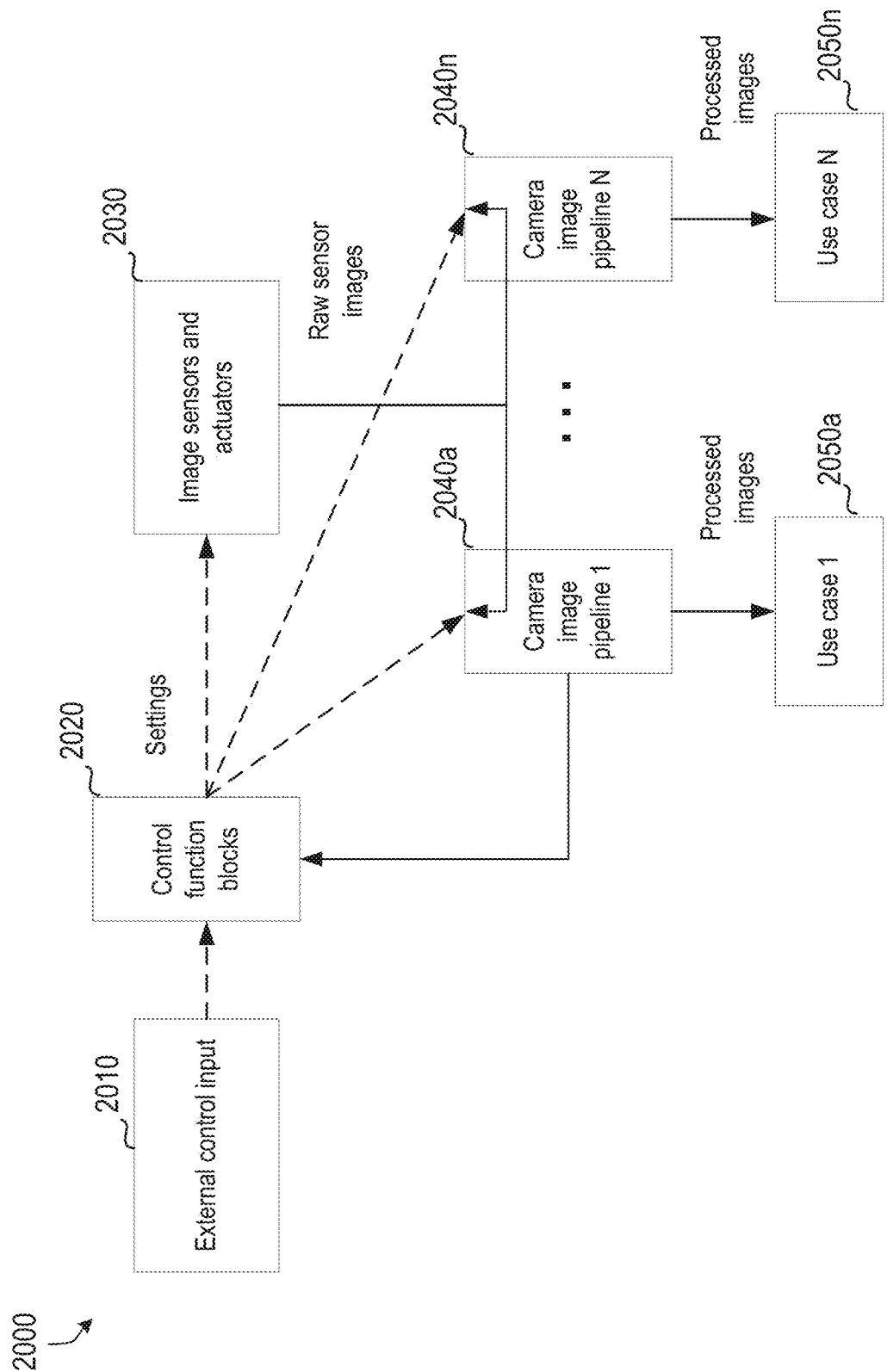
FIG. 20 is a diagrammatic representation of an image processing technique, consistent with some embodiments of the present disclosure.

FIG. 20 is a diagrammatic representation of an image processing technique 2000. An abbreviation for the control function blocks 2020 may include AAA, for Auto-focus, Auto-exposure and Auto-white balance. However, the settings controlled in a modern camera are not limited to these three image properties. For example, control of zoom level and crop region may be used in the realization of digital pan-tilt-zoom. The level of automation by the control function block 2020 may also be variable. For example, a setting for exposure may be determined entirely by an external user setting (e.g., external control input 2010), or fully determined by a control function block, such as control function block 2020.

While the distinction between a control function block 2020 and image pipeline 2040a-n may be beneficial to understand the system, the two can also be physically and logically implemented together, for instance in the context of a convolutional neural network framework.

The purpose of a camera image processing pipeline may be to produce a high-quality video stream from a raw color image sensor input. The optimum quality for the resulting video stream may depend on the use case. For example, a video stream that may be used for image analysis may be evaluated by different criteria than a video stream which may be viewed directly on a screen by a user. The video stream may be encoded for transmission or storage, where the final use case may be more open-ended. Additionally, or alternatively, the image pipeline settings may be optimized to the type and level of compression used to get the lowest possible distortion for a given bit rate.

Because of the differing requirements it can be an advantage to have multiple image pipelines in the camera, either by different configuration of the same pipeline structure (that may be time multiplexed) or by physically distinct pipelines that can operate in parallel. The end result may be that the processing from sensor to output can be optimized for different means.

For example, in applications where continuous scene analysis is performed, like video meetings or surveillance, it may be important that the image analysis can work on the full field of view seen by the image sensor 2030. The user or operator may simultaneously be shown a part of the image which is to be enhanced specifically at the highest resolution possible with the sensor. This may be more economical in terms of resource usage with independent image pipelines for the detail and the overview, because processing the entire image at the highest level of detail may be costly and irrelevant for the analysis.

For screen viewing and encoding, it may be important that the video stream from the image pipeline 2040a-n adheres to particular standards for the digital format. The standard may specify aspects like color space, quantization, defined intensity levels, etc., so that it may be possible to build an end-to-end video system with components from multiple vendors with predictable behavior. Thus format conversion may be the last stage of a camera image processing pipeline, but other aspects of the image pipeline may also be optimized to give the best general quality within the bounds of the standard.

Figure 21:
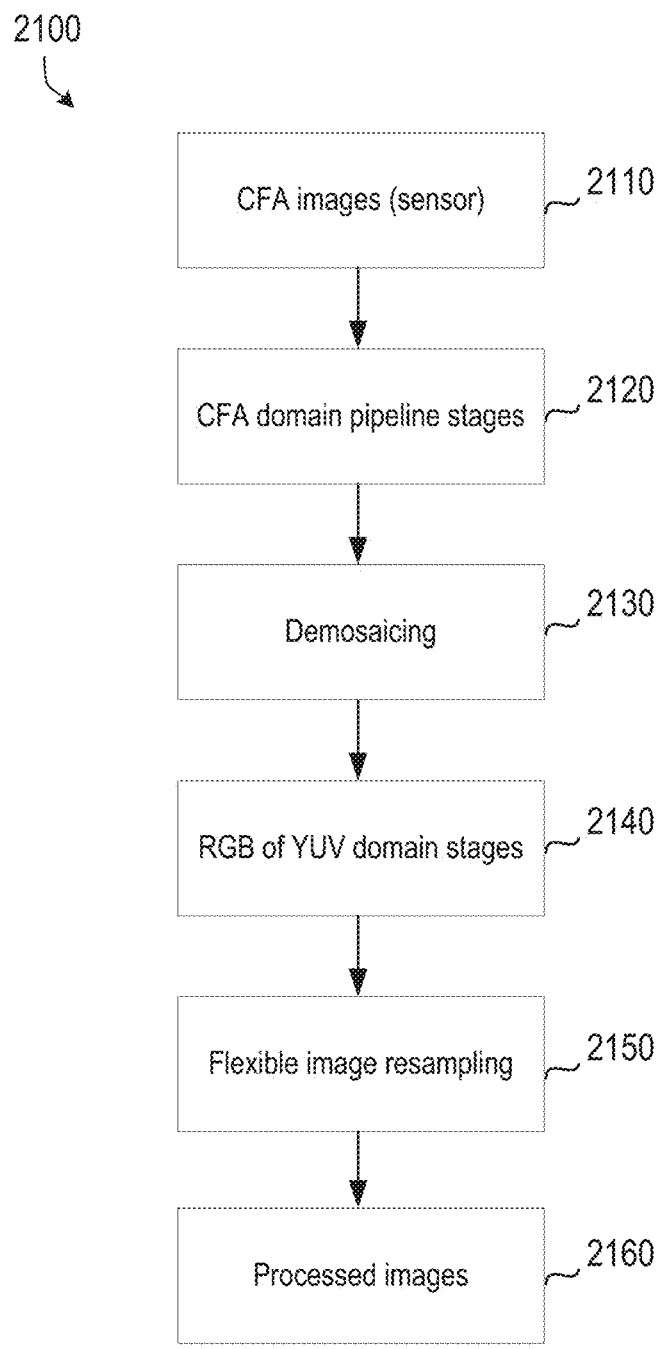
FIG. 21 provides a flowchart describing an example image processing pipeline, consistent with some embodiments of the present disclosure.

FIG. 21 illustrates a flowchart describing an example image processing pipeline 2100. The raw image from most modern image sensors may have a special mosaic format, because only one color may be captured per pixel location of the imager array. The bare sensor pixels may be covered with a color filter array (CFA) which may only transmit certain wavelengths for each pixel. The most common CFA pattern may include the Bayer filter mosaic, but other types may also be in common use. The CFA images may be received by the camera image pipeline 2100, as shown in step 2110 of FIG. 21.

A central operation for a camera image pipeline may include converting from a specialized CFA format to a more common format with 3 color channels per pixel. This operation may include demosaicing 2130, or de-bayering if used on a Bayer mosaic. While demosaicing may be important, it may not be required as the first stage in a multi-stage image pipeline. CFA formats may have fewer bytes per pixel than a full color image, and it may be economical to perform certain operations before demosaicing, if possible, to reduce the amount of calculations per pixel and the bandwidth used through the pipeline. Additionally, or alternatively, algorithms for demosaicing may perform better on higher signal to noise ratios and on images without sensor defects, so some form of noise reduction and sensor defect elimination may be performed prior to demosaicing. In some embodiments, demosaicing and noise reduction may be implemented simultaneously.

Other stages that may be performed before demosaicing, such as CFA domain pipeline stages shown in step 2120, may include operations that act globally or have a smooth variation across the image. Non-limiting examples of such stages include black level subtraction, color shading correction, and white balancing. Multi frame exposure fusion to reconstruct higher dynamic range may also be performed in CFA format before demosaicing.

Raw sensor images may have a numerical black point that is not equal to zero due to the distribution of read-out noise sensors being bipolar. In some embodiments, it may be necessary to remove some noise before the black level can be subtracted, to avoid noise-induced bias in dark areas. By delegating this work to the image processing pipeline (as opposed to doing it on the sensor with a simple operation like clipping), better low light performance and detail in dark areas may be achieved.

Color shading and vignetting can have multiple causes, both from the lens used and interactions between the lens and image sensor. Both may be corrected by calibrated correction maps.

The white balance stage may include correction of color cast in the image, which may have been brought about due to image sensor sensitivity deviations or illumination in the scene that deviates from some target illumination color. Color may be partially or fully corrected in the CFA domain, as in traditional systems, it may be performed as a global operator.

Noise reduction may be included in the camera processing pipeline. One can make a coarse distinction between filters operating in the spatial dimension and filters acting in the temporal dimension. The filtering may be carried out in a color space with good separation between chrominance and luminance. Because human vision is less sensitive to detail in the chrominance, a more aggressive filtering can be done in this component.

The color sensitivity curves for color image sensors may not exactly match color sensitivity curves of a typical human individual, which may be the goal for standardized sensitivity curves like the CIE XYZ used in color management. The sensor sensitivity may include a combination of what is possible with current sensor materials and maximizing the number of absorbed photons. There may be a need to correct colors due to mismatch, as shown in RGB of YUV domain stages 2140, which may be performed with various machinery ranging from 3×3 correction matrices to three-dimensional (3D) look up tables. In addition to correcting the sensor towards a standard, this stage can also be a stage to introduce color styles which deviate from a neutral capturing of color.

To correct for various lighting conditions and make the image pleasing to look at, various tone mapping operators may be applied to the image. The tone mapping defined by the image format standard targeted may be considered, which often is a gamma curve.

Lenses may have deviations from ideal geometric projections, such as rectilinear or fisheye projections. Such deviations may have consequences for the aesthetic appearance of the image and prevent use of computer vision techniques that measure and reconstruct objects in the scene (e.g., by stereo photogrammetry).

Many image processing pipelines may include a flexible image resampling stage 2150 that can locally warp the geometry of the image. It may be used both to correct the geometric projection of the lens and to change to other projections that may be more suitable for the use case. For example, a cylindrical projection may be preferable to a rectilinear projection for wide-angle views to reduce the perceived deformation of persons sitting in the outer parts of the image field.

Changing the parameters of a rendered projection used in the flexible resampling stage may be performed. For example, if camera placement is high and tilted downwards, changing the perspective angle may provide a rendering that may be perceptually better for a wide angle view by avoiding converging vertical lines that may look unstable on the side of the image.

The flexible image resampling 2150 may be useful when realizing pan-tilt-zoom, by changing the projection angle to simulate a physical pan-tilt camera. This may provide an advantage compared to realizing pan-tilt-zoom by simply changing the cropped region in an image which otherwise has a fixed projection. As shown in step 2160, processed images may be output.

Referring back to FIG. 20, embodiments of the present disclosure may include control function blocks 2020. Control function blocks may adapt the image processing pipelines to changing conditions and use cases, both of which may be based on continuous image statistics and features calculated by the image processing pipelines themselves, user settings, and/or external analysis giving more high level information about the scene.

Image processing pipeline stages may include parameters that may be adapted by control functions. The adaptation of white balance and color correction may be particularly important regarding user experience. Color may be a global image aspect in the changes to color may be visible at a glance without looking at local details. Some embodiments may use a gray world algorithm for white point estimation and a fixed color correction.

In some embodiments, important image aspects may include exposure and tone mapping. This may be adapted both through settings on the image sensors and image pipelines, and may strike a balance between bringing out details and maintaining contrast while keeping a natural look without artifacts. Newer image sensors may include a wider dynamic range than most image formats for transmission and storage support, and it may be the role of the tone mapping control function to map the wider dynamic range into a narrower one. Some embodiments may adjust the sensor gain in a feedback until the average image intensity is 18% (or any suitable amount), which may be the approximate average reflectance of natural scenes.

Embodiments of the present disclosure may include features and techniques for showing video of participants on a display. Traditional video conferencing systems and associated software may have the ability to show video of participants on a display. In some cases, a static image of one or more meeting participants may be shown on the display. In other cases, one or more meeting participants may be selectively featured on a display (e.g., based on detected audio from one or more microphones). With such systems, however, it may be difficult for a far end user to adequately see or interact with certain conference participants. For example, in a video shot showing a conference room table and all of the participants sitting around the table, it may be difficult for a far end user to see and interact with meeting participants sitting at the other far end of the table. Additionally, it may be difficult to see and interact with meeting participants shown on a video feed in profile or from behind. Moreover, even in systems capable of highlighting one or more meeting participants, it may be difficult or impossible for far end users to determine how a featured speaker is being received by others in the room, especially where the others are not shown together with the featured speaker. For at least these reasons, far end users may feel isolated, detached, and/or not as integrated during videoconference events.

Disclosed systems and methods may provide multi-camera systems that naturally and dynamically follow the conversation and meeting interactions, occurring both among participants sitting in a conference room and, more broadly, among meeting participants distributed over multiple environments. In some embodiments, disclosed systems and methods may detect what is happening within an environment (e.g., a meeting room, virtual distributed meeting environment, etc.) and adapt the video feed view based on analysis of detected events, interactions, movements, audio, etc.

In this way, far end users may feel and be more engaged and included with a group of meeting participants, including in situations where the group is located together in a common physical environment. For example, the disclosed systems can facilitate end users' ability to determine who is speaking, to whom a discussion is directed, how the discussion is being received by non-speaking participants, etc. As a result, a far end user participating in a meeting virtually may feel closer to being in the same room with a group of meeting participants. Such far end users may more easily follow the flow of conversation, comprehend more of the discussion (even where information is transmitted subtly through body language, facial expressions, gestures, etc.-common features of a multi-person discussion that are often missed or not discernable using traditional video conferencing platforms), more easily identify speakers and listeners, and gain more context from a meeting conversation. Such features may help remote participants to take a more active role in conversations with other meeting participants.

Furthermore, disclosed embodiments may provide systems and methods for event detection and analysis on the bodies of meeting participants (e.g., in the head region), direction of received audio (e.g., in combination with video analysis/detection), movement patterns/history of meeting participants, speaker tracking, etc. Such event detection and analysis may be used to determine which subjects to feature in a composite video (or series of video stream outputs), where on a display to show meeting participants, relative positioning on a display among meeting participants, what types of highlighting techniques to use relative to selected meeting participants, what audio feeds to select, how long to show certain video streams, how to transition among different video frames, etc.

Traditional video conferencing platforms may be associated with additional challenges. For example, when calling into a meeting, it can be difficult for remote video conferencing participants to feel integrated in the physical meeting environment. At the same time, it can be difficult to divide attention between the screen and the meeting environment for meeting participants located in the physical meeting environment.

Meetings may require different spaces depending on the activity and the number of attendees. They may also require different types and levels of concentration, attention, and presence. Meeting participants may include a main speaker, a contributor, or a listening audience. Regardless of the situation, it may be beneficial for all participants to feel connected and have opportunities to contribute to the meeting. Additionally, hybrid office situations may continue to be prevalent, and participants may attend meetings with some being located in a physical meeting environment, and others joining the video conference from elsewhere. Disclosed embodiments may provide experiences where all meeting participants (including those physically present and remote participants) can contribute and participate on the same level in a meeting.

Disclosed embodiments may include features and techniques for providing selective audio and gallery view(s). Disclosed embodiments may include AI-powered features that may create a more engaging and democratic video meeting experience. During operation, the one or more cameras of the system may dynamically adjust projected views based on what they see and/or hear in a room or other environment.

In a static environment, such as video, it may be difficult to interpret non-verbal communication like gestures, body language, and facial expressions. Embodiments of the present disclosure may automatically detect and capture these non-verbal details, and while focusing on the person speaking, these systems may also bring attention to reactions and events in the room. This may provide remote participants with information naturally ascertained as an actual meeting participant (e.g., meeting participant present in the physical meeting environment), but which may be more difficult to receive through traditional video-based solutions. The disclosed systems may employ principles of live TV productions (e.g., different types of camera shots, etc.) that may be used to make the video experience more engaging and inclusive for all meeting participants.

The sections below describe various features, capabilities, and configurations of the disclosed video systems, including, but not limited to: Genius Framing, Speaker Framing, Gallery View, Adaptive Layout Engine, Framing Transitions, and Platform Configurations.

Genius framing may pertain to a framing methodology in which detected subjects can be featured in a video stream (e.g., by actually or effectively zooming in, panning, tilting, etc., to provide a desired shot of a subject of interest). Genius framing may refer to a feature that, among other things, can generate smooth zooming and frame transitions to capture meeting participants or other objects of interest (e.g., a whiteboard, table, etc.) in a room or environment. Machine learning may enable detection of the number of people that are present and where people are located within the room/environment. Genius framing may smoothly zoom in on particular meeting participants and frame them. If people leave the room, or more people enter, the camera may zoom in or out to capture the new group of people.

Speaker Framing may pertain to a technique in which a detected speaker can be featured in a video stream. For example, upon detection that a person is speaking, that person may be featured in a video frame output for presenting on a display as a framed speaker shot.

Gallery View may pertain to an ability of disclosed systems and methods to generate a plurality of video streams for showing together on a display (e.g., in a tiled layout). Adaptive Layout Engine may pertain to a software-based system component that controls aspects of a Gallery View tiled layout based, for example, on detection of various conditions and/or events associated with a meeting environment.

Framing Transitions may pertain to an ability of disclosed systems and methods to employ various frame transition techniques from one shot to the next. Platform Configurations may pertain to the disclosed systems and methods being implemented as a single camera system, a multi-camera system, a fully integrated onsite video solution, a distributed or cloud-based system, and/or a system that cooperates with and/or generates video output for various video conferencing platforms.

Video shot generation and selection may pertain to different shot types that can be used to make the video experience more engaging. Shot selection may ensure that everyone in the room (e.g., meeting environment) is getting screen time, which can make meetings more inclusive for participants.

Disclosed embodiments may reference three types of shots: speaker shots, listening shots, and context shots (e.g., overview shots). Speaker shots may provide a closer view of the speaker, making it easy to follow the conversation. Listening shots may be intended to provide variety and capture the reactions of non-speaking participants. They may ensure that everyone is visually present in the conversation, even when they are not speaking. Using context shots (e.g., overview shots), remote participants may get a complete picture of what is happening in the room. A context shot (e.g., overview shot) may be shown or displayed when remote participants are speaking or when there is a lot of movement in the room.

In some embodiments, the camera may use directional microphones to determine where sound originates within a room or environment. Machine learning may enable the camera to detect the number of people that are present and where they are located. Combining these two types of data, disclosed embodiments may accurately identify who is speaking and who is listening, and may use this information to provide a video experience that represents all participants in a natural way.

Embodiments of the present disclosure may pertain to speaker framing methodologies. Speaker Framing may be implemented as an AI feature that is aware of what is happening in the room and may dynamically adapt the view based on the understanding of what the camera sees and hears. It may provide a good view of the person speaking while at the same time giving the context needed to feel comfortable participating and being a part of the conversation.

Embodiments of the present disclosure may pertain to framing using multi-camera systems. For framing people (e.g., meeting participants), rules designed to produce well-framed shots of the participants may be used. A larger number of people present in a room may contribute to greater difficulty in composing good individual shots. In some embodiments, disclosed systems and methods may focus on the head and upper body when composing the shots to capture body language and create space for connection and understanding.

When a person is alone in a room or does not sit within a predetermined distance near other participants, the camera may frame them individually. The head of the person may appear in the top third of the image to give the person as much space as possible and reduce the amount of unnecessary space on the screen. By positioning the head closer to the top of the image, disclosed systems and methods may emphasize each person's visibility and presence and may ensure that each person has enough space to move and behave naturally.

If two or more people are seated within a predetermined distance to each other, the two or more people may appear in the same shot, independently of any of them being the speaker or listeners. Group framing may ensure that the people in one group are shown in the best way, such as by including all the participants' heads and upper bodies to create the shot. The group framing displayed during a conversation may change if people move. As an example, if people are seated so that there is only one group in the room, the shot shown or displayed may include the one group, unless somebody moves.

In some embodiments, most or all the people in the room may be framed in a single shot (e.g., overview framing). For example, when remote participants are speaking, all participants in the physical meeting environment may displayed so they are all visible and can be seen in context.

Furthermore, in some embodiments, a stream may begin with 20 seconds (or any other suitable duration of time) of overview shot. This may ensure that remote participants can orient themselves in the scene, see everyone in the meeting, and receive context. If there is any large movement inside the camera's field of view, such as someone entering the room, or someone getting up from their chair and/or walking around, the virtual director may select an overview shot as the next shot. This may occur regardless of any other framing choice (e.g., if someone else is still speaking or it is time for a listening shot). This may ensure that remote participants receive context regarding the meeting environment.

If no one inside a camera's field of view is speaking (e.g., if one of the remote participants is speaking) the system may output an overview shot for display. This may allow remote participants to keep track of everyone that they are talking to and see the faces and reactions of participants who are listening. This makes provide a more comfortable setting for the remote participants to speak. In some embodiments, an overview shot includes every person inside the camera's field of view.

Full framing may pertain to a shot that utilizes the camera's entire field of view, and may be used to establish context when there is a lot of movement. This may ensure that remote participants can follow what is happening in the room when someone enters or gets up from their chair.

The rules for when Speaker Framing cuts from one shot to another may be based on several goals such as, but not limited to, wanting to capture the flow of the conversation while simultaneously creating an engaging experience for remote participants and ensuring that the in-room experience is as inclusive as possible. Speaker Framing may select the best shot type based on different conditions.

For example, whenever Speaker Framing is confident that a person is speaking, that person may be considered a speaker and may be framed either individually or as part of a group. This may apply in any scenario where there is a new or existing speaker.

If one person has spoken for more than a given number of seconds (e.g., about 7-15 seconds), a listening shot may be shown or displayed. The next listening shot may be directed to someone who has been given the least amount of screen time. If no one is speaking, the camera may output a context shot (e.g., overview shot).

Furthermore, in some embodiments, Speaker Framing may deliver a more dynamic meeting experience that feels closer to being in the same room together to allow remote participants to see who is speaking and feel more included, to help remote participants follow along with the conversation and know what is occurring in the meeting environment, to make it easier for remote participants to be an active part of the conversation by providing a better view of speaker and listeners for a greater sense of context, to make a more inclusive experience by ensuring that everyone in the room is visually present in the conversation regardless of whether they are speaking.

In some embodiments, when a person begins speaking, and the virtual director has enough confidence in it being the speaker, the person may be framed as a speaker. Additionally, or alternatively, the person may be considered to be the speaker for as long as they continue to speak. A speaker shot may include be 3 seconds long at a minimum, to allow the virtual director enough time to have enough confidence that someone else (another person) is a new speaker and to provide a more stable and enjoyable experience for any remote participant(s). A speaker shot may include a person or a group.

In some embodiments, frames may be updated three times per second. The virtual director may check the audio input, detections, and rules for which frame it should choose as the next shot. This information may be stored over time and create a history to base future decisions on. A reframe lock may pertain to the minimum duration of time a frame may be displayed or shown. For example, a reframe lock may be 2.5 seconds, meaning any new frame must be displayed for 2.5 seconds. The virtual director may also check for movement of the head and body of participants.

In some embodiments, if one speaker has spoken for more than a given number of seconds (e.g., 8, 9, or 10 seconds), the virtual director may look for the next listening shot. The next listening shot may include the person who has gotten the least amount of screentime, to ensure that everyone is visually included, and create an understanding of reactions for the remote participants. A listening shot may include one or more people who are not speaking. In some embodiments, a listening shot may be displayed for 3 seconds.

Gallery view may refer to a video stream viewing methodology aimed at providing an overview of meeting participants in addition to equity amongst participants in a video meeting. Gallery view may include a video frame divided into two or more video tiles, each of the video tiles being associated with a corresponding video stream featuring one or more objects and/or meeting participants. The relative sizes, orientations, and positions of the tiles may be used to highlight various objects or meeting participants. In some embodiments, a tile may include a video stream of a presenter or other active participant, and that tile may be highlighted relative to one or more other tiles. Furthermore, in some embodiments, tiles may feature non-active participants or may provide an overview of some or all of the meeting participants in a particular environment. Tiles may be oriented, sized, and positioned to highlight video streams of certain participants (either active or non-active) and to show relationships between participants (e.g., speaker-listener relationships, spatial relationships between participants, etc.).

Gallery view may show or display certain meeting participants in more than one tile to highlight those participants and to provide context for how those participants relate to others in a group. For example, a gallery view may include two or more tiles. In some embodiments, at least one active participant may be featured alone in a first tile and may also be shown together with one or more other participants in a second tile. The terms "first" and "second" do not specify any particular ordering, orientation, etc. of the tiles on display. Rather, the first and second tiles may designate any tiles in a gallery view of two or more tiles.

In some embodiments, Gallery View may be implemented using AI techniques and may provide an individual view of every person in a room/environment. The camera may detect the people in the room and create a split view based on the detections.

By using machine learning, the number of people in a room and the location(s) of people in a room may be detected and/or determined. These detections may be used with a ruleset/training methodology on how people should be framed to create a split view with selected framing for meeting participants.

Body language may be a significant component of communication, and by framing people with a focus on the face and upper body, a space for connection and understanding may be created.

Gallery view may make everyone in the room appear similar in size, and keep peoples' heads aligned on the screen. For example, if someone appears bigger or higher up in the image, they seem more important, and this may create an unnecessary sense of a power balance between the participants that might not actually be present.

If a person moves so that they are cropped or no longer visible in their frame, the camera may adjust the framing to capture their new position. Potential benefits may include any of the following: to create a sense of equity between all meeting participants; to make sure remote participants get a closer view of everyone in the meeting room; and/or to remove empty space in a room (walls, ceiling, floor, etc.) from the image.

Gallery view may also assist by: helping remote participants keep a full overview of every person in the meeting room; ensuring everyone gets the same amount of space and time on the screen; framing meeting participants more closely (and, in some embodiments, without interference or overlapping with other meeting participants).

The technical implementation of Gallery View may include a machine learning (ML) vision pipeline that may detect persons (head and body) in an image. By using ML and filtering techniques (e.g., Kalman-filter) it is possible to create person tracks from these detections. These tracks may not only be based on the current input detection, but may also be based on input history and contain additional information (e.g., if a person is moving). The tracks may provide input data for the virtual director unit. The virtual director unit (which may be implemented as a finite state machine) may determine the layout as well as the framing commands for each tile based on the input data and its own state.

In some embodiments, a layout engine may be configured to implement a stream with up to 4 different tiles. The layout engine may be configured to implement several different layout variants such as, but not limited to, a 1×2 split, then 2×2, and 4×4, where each tile can be associated with a separate video stream. Any numbers of tiles can also be combined and used by one stream, so one stream can, in some embodiments, take up 2 columns and 2 rows. To switch from the default overview (all participants in one tile) to a multi-tile layout, several conditions may be required: the correct number of person tracks (e.g., for the respective layout); all tracks need to be valid (e.g., person needs to be detected for a specified time such as 5 seconds); people are not moving in the image; including a waiting time (e.g., 5 seconds) after a layout switch preventing the layout from switching before it can switch again to reduce visual noise.

Additionally, if people overlap in the image, this may result in their respective tiles being merged.

In order to frame all participants, the virtual director unit may have at least three different types of framers at its disposal: overview framer, group framer; and person framer.

The overview framer may frame all participants in the image, and the person framer and group framer may be attached to, or correspond to, specific persons and groups of persons respectively. Person framers may be bound to the lifetime of their corresponding person track (and the same may be true for group framers with selected groups of persons). The virtual director unit may be responsible for supplying each framer it created with the correct subset of tracks it receives, as well as delegating and arranging the framer outputs (e.g., framing commands) in the correct way and order (e.g., according to the active layout).

In some embodiments, the virtual director unit may (i) manage the layout selection, and (ii) manage the framers who provide the individual framing commands for each tile. The virtual director unit may forward the layout information (e.g., the number of tiles, a tile arrangement, any tiles that should be merged) and the framing commands for each tile (e.g., as pan-tilt-zoom values with additional information regarding when to reframe) to the layout engine. In some embodiments, Gallery View may use hard cut transitions for layout switch and Bezier interpolation for reframing within tiles. Furthermore, the virtual directory unit may continuously evaluate the input from the vision pipeline to instruct the layout and the framing that is sent to a layout engine.

The prioritized criteria/detection may be dependent on the scenario/activity in the room or meeting environment. The virtual director unit may ensure that the speaker is in focus in the layout, and may ensure that if the speaker moves or changes position in the room, the layout will adapt accordingly. In some embodiments, the virtual director may ensure that the camera where the person is seen most from the front is used in their corresponding tile. As a meeting goes on, it may be necessary to change the layout either to give one person more space, or give each person the same size.

The virtual director unit account for the duration of time a person talks for and who talked last. For example, in a discussion, the virtual director unit may give each person the same amount of space in the layout, and ensure that their relative position is kept in the layout. As another example, if Person A is looking to the left to look at Person B, who has to look to the right to look at Person A, Person A may be placed to the right of person B in the layout. In some embodiments, gestures or body pose may also be used by the virtual director unit to control the layout. For example, if a person stands up and begins a presentation, the vision pipeline may detect this and that their whole body is in view. The virtual director unit may take this into account and instruct the layout engine that this person should take up a full column, to give them enough space.

In some embodiments, when a gesture is detected by the vision pipeline, such as a hand raise, the virtual director may take this into account and adjust the layout accordingly. For example, a person who has raised their hand may get the same tile size as the person talking in the meeting.

In some embodiments, the virtual director unit may include a software component that may take input from the vision pipeline component and determine the layout composition and what part of the primary video stream image should be used in each part of the layout. The properties that may be evaluated may include, but are not limited to: whether this person is speaking or not; for how long they have spoken; if someone is having a discussion or shorter dialogue where who is speaking changing (e.g., each person speaks for less than one minute at a time); if someone is presenting or leading a meeting (e.g., one person talking for the majority of the meeting or greater than one minute total); where they are looking; how much of the person is visible in the frame; what reactions and body language they're showing (e.g., If they're looking away, or at one person, if they're smiling or laughing, if a person is showing signs of drowsiness or closing their eyes); what other persons are visible in the frame; where individuals are moving and/or where they have been; what activity they're doing (e.g., writing on a whiteboard or drawing on a document); position and orientation; timing (e.g., avoiding frequent switching between layouts or reframing).

Embodiments of the present disclosure may include additional features and techniques including an adaptive layout engine. The adaptive layout engine may be implemented by one or more microprocessors associated with the disclosed systems and methods (e.g., one or more microprocessors associated with the video processing unit of a camera or server or cloud-based system). Among other operational capabilities, the adaptive layout engine may analyze one or more overview video streams (or any other video stream, audio stream, and/or peripheral sensor output) to detect various conditions, events, movements, and/or sounds in an environment. Based on such detections, the adaptive layout engine may determine a gallery view video layout to be shown on a display. Aspects of Gallery View controllable by the adaptive layout engine may include—but are not limited to—a number of tiles to include; tile orientation; relative size of included tiles; relative positioning of tiles; video streams selected, generated and/or designated for each tile; transitions between frames associated with one or more tiles; framing of an individual or object within a tile (e.g., Genius Framing, Speaker Framing, etc.); selection of individuals or groups of individuals to feature within Gallery View tiles (based on detected actions, total accumulated screen time, screen time equity, etc.); selection of time durations to maintain a particular shot; any other aspects and combinations thereof.

In some embodiments, the layout engine may operate by receiving instructions from the virtual director unit and composing a new video stream according to the layout instructions with a part of one or more of the primary video streams in each tile. The layout engine may also support different transitions, where the layout may be changed smoothly, or change in size depending on instructions from the virtual director unit.

Furthermore, disclosed systems and methods may use different types of transitions such as, but not limited to: hard cut, interpolated transition, and/or fading transition. Hard cut transitions may pertain to replacing a previous image or layout directly with a new image or layout from one frame to another. Interpolated transitions may pertain to transitions between a previous framing location and a new framing location in the image (e.g., in the form of a Bezier curve or other non-linear change in camera parameter value). The framing may not change its location directly within one frame transition. Instead, it may follow a calculated trajectory between the start and end framing position in the course of time (e.g., no more than 1-2 seconds). Fading transitions may pertain to putting a new image over a previous image and gradually increasing the intensity of the new image while gradually decreasing the intensity of the previous image.

For transitions on merging or splitting grid layouts, a hard cut or fading transition may be used, as interpolated transitions may add unnecessary visual noise and it may not always be possible to find the corresponding framing locations in the previous (old) and new layouts. For transitions within the cell when a person moves, an interpolated (or smooth) transition, similar to one performed for genius framing, may be used.

In some embodiments, the layout engine may provide multiple streams in addition to composing the video in one mainstream, and each of the streams may correspond to one tile in the layout. These streams may be provided to the host/computer/client so each video stream can be treated and adapt the overall layout in the video client.

The virtual director may also be instructed by the video client with preferences/requirements on which layouts should be provided. In some embodiments, the client may only support one output stream. The client can provide this requirement to the virtual director and the virtual director may instruct the layout engine to only provide layouts with one output stream. In other scenarios the client might have preferences on which types of layouts it wants to display.

Potential scenarios or situations captured by disclosed systems and methods may include: meeting in normal room, someone talking for long time; discussions; brainstorming; standup; presentation; security/surveillance; collaboration drawing on canvas, or multiple canvases can be stitched together; or any of the scenarios previously listed but with multiple cameras in the room, with and without canvas.

In some embodiments, in a big collaborative room, a multi-camera system may include 6 cameras: 3 cameras pointing to 3 whiteboards attached to a wall, and three cameras on the opposite side facing the whiteboard to frame participants using the whiteboard. As the vision pipeline detects a person or movement/changes to a whiteboard and a person in front of the whiteboard, the virtual director unit may create a layout accordingly. For example, a professor may have a lecture using all three whiteboards and may move back and forth between them as they present. The vision pipeline may detect this and on which whiteboard there is activity. The vision pipeline may then instruct the layout engine to frame the area of the whiteboard where there is currently activity in one cell, while keeping the section where there previously was activity in the other cell, while keeping the professor presenting continuously in a third cell. Always using the camera feed and perspective that best shows the section of the whiteboard and the professor.

The virtual director unit may serve multiple roles. It may manage layout selection and manage the framers (e.g., software components) that may provide the individual framing commands for each tile. The virtual director unit may forward the layout information (e.g., number of tiles, tile arrangement, tiles that should be merged) and the framing commands for each tile (e.g., as pan-tilt-zoom values with an additional information when to reframe) to the layout engine. As an example, Gallery View may use hard cut transitions for layout switches and Bezier interpolation transitions for reframing within tiles.

Figure 22:
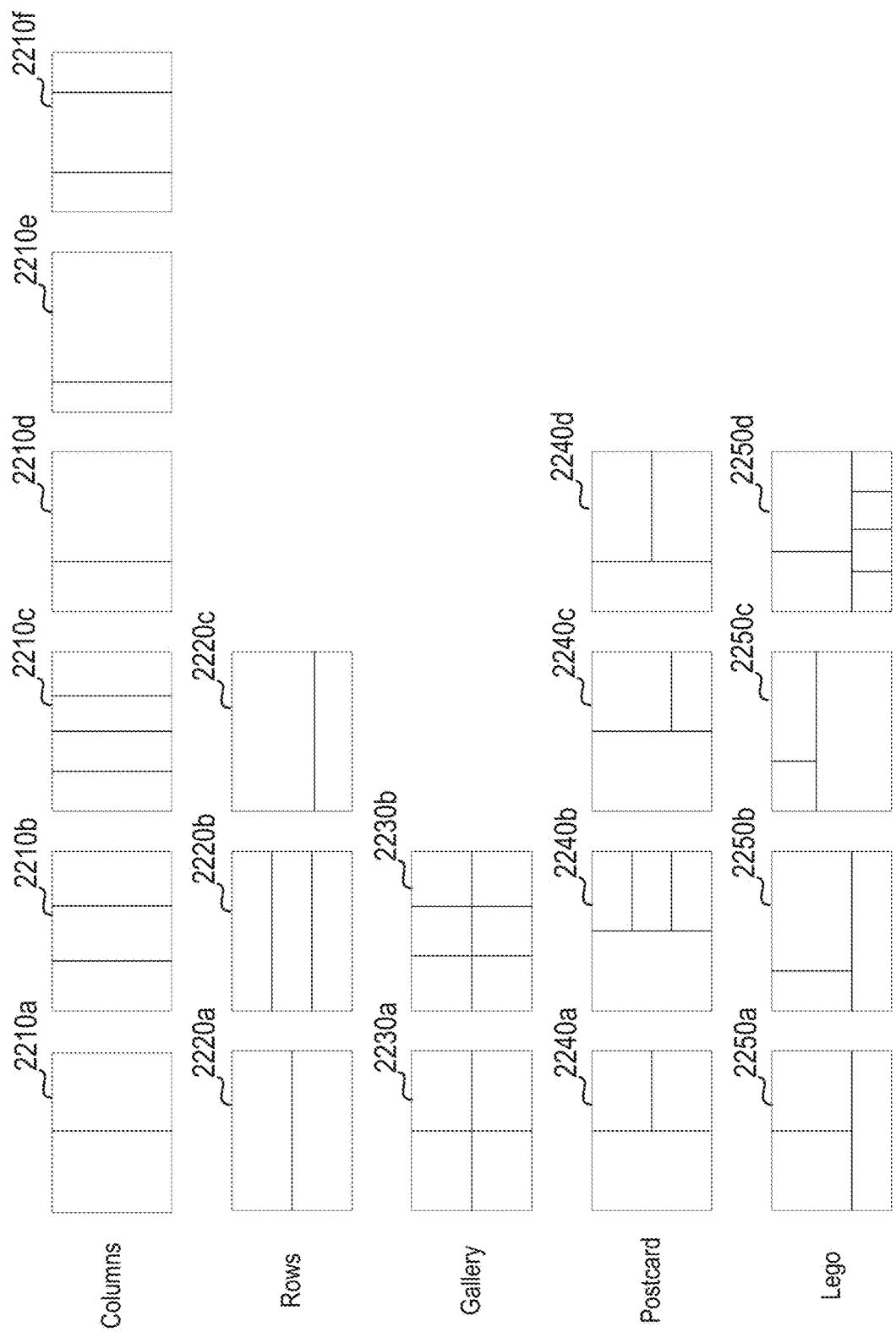
FIG. 22 provides examples of tile layouts, consistent with some embodiments of the present disclosure.

FIG. 22 illustrates examples of tile layouts. As shown in FIG. 22, example tile layouts may include column layouts 2210a-f, row layouts 2220a-c, gallery layouts 2230a-b, postcard layouts 2240a-d, and lego layouts 2250a-d. It is contemplated that any arrangement of tiles may be formed on a display, and tile layouts are not limited to the examples shown herein. Furthermore, the example layouts provided are given names and/or categories for explanatory purposes, and are not limited to the names and/or categories provided herein.

Furthermore, examples of the adaptive layout engine relative to a video conferencing scenario are provided herein. The multi-camera system may be installed in a meeting room that fits 8 people. The multi-camera system may include seven cameras, with three cameras placed in front of the room, one camera placed underneath the TV, one camera of the left side of the meeting room, one camera on the right side of the meeting room, and one camera attached to a whiteboard on a back wall.

When the room is not in a meeting, the system may be inactive. Four people may enter the room and two people may sit on the right side of the table and two other people may sit on the left side of the table. The people may interact with the video client and start a video conferencing meeting. The video client may begin consuming a video stream from the system as the system starts.

The vision pipeline may detect that there are four people in the room and may detect the distance between each person. Then, the virtual director unit may pick an overview shot from the center most camera to give the far end participants an overview of the room.

When the meeting begins, everyone in the room may introduce themselves. As the first participant starts talking in the room, the vision pipeline may detect that the first participant is talking, and the virtual director unit may check how far apart the participants are. As an example, the virtual director unit may determine that each participant is far enough apart that each person can be given their own tile. The virtual director unit may instruct the layout engine to transition to a 3×3 layout, and the frame coordinates of the person speaking may take up the first two rows in all 3 columns. And each of the non speaking participants may take up one column in the last row.

At the same time, the vision pipeline may detect each person's gaze, head, and body position. The vision pipeline may select a camera where most of the person's face is visible, for each person. For the participants on the left side of the table that are looking at the person talking on the right side of the table it may be the right side camera. The vision pipeline may detect their position, and the virtual director may find a fitting frame based on their gaze, previous movements, and body size. The virtual director may then instruct the layout engine to frame the corresponding streams from the different picked camera. In this case the two persons on the left side may be framed using a stream from the right camera, while the two persons on the right from left. Each framing may represent each person in the same size. This may occur before any change may be applied by the virtual director in the next steps, and continuously between each step. If the virtual director determines that one person is looking in a different direction than in the selected camera frame and enough time has passed since the previous change, it may change the camera feed in the corresponding persons tile (or cell) to the camera feed where most of that person's face can be seen.

When the next person starts talking the vision pipeline may detect this, and after a designated duration of time has passed, it may switch to this person taking up the first two rows in all the columns. The previous speaker may then transition to be in a tile at the bottom row.

When everyone in the room has introduced themselves, the people participating on the far end may introduce themselves. The vision pipeline may detects that no one in the room is speaking, but the system may be playing audio from the far end. The virtual director may then transition to showing an 2×2 layout where each participant takes up one 1 cell, and where each person is taking up the same size in their cell.

After the introduction, the group may begin to discuss a topic. The second person on the left side may introduce the topic. As the vision pipeline detects the speaker, the virtual director may instruct the layout engine to go to a 3×3 layout where the speaker may take up the first two rows in each of the columns, and the other participants in the bottom row.

After the topic has been introduced, the first person on the right side may speak, and the system may again transition to this person taking up the largest cell.

After a short time, the second person on the right side may say something. The vision pipeline may detect this and the virtual director, taking previous actions into account, may transition to a dialog setup, and instruct the layout engine to transition to a 2×1 grid where the people on the right side take up one cell and the people on the left side takes up one cell. The virtual director may take their gaze and head position, and may ensure that the framing is equal size. Spacing may be added asymmetrically in front of where a person is looking.

After a short discussion in the room, one of the far end position participants may speak, and as the vision pipeline detects that a far end participant is talking it may maintain the previous layout. However, as each person is now looking at the screen, the vision pipeline may continue to evaluate each person's gaze. For example, if they are all looking at the screen above the center camera, it will transition to showing framing from the center camera stream in the two cells.

The discussion may go back to the room, and one participant may want to present their idea and walk up to the whiteboard in the back of the room. As the vision pipeline detects that the person is moving by seeing the speed of the track associated with the person, the virtual director may follow the person, and a cell may be dedicated to follow the person. The virtual director may instruct the layout engine to display a 2×2 grid, where each person takes up one cell.

When the person arrives at the whiteboard they may begin writing on the whiteboard. The vision pipeline may detect activity on the whiteboard, and the virtual director may instruct the layout engine to change to a 3×3 layout where the streams from the canvas/whiteboard camera may take up the first two rows of the two first columns, and the person writing on the whiteboard may be framed by the camera that best captures their face in the first two rows of the last columns. Each of the other participants may take up one cell in the bottom column, using the camera that best sees their face.

The person on the whiteboard may have been talking for several minutes presenting their idea, and the first person on the right side may have a comment. They then raise their hand to not interrupt the person at the whiteboard. As the vision pipeline detects that they may have raised their hand, the virtual director may keep the same framing until a designated duration of time has passed. Once the threshold has been reached, the virtual director unit may instruct the layout engine that the person raising their hand should take up the two cells in the two first rows in the last column while the person on the whiteboard moves down to the bottom row.

When the group starts discussing the comment being presented, the person on the whiteboard may stop writing. When the vision pipeline detects no more changes to the whiteboard and a designated duration of time has elapsed, the virtual director may instruct the layout engine to go back to a 2×2 layout where the person on the whiteboard and the one person on the left side may take up one cell each in the first column. The two people still sitting on the right side may share the second column, as they may have moved closer to see the whiteboard better.

When the discussion is over, the meeting may adjourn, and the vision pipeline may detect that people are getting up or waving. The vision pipeline unit may provide instructions to return to an overview framing from the center, showing all the people in the room and them waving goodbye.

Embodiments of the present disclosure may include features and techniques for providing an Equal Equity Framer. Equal Equity Framers my provide experiences where everyone can contribute and participate on the same level in a meeting. This may be achieved by including everyone visually in the conversation.

In scenarios where there is one or few people carrying most of the conversation, it may be desirable to provide remote participants with context they need to follow along with the conversation and know what is happening in the room. To foster collaboration, it may be important for all meeting participants to feel connected and have the same opportunity to contribute. This may be easier if participants (remote and in-person) can see reactions and engagement from everyone.

For example, if there are people present in a meeting room that would be seen by remote participants if they were also in the physical meeting room, the remote participants should be able to see them via video conferencing as well. Switching occasionally from the speaker to the listeners may improve the video conferencing experience, making it more engaging for the remote participant.

Rules and/or machine learning (ML) system training may dictate when it is appropriate to switch from a speaker shot to a listening shot. If there are more people than two in a room, there may also be several possibilities for a listening shot. An equal equity measure may be obtained, the equal equity measure may include a score of the equity to determine what will be the next listening shot.

The equity score may be rated from 0-1. An equity score closer to 1 may indicate a more even distribution of screen time to everyone in the room. The Equal Equity Framer may choose the next listening shot based on who has had the least amount of screen time.

Embodiments of the present disclosure may include features and techniques for improving transitions and framing methodologies in video conferencing systems. Framing methodologies (e.g., speaker framing, listener framing, etc.) may use two or more types of transitions between shots: smooth transitions and hard cuts. The type of transition used may depend on how different the shots to be transitions to and from are. If there are only minor differences between the two shots, smooth transitions may be used. In some embodiments, smooth transitions may be used when transitioning toward an overview shot. Hard cuts may be used when there are significant differences between shots, such as when the view switches from one side of the table to the other.

Additionally, or alternatively, various types of transition types may be employed when transitioning from an initial frame (e.g., any of a speaker frame, a Genius framed object/subject, a gallery view framed video tile, etc.) to a target frame.

For example, abrupt changes between an initial frame and a target frame separated by large differences in camera parameter values may be distracting to users. In some embodiments, multi-camera systems may provide a smooth transition from an initial frame to a target frame by non-linearly changing at least one camera parameter value (e.g., zoom, pan, etc.) over three or more frames (e.g., of a primary video stream as framing is adjusted to feature a speaker, object, etc.).

The number of frames (e.g., transition time) included between the initial frame and the target frame may vary based on characteristics of the initial and target frames. For example, the transition time may vary based on the direction of a planned camera parameter change (e.g., zooming out vs. zooming in) or based on the magnitude of a planned change (e.g., small changes may be associated with longer transition times).

Disclosed embodiments may identify a new target frame prior to completion of an ongoing transition (e.g., in response to a newly detected condition or target frame trigger, such as a person entering a room, etc.). Rather than completing the ongoing transition before transitioning to the new target frame, the ongoing transition may be altered or adjusted. For example, a deceleration phase of a current transition may be omitted, an acceleration phase of a next transition may be omitted, and/or a current transition rate of an ongoing transition may be matched to an initial rate of transition of a planned transition.

Embodiments of the present disclosure may include multi-camera systems, and the multi-camera systems may include any suitable number of cameras. In some embodiments, a single camera may be provided. The single camera may be configured to generate an overview video stream representative of a region of an environment. Based on analysis of this overview stream, one or more primary video streams may be generated relative to the overview stream. For example, individual participants, objects, etc. may be detected in the overview stream, and based on those detections one or more primary video streams may be generated, each featuring at least one of the detected participants, objects, etc. The primary video streams may each represent a subset of the overview video stream. Additionally, or alternatively, the primary video streams may have different camera characteristics relative to the overview video stream. For example, each primary video stream may have a pan value, tilt value, and/or zoom value different from pan, tilt, and/or zoom values associated with the overview video stream. A final video display layout may include any combination of the primary video streams (one or more), optionally together with the overview video stream, each featured in a separate tile of the layout. The primary/overview video streams shown in each tile, the number of tiles in the layout, the size of the tiles in the layout, and the orientation of tiles in the layout may be controlled based on analysis of the overview video stream (e.g., using any of the techniques described above).

In some embodiments, disclosed embodiments may include a plurality of cameras. Each of the cameras may generate a corresponding overview video. Similar to the technique described above for the single camera system, in some embodiments, primary video streams may be generated as subsets of overview video streams supplied by any of the plurality of cameras. One or more of these primary video streams may be shown on a display, optionally together with the overview video stream of one or more of the plurality of cameras. For example, the primary video stream(s) and, optionally the overview video stream(s), may be shown in respective tiles of a video tile layout shown on the display. The primary/overview video streams shown in each tile, the number of tiles in the layout, the size of the tiles in the layout, the orientation of tiles in the layout, etc. may be controlled based on analysis of the overview video stream (e.g., using any of the techniques described above).

Moreover, as each camera may be associated with a different field of view, perspective, etc., the multi-camera system may offer more options for primary video streams featuring a particular subject. For example, in a single camera embodiment, in some cases, a subject may be represented in the overview video stream from the side (e.g., side profile). In turn, a primary video stream derived from the overview video stream and featuring the subject (in the single camera case) may also represent the subject from the side or front profile. In the multi-camera embodiment, however, there may be possibility that the subject is captured by more than one camera and, therefore, represented in the overview streams of more than one camera. Based on analysis of one or more of the overview video streams, the system may determine that the subject should be featured in a primary video stream shown in a tile of a video tile layout. Rather than generating the primary video stream based on the sole overview video stream (as in the single camera case), in the multi-camera case, there may be multiple options for generating the primary video stream featuring the particular subject. In some cases, the primary video stream may be derived from an overview video stream in which the subject may be represented as facing toward the camera. In other cases, the primary video stream may be derived from an overview video stream in which the subject is represented as not facing toward the camera, but rather turned to one side or the other. In other embodiments, the primary video stream may be derived from an overview video stream in which the subject is represented as facing away from the camera. Non-limiting examples of criteria for selecting the originating overview video stream may include whether the subject is presenting to an audience, whether the subject is interacting with an active meeting participant, and whether the primary video stream should exclude or include other participants.

Notably, in a multi-camera system, there may also be an ability to actively control one or more of the cameras to acquire source video streams designed to provide desired primary video streams. For example, based on the overview video stream of one or more of the cameras, a particular subject may be identified for featuring in at least one primary video stream. Rather than deriving the primary video stream representing the subject from an overview video stream, however, one or more of the plurality of cameras included in the multi-camera system may be actively controlled to capture a desired shot of the subject. This may include zooming in on the subject using a camera facing the front of the subject, or panning or tilting a camera toward the subject. In this way, the cameras included in the multi-camera system may operate in an overview video mode, in a primary video mode, or in the overview video mode during some time periods and in the primary video mode during other time periods.

Furthermore, disclosed systems and methods may provide several types of video output. In some embodiments, systems may provide a multi-stream, tiled video layout for showing on a display. Additionally, or alternatively, systems may provide multiple video streams (e.g., one or more overview video streams, one or more primary video streams, layout steams etc.) as output. In such a case, another system (e.g., a server, Web-based system, cloud-based system, MS Teams, Zoom, Google Meet, WebEx, etc.) may receive the video streams output like speaker, presenter, overview, person, group, gesture streams and/or layout (like Gallery view) and adaptive layout streams from disclosed embodiments and show some or all of the video streams on a display according to shot selection criteria, for example, specific to the system's platform.

The virtual director unit may take in machine learning (ML) vision/audio and information regarding previous events to decide which image or part of an image (from one or more cameras) should be placed in a composed video stream-whether that includes a composite video (tiled layout) or a multi-stream video output. In some embodiments, the virtual director unit decides on the layout format based on earlier detected events. Some potential benefits of this system may include the use of display real estate in the video stream to better show participants to bring far end participants closer to the meeting (e.g., to blur the border between meeting room and far end participants).

Disclosed embodiments may operate relative to a variety of different environments and settings. Such environments and settings may include, for example, classrooms, boardrooms, meeting spaces, conference rooms, home offices, or any other environment from which a fixed or mobile camera can be used to capture an image of an individual or object.

The disclosed systems may also respond to various types of meeting participants. For example, the systems may feature active participants in one or more video frames. An active participant may include any individual engaged in at least one detectable action (e.g., detectable through video or audio analysis). Such actions may include, for example, speaking, moving one or more parts of the body (e.g., mouth movement, hand raising, head nodding or shaking, changes in facial expressions), exhaling, generating non-speech audible sounds, and/or moving into or out of an environment. As described above, the system may also feature non-active participants in one or more video frames. A non-active participant may include any individual not currently engaged in a detectable (or detected) action. Such a non-active participant may be, for example, sitting or standing quietly in an environment without engaging in detectable (or detected) motion, speaking, or sound generation.

Some group framing features described above have been described relative to single camera systems for explanatory systems. It should be noted, however, that the same principles may also be applied to multi-camera systems and setups. For example, any of the framing methodologies, transition methodologies, speaker views, gallery views, overview shots, and other features and techniques discussed herein may be employed in a multi-camera system.

Additionally, or alternatively, the group framing/group shot can be executed with or without speaker framing/AI. For example, in some embodiments, the speaker framing techniques described above may be employed by systems including two, three, or more cameras. Additionally, it can be shown in a hard cut presentation, gallery view, or in a dynamic layout like speaker framing. Thus, it is possible on both single camera and in multi-camera setups.

As an example, a subject/person framing step may be executed by two or more of the cameras included in a multi-camera group. Because each camera may have a unique field of view, pointing direction, zoom level, and/or focal length, a sub-frame of a particular subject generated or enabled based on the output of a first camera may be more preferred than a sub-frame of the same subject generated or enabled by a second camera. Due to differences in the field of view between two cameras, a subject may be framed alone based on the output of a first camera, while the same subject is framed together with a second subject based on the output of a second camera. In some embodiments, the frame showing the single subject may be preferred over a frame showing multiple subjects (e.g., where the single subject is determined to be speaking or where there is a desire to focus on or highlight the single subject without showing other subjects). In some embodiments, such as where there are conversations occurring between subjects, it may be preferable to show multiple subjects together rather than splitting the subjects among sub-frames.

Furthermore, in some embodiments, disclosed embodiments may transition between a sub-frame from a first camera showing a single, first subject to a sub-frame from a second camera showing the first subject together with at least one other subject (and vice versa).

The disclosed systems and methods may also transition between a sub-frame from a first camera showing a single, first subject to a sub-frame from a second camera showing a single, second subject (and vice versa). Such a system may be useful where the first camera cannot capture the face of the second subject and/or where the second camera cannot capture the face of the first subject.

In some embodiments, a multi-camera system may include dedicated cameras for each seating location in a venue (e.g., together with a dedicated microphone), where each dedicated camera may be used to generate sub-frames representing a single subject. These dedicated cameras may be combined with one or more overview cameras capable of generating sub-frames showing multiple subjects together.

Figure 23A:
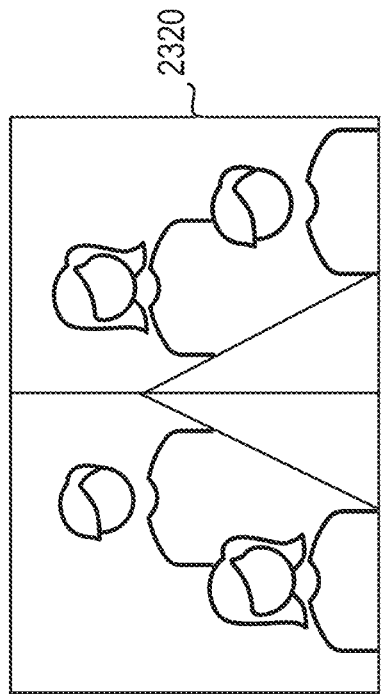
FIGS. 23A-23B provide examples of composition layouts/group shots, consistent with some embodiments of the present disclosure.
Figure 23A:
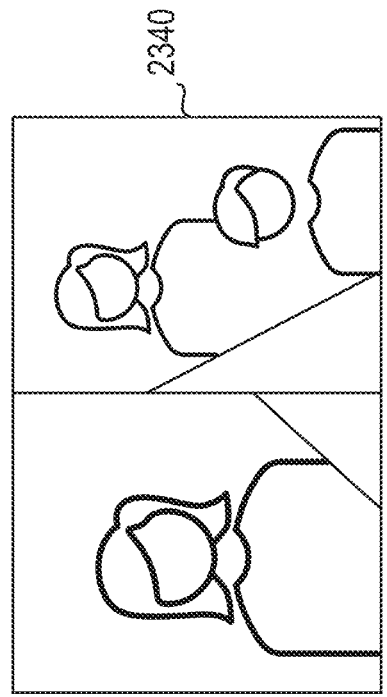
Figure 23B:
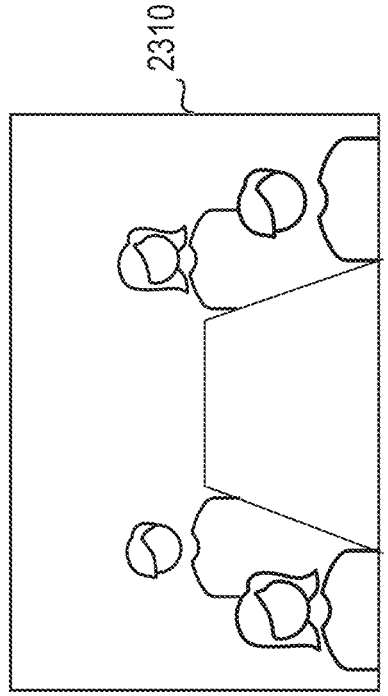
Figure 23B:
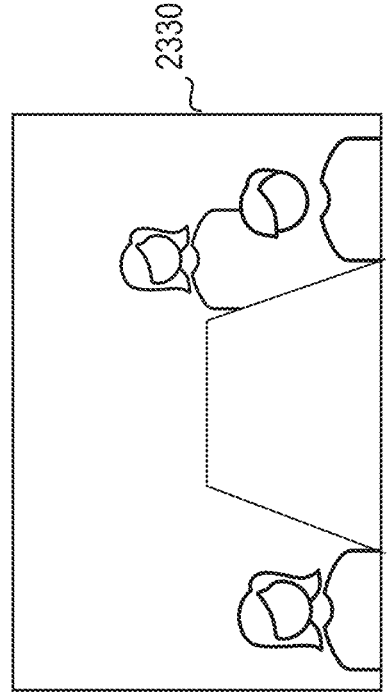

FIGS. 23A-23B illustrate examples of composition layouts/group shots. As shown in FIG. 23A, four meeting participants represented in overview stream 2310. A composition layout 2320 may be selected, determined, and output, grouping meeting participants together and presenting the group shots as tiles in a gallery view. As shown in FIG. 23B, three meeting participants may represented in overview stream 2330. A composition layout 2340 may be selected, determined, and output, grouping meeting participants together and presenting the group shot(s) as tiles in a gallery view.

The foregoing description has been presented for purposes of illustration. It is not exhaustive and is not limited to precise forms or embodiments disclosed. Modifications and adaptations of the embodiments will be apparent from consideration of the specification and practice of the disclosed embodiments. While certain components have been described as being coupled to one another, such components may be integrated with one another or distributed in any suitable fashion.

Moreover, while illustrative embodiments have been described herein, the scope includes any and all embodiments having equivalent elements, modifications, omissions, combinations (e.g., of aspects across various embodiments), adaptations and/or alterations based on the present disclosure. The elements in the claims are to be interpreted broadly based on the language employed in the claims and not limited to examples described in the present specification or during the prosecution of the application, which examples are to be construed as nonexclusive. Further, the steps of the disclosed methods can be modified in any manner, including reordering steps and/or inserting or deleting steps.

In some embodiments, operations and functions performed by a disclosed system, or by a video processing unit of a disclosed multi-camera system, may additionally or alternatively be implemented as steps of a method or process. In some embodiments, the steps of methods disclosed herein may be performed by features of disclosed systems (e.g., by a video processing unit of a multi-camera system disclosed herein).

The features and advantages of the disclosure are apparent from the detailed specification, and thus, it is intended that the appended claims cover all systems and methods falling within the true spirit and scope of the disclosure. As used herein, the indefinite articles "a" and "an" mean "one or more." Similarly, the use of a plural term does not necessarily denote a plurality unless it is unambiguous in the given context. Words such as "and" or "or" mean "and/or" unless specifically directed otherwise. Further, since numerous modifications and variations will readily occur from studying the present disclosure, it is not desired to limit the disclosure to the exact construction and operation illustrated and described, and accordingly, all suitable modifications and equivalents may be resorted to, falling within the scope of the disclosure.

Throughout this application, various embodiments of the present disclosure may be presented in a range format. It should be understood that the description in range format is merely for convenience and brevity and should not be construed as an inflexible limitation on the scope of the present disclosure. Accordingly, the description of a range should be considered to have specifically disclosed all the possible subranges as well as individual numeric values within that range. For example, description of a range such as from 1 to 6 should be considered to include subranges such as from 1 to 3, from 1 to 4, from 1 to 5, from 2 to 4, from 2 to 6, from 3 to 6, and so forth, as well as individual numbers within that range, for example, 1, 2, 3, 4, 5, and 6. This applies regardless of the breadth of the range.

Other embodiments will be apparent from consideration of the specification and practice of the embodiments disclosed herein. It is intended that the specification and examples be considered as example only, with a true scope and spirit of the disclosed embodiments being indicated by the following claims.

For example, disclosed embodiments may include: a multi-camera system, comprising: a plurality of cameras each configured to generate a video output stream representative of a meeting environment, wherein a first representation of a meeting participant is included in a first video output stream from a first camera included in the plurality of cameras, and wherein a second representation of a meeting participant is included in a second video output stream from a second camera included in the plurality of cameras; and a video processing unit configured to: automatically analyze the first video output stream and the second video output stream, based on at least one identity indicator, to determine whether the first representation of the meeting participant and the second representation of the meeting participant correspond to a common meeting participant; evaluate the first representation and the second representation of the common meeting participant relative to one or more predetermined criteria; select, based on the evaluation, either the first video output stream or the second video output stream as a source of a framed representation of the common meeting participant to be output as a primary video stream; and generate, as an output of the multi-camera system, the primary video stream including the framed representation of the common meeting participant.

In the multi-camera system, a third representation of a meeting participant is included in the first video output stream from the first camera included in the plurality of cameras, and wherein a fourth representation of a meeting participant is included in the second video output stream from the second camera included in the plurality of cameras, and wherein the video processing unit is further configured to analyze the first video output stream and the second video output stream, based on the at least one identity indicator, to determine whether the third representation of the meeting participant and the fourth representation of the meeting participant correspond to another common meeting participant.

In the multi-camera system, the video processing unit is further configured to: evaluate the third representation and the fourth representation of the another common meeting participant relative to one or more predetermined criteria; select, based on the evaluation, either the first video output stream or the second video output stream as a source of a framed representation of the another common meeting participant to be output as an alternative primary video stream; and generate, as an output of the multi-camera system, the alternative primary video stream including the framed representation of the another common meeting participant.

In the multi-camera system, the common meeting participant and the another common meeting participant are shown together in the alternative primary video stream if a number of interleaving meeting participants between the common meeting participant and the another common meeting participant is four or less.

In the multi-camera system, the video processing unit is further configured to determine whether the common meeting participant or the another common meeting participant is speaking and, based on the determination, generate the primary video stream as an output of the multi-camera system if the common meeting participant is determined to be speaking and generate the alternative primary video stream as an output of the multi-camera system if the another common meeting participant is determined to be speaking.

In the multi-camera system, the determination of whether the common meeting participant or the another common meeting participant is speaking is based on directional audio information received at the video processing unit from one or more directional microphones.

In the multi-camera system, the determination of whether the common meeting participant or the another common meeting participant is speaking is based on output of a trained network configured to detect voice activity based on input including one or more captured images or one or more audio signals.

In the multi-camera system, the determination of whether the common meeting participant or the another common meeting participant is speaking is based on lip movement detection across a plurality of captured image frames.

In the multi-camera system, the video processing unit is further configured to determine whether the common meeting participant or the another common meeting participant is speaking and, based on the determination, generate the primary video stream as an output of the multi-camera system if the common meeting participant is determined to be not speaking and generate the alternative primary video stream as an output of the multi-camera system if the another common meeting participant is determined to be not speaking.

In the multi-camera system, the output of the multi-camera system includes both the primary video stream and the alternative primary video stream for inclusion in respective tiles to be shown on a display.

In the multi-camera system, the output of the multi-camera system includes one or more additional primary video streams for inclusion in additional respective tiles to be shown on the display.

In the multi-camera system, the output of the multi-camera system is alternated between the primary video stream and the alternative primary video stream.

In the multi-camera system, the alternation between the primary video stream and the alternative primary video stream includes a hard cut transition between the primary video stream and the alternative primary video stream.

In the multi-camera system, the alternation between the primary video stream and the alternative primary video stream includes a smooth transition between the primary video stream and the alternative primary video stream.

In the multi-camera system, the alternation between the primary video stream and the alternative primary video stream is based on whether the common meeting participant or the another common meeting participant is determined to be speaking.

In the multi-camera system, a transition between the primary video stream and the alternative video stream occurs after a delay of at least 8 seconds.

In the multi-camera system, the alternation between the primary video stream and the alternative primary video stream is based on whether the common meeting participant or the another common meeting participant is determined to be listening.

In the multi-camera system, a transition between the primary video stream and the alternative video stream occurs after a delay of at least 3 seconds.

In the multi-camera system, the alternative primary video stream includes a representation of a face of the another common meeting participant and a representation of at least a portion of a back of a head of the common meeting participant.

In the multi-camera system, the alternative primary video stream includes a representation of a face of the another common meeting participant and a representation of at least a face of the common meeting participant.

In the multi-camera system, the alternative primary video stream includes a representation of a face of the another common meeting participant, a representation of at least a face of the common meeting participant, and a representation of a face of at least one interleaving meeting participant.

In the multi-camera system, the one or more predetermined criteria includes a looking direction of the common meeting participant determined relative to each of the first and second video output streams.

In the multi-camera system, the one or more predetermined criteria includes a face visibility score associated with the common meeting participant determined relative to each of the first and second video output streams.

In the multi-camera system, the common meeting participant is determined to be speaking, listening, or reacting.

In the multi-camera system, the first or second camera associated with the selected first or second video output stream is designated as a preferred camera associated with the common meeting participant.

In the multi-camera system, the common meeting participant is centered in an output associated with the preferred camera.

In the multi-camera system, the meeting environment includes at least one of a board room, classroom, lecture hall, videoconference space, or office space.

Further, in other embodiments, a multi-camera system comprises: a plurality of cameras each configured to generate a video output stream representative of a meeting environment, wherein a first representation of a meeting participant is included in a first video output stream from a first camera included in the plurality of cameras, and wherein a second representation of a meeting participant is included in a second video output stream from a second camera included in the plurality of cameras; and a video processing unit configured to: automatically analyze the first video output stream and the second video output stream, based on at least one identity indicator, to determine whether the first representation of the meeting participant and the second representation of the meeting participant correspond to a common meeting participant, wherein the at least one identity indicator includes a feature vector embedding determined relative to the first representation of the meeting participant and the second representation of the meeting participant; evaluate the first representation and the second representation of the common meeting participant relative to one or more predetermined criteria, wherein the one or more predetermined criteria include a combination of: whether the common meeting participant is detected as speaking, a head pose of the common meeting participant, and a face visibility level associated with the common meeting participant; select, based on the evaluation, either the first video output stream or the second video output stream as a source of a framed representation of the common meeting participant to be output as a primary video stream; and generate, as an output of the multi-camera system, the primary video stream including the framed representation of the common meeting participant.

In the multi-camera system, the meeting environment includes at least one of a board room, classroom, lecture hall, videoconference space, or office space.

What is claimed is:

1. A multi-camera system, comprising:
a plurality of cameras configured to generate a plurality of video output streams representative of a meeting environment including a plurality of meeting participants, wherein representations of the plurality of meeting participants are captured across the plurality of video output streams; and
a video processing unit configured to:
  detect, using machine learning, a number of meeting participants present in the meeting environment and a location of each of the plurality of meeting participants;
  automatically analyze each video output stream of the plurality of video output streams, based on at least one identity indicator, the number of meeting participants, and the location of each meeting participant, to determine whether one or more representations of one or more meeting participants in each video output stream and another one or more representations of one or more meeting participants in another video output stream correspond to one or more common meeting participants by:
    determining one or more distances between a first one or more feature vectors, each feature vector of the first one or more feature vectors corresponding to a representation of a meeting participant in a first video output stream, and a second one or more feature vectors, each feature vector of the second one or more feature vectors corresponding to a representation of a meeting participant in a second video output stream; and
    associating, based on the determined one or more distances, a first feature vector of the first one or more feature vectors and a second feature vector of the second one or more feature vectors with a common meeting participant, wherein the determined one or more distances is less than a predetermined threshold;
  evaluate a first representation from a third video output stream and a second representation from a fourth video output stream of a particular common meeting participant relative to one or more predetermined criteria;
  select, based on the evaluation, either the third video output stream or the fourth video output stream as a source of a framed representation of the particular common meeting participant to be output as a primary video stream; and generate, as an output of the multi-camera system, the primary video stream including the framed representation of the particular common meeting participant.

2. The multi-camera system of claim 1, wherein the video processing unit includes at least one microprocessor deployed in a housing associated with one of the plurality of cameras.

3. The multi-camera system of claim 1, wherein the video processing unit includes a plurality of logic devices distributed across two or more of the plurality of cameras.

4. The multi-camera system of claim 1, wherein the video processing unit is remotely located relative to the plurality of cameras.

5. The multi-camera system of claim 1, wherein the at least one identity indicator includes a body outline or profile shape.

6. The multi-camera system of claim 1, wherein the at least one identity indicator includes at least one body dimension.

7. The multi-camera system of claim 1, wherein the at least one identity indicator includes at least one color indicator.

8. The multi-camera system of claim 7, wherein the at least one color indicator is associated with clothing representations included in the first representation and the second representation of the meeting participant.

9. The multi-camera system of claim 7, wherein the at least one color indicator is associated with skin representations included in the first representation and the second representation of the meeting participant.

10. The multi-camera system of claim 7, wherein the at least one color indicator is associated with hair representations included in the first representation and the second representation of the meeting participant.

11. The multi-camera system of claim 1, wherein the at least one identity indicator includes tracked lip movements.

12. The multi-camera system of claim 11, wherein the video processing unit is further configured to determine whether the first representation of the meeting participant and the second representation of the meeting participant correspond to the common meeting participant based on analysis of a first audio track associated with the first video output stream and a second audio track associated with the second video output stream, in combination with the tracked lip movements.

13. The multi-camera system of claim 1, wherein the at least one identity indicator includes at least one embedding determined for each of the first representation and the second representation and also at least one color indicator associated with each of the first representation and the second representation.

14. The multi-camera system of claim 1, the system further including a third representation of a meeting participant included in a fifth video output stream, and wherein the video processing unit is further configured to analyze the third fifth video output stream, based on the at least one identity indicator, to determine whether the third representation of the meeting participant also corresponds to the particular common meeting participant.

15. The multi-camera system of claim 1, wherein a third representation of a meeting participant is included in the third video output stream, and wherein a fourth representation of a meeting participant is included in the fourth video output stream, and wherein the video processing unit is further configured to analyze the third video output stream and the fourth video output stream, based on the at least one identity indicator, to determine whether the third representation of the meeting participant and the fourth representation of the meeting participant correspond to another particular common meeting participant.

16. The multi-camera system of claim 15, wherein the video processing unit is further configured to:
evaluate the third representation and the fourth representation of the another particular common meeting participant relative to one or more predetermined criteria;
select, based on the evaluation, either the third video output stream or the fourth video output stream as a source of a framed representation of the another particular common meeting participant to be output as an alternative primary video stream; and
generate, as an output of the multi-camera system, the alternative primary video stream including the framed representation of the another particular common meeting participant.

17. The multi-camera system of claim 16, wherein the particular common meeting participant and the another particular common meeting participant are shown together in the alternative primary video stream if a number of interleaving meeting participants between the particular common meeting participant and the another particular common meeting participant is four or less.

18. The multi-camera system of claim 16, wherein the particular common meeting participant and the another particular common meeting participant are shown together in the alternative primary video stream if a distance between the particular common meeting participant and the another particular common meeting participant is less than two meters.

19. The multi-camera system of claim 16, wherein the output of the multi-camera system further includes an overview video stream including a representation of the particular common meeting participant along with one or more other meeting participants.

20. The multi-camera system of claim 19, wherein the overview video stream and the primary video stream are to be shown in respective tiles on a display.

21. The multi-camera system of claim 16, wherein the video processing unit is further configured to determine whether the particular common meeting participant or the another particular common meeting participant is speaking and, based on the determination, generate the primary video stream as an output of the multi-camera system if the common particular meeting participant is determined to be speaking and generate the alternative primary video stream as an output of the multi-camera system if the another particular common meeting participant is determined to be speaking.

22. The multi-camera system of claim 16, wherein the output of the multi-camera system is alternated between the primary video stream and the alternative primary video stream.

23. The multi-camera system of claim 22, wherein the alternation between the primary video stream and the alternative primary video stream includes a hard cut transition between the primary video stream and the alternative primary video stream.

24. The multi-camera system of claim 22, wherein the alternation between the primary video stream and the alternative primary video stream includes a smooth transition between the primary video stream and the alternative primary video stream.

25. The multi-camera system of claim 22, wherein the alternation between the primary video stream and the alternative primary video stream is based on whether the particular common meeting participant or the another particular common meeting participant is determined to be speaking.

26. The multi-camera system of claim 25, wherein a transition between the primary video stream and the alternative video stream occurs after a delay of at least 8 seconds.

27. The multi-camera system of claim 22, wherein the alternation between the primary video stream and the alternative primary video stream is based on whether the particular common meeting participant or the another particular common meeting participant is determined to be listening.

28. The multi-camera system of claim 27, wherein a transition between the primary video stream and the alternative video stream occurs after a delay of at least 3 seconds.

29. The multi-camera system of claim 25, wherein the alternative primary video stream includes a representation of a face of the another common meeting participant and a representation of at least a portion of a back of a head of the common meeting participant.

30. The multi-camera system of claim 25, wherein the alternative primary video stream includes a representation of a face of the another particular common meeting participant and a representation of at least a face of the particular common meeting participant.

31. The multi-camera system of claim 25, wherein the alternative primary video stream includes a representation of a face of the another particular common meeting participant, a representation of at least a face of the particular common meeting participant, and a representation of a face of at least one interleaving meeting participant.

32. The multi-camera system of claim 1, wherein the one or more predetermined criteria includes a looking direction of the particular common meeting participant determined relative to each of the first and second video output streams.

33. The multi-camera system of claim 1, wherein the one or more predetermined criteria includes a face visibility score associated with the particular common meeting participant determined relative to each of the first and second video output streams.

34. The multi-camera system of claim 1, wherein the particular common meeting participant is determined to be speaking, listening, or reacting.

35. The multi-camera system of claim 1, wherein a camera associated with the selected third or fourth video output stream is designated as a preferred camera associated with the particular common meeting participant.

36. The multi-camera system of claim 35, wherein the particular common meeting participant is centered in an output associated with the preferred camera.

37. The multi-camera system of claim 1, wherein the meeting environment includes at least one of a board room, classroom, lecture hall, videoconference space, or office space.

38. The multi-camera system of claim 1, wherein the primary video stream further includes a representation of at least a portion of a back of a head of another particular common meeting participant, and wherein the particular common meeting participant is speaking, listening, or reacting.

39. The multi-camera system of claim 16, wherein the primary video stream and the alternative primary video stream are simultaneously displayed in a gallery view.

40. The multi-camera system of claim 39, wherein the primary video stream includes a speaker shot, and wherein the alternative primary video stream includes a single shot or a group shot.

41. A multi-camera system, comprising:
a plurality of cameras configured to generate a plurality of video output streams representative of a meeting environment including a plurality of meeting participants, wherein representations of the plurality of meeting participants are captured across the plurality of video output streams; and
a video processing unit configured to:
detect, using machine learning, a number of meeting participants present in the meeting environment and a location of each of the plurality of meeting participants;
automatically analyze each video output stream of the plurality of video output streams, based on at least one identity indicator, the number of meeting participants, and the location of each meeting participant to determine whether one or more representations of one or more meeting participants in each video output stream and another one or more representations of one or more meeting participants in another video output stream correspond to one or more common meeting participants by:
determining one or more distances between a first one or more feature vectors, each feature vector of the first one or more feature vectors corresponding to a representation of a meeting participant in a first video output stream, and a second one or more feature vectors, each feature vector of the second one or more feature vectors corresponding to a representation of a meeting participant in a second video output stream; and
associating, based on the determined one or more distances, a first vector of the first one or more feature vectors and a second vector of the second one or more feature vectors with a common meeting participant, wherein the determined one or more distances is less than a predetermined threshold;
evaluate a first representation from a third video output stream and a second representation from a fourth video output stream of a particular common meeting participant relative to one or more predetermined criteria, wherein the one or more predetermined criteria include a combination of: whether the particular common meeting participant is detected as speaking, a head pose of the particular common meeting participant, and a face visibility level associated with the particular common meeting participant;
select, based on the evaluation, either the third video output stream or the fourth video output stream as a source of a framed representation of the particular common meeting participant to be output as a primary video stream; and
generate, as an output of the multi-camera system, the primary video stream including the framed representation of the particular common meeting participant.

42. The multi-camera system of claim 41, wherein the meeting environment includes at least one of a board room, classroom, lecture hall, videoconference space, or office space.

43. The multi-camera system of claim 41, wherein a third representation of a meeting participant is included in the third video output stream, and wherein a fourth representation of a meeting participant is included in the fourth video output stream, and wherein the video processing unit is further configured to analyze the first video output stream and the second video output stream, based on the at least one identity indicator, to determine whether the third representation of the meeting participant and the fourth representation of the meeting participant correspond to another particular common meeting participant.

44. The multi-camera system of claim 43, wherein the video processing unit is further configured to:
- evaluate the third representation and the fourth representation of the another particular common meeting participant relative to one or more predetermined criteria;
- select, based on the evaluation, either the third video output stream or the fourth video output stream as a source of a framed representation of the another particular common meeting participant to be output as an alternative primary video stream; and
- generate, as an output of the multi-camera system, the alternative primary video stream including the framed representation of the another particular common meeting participant.

45. The multi-camera system of claim 44, wherein the output of the multi-camera system is alternated between the primary video stream and the alternative primary video stream.

46. The multi-camera system of claim 45, wherein a transition between the primary video stream and the alternative video stream occurs after a delay of at least 8 seconds.

47. The multi-camera system of claim 41, wherein the one or more predetermined criteria include: whether the particular common meeting participant is detected as speaking, a head pose of the particular common meeting participant, and a face visibility level associated with the particular common meeting participant.

* * * * *